(12) United States Patent
Beamon et al.

(10) Patent No.: US 8,873,926 B2
(45) Date of Patent: Oct. 28, 2014

(54) FIBER OPTIC ENCLOSURES EMPLOYING CLAMPING ASSEMBLIES FOR STRAIN RELIEF OF CABLES, AND RELATED ASSEMBLIES AND METHODS

(75) Inventors: Hubert Blair Beamon, Haltom City, TX (US); Terry Dean Cox, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 191 days.

(21) Appl. No.: 13/456,755

(22) Filed: Apr. 26, 2012

(65) Prior Publication Data

US 2013/0287360 A1   Oct. 31, 2013

(51) Int. Cl.
  *G02B 6/00*   (2006.01)
(52) U.S. Cl.
  USPC ........................................... 385/136; 385/134
(58) Field of Classification Search
  USPC ....................................................... 385/136
  See application file for complete search history.

(56) References Cited

U.S. PATENT DOCUMENTS

| | | |
|---|---|---|
| 2,047,152 A | 7/1936 | Mitchell |
| 2,853,775 A | 9/1958 | Drake |
| D195,338 S | 6/1963 | Geisen |
| 3,620,875 A | 11/1971 | Guglielmo, Sr. et al. |
| D225,644 S | 12/1972 | Beach |
| 3,845,552 A | 11/1974 | Waltz |
| 3,879,575 A | 4/1975 | Dobbin et al. |
| 3,912,854 A | 10/1975 | Thompson et al. |
| 3,912,855 A | 10/1975 | Thompson et al. |
| 4,085,286 A | 4/1978 | Horsma et al. |
| 4,107,451 A | 8/1978 | Smith, Jr. et al. |
| 4,152,539 A | 5/1979 | Charlebois et al. |
| 4,213,018 A | 7/1980 | Piston |
| 4,266,853 A | 5/1981 | Hutchins et al. |
| 4,322,573 A | 3/1982 | Charlebois |
| 4,343,844 A | 8/1982 | Thayer et al. |
| 4,360,268 A | 11/1982 | Zucker et al. |
| 4,405,083 A | 9/1983 | Charlebois et al. |

(Continued)

FOREIGN PATENT DOCUMENTS

| | | |
|---|---|---|
| DE | 1430906 A1 | 9/1969 |
| DE | 3537684 A1 | 4/1987 |

(Continued)

OTHER PUBLICATIONS

Patent cooperation Treaty, International Search Report, Aug. 9, 2013, 2 pages.

(Continued)

*Primary Examiner* — Rhonda Peace
(74) *Attorney, Agent, or Firm* — John H. Vynalek

(57) ABSTRACT

Fiber optic enclosures employing clamping assemblies for strain relief cables and related assemblies and methods are disclosed. The fiber optic enclosures may be part of a fiber optic terminal in a fiber optic network. The fiber optic enclosures may include openings in the walls of the fiber optic enclosure. A cable fitting assembly may be attached to a portion of the wall around an opening to form a passageway for fiber optic cables to enter the fiber optic enclosure. An elongated member may be used to guide the fiber optic cables through the passageway. The elongated member may have a first end and second end. The elongated member may include a clamping assembly at the first end to provide strain relief to the fiber optic cables by clamping strength members of the fiber optic cables.

26 Claims, 29 Drawing Sheets

(56) References Cited

U.S. PATENT DOCUMENTS

| | | |
|---|---|---|
| 4,413,881 A | 11/1983 | Kovats |
| 4,467,137 A | 8/1984 | Jonathan et al. |
| 4,475,935 A | 10/1984 | Tanaka et al. |
| 4,481,380 A | 11/1984 | Wood et al. |
| 4,490,315 A | 12/1984 | Charlebois et al. |
| 4,512,628 A | 4/1985 | Anderton |
| 4,528,150 A | 7/1985 | Charlebois et al. |
| 4,528,419 A | 7/1985 | Charlebois et al. |
| 4,549,039 A | 10/1985 | Charlebois et al. |
| 4,550,220 A | 10/1985 | Kitchens |
| 4,553,812 A | 11/1985 | Kojiro et al. |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,602,840 A | 7/1986 | Romatzick |
| 4,609,773 A | 9/1986 | Brown et al. |
| 4,610,738 A | 9/1986 | Jervis |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,652,072 A | 3/1987 | Arasi, Jr. |
| 4,654,474 A | 3/1987 | Charlebois et al. |
| 4,665,279 A | 5/1987 | Ruschkofski et al. |
| 4,666,537 A | 5/1987 | Dienes |
| 4,669,802 A | 6/1987 | Schaffer |
| 4,670,069 A | 6/1987 | Debbaut et al. |
| 4,670,980 A | 6/1987 | Charlebois et al. |
| 4,673,242 A | 6/1987 | Logan et al. |
| 4,678,866 A | 7/1987 | Charlebois |
| 4,684,764 A | 8/1987 | Luzzi et al. |
| 4,685,799 A | 8/1987 | Brininstool |
| 4,701,010 A | 10/1987 | Roberts |
| 4,701,574 A | 10/1987 | Shimirak et al. |
| 4,702,551 A | 10/1987 | Coulombe |
| 4,704,499 A | 11/1987 | Faust |
| 4,708,476 A | 11/1987 | So et al. |
| 4,717,231 A | 1/1988 | Dewez et al. |
| 4,721,830 A | 1/1988 | Dagan et al. |
| 4,725,035 A | 2/1988 | Charlebois et al. |
| 4,732,628 A | 3/1988 | Dienes |
| 4,736,071 A | 4/1988 | Hawkins et al. |
| 4,742,541 A | 5/1988 | Cwirzen et al. |
| 4,747,020 A | 5/1988 | Brickley et al. |
| 4,761,052 A | 8/1988 | Buekers et al. |
| 4,764,232 A | 8/1988 | Hunter |
| 4,785,376 A | 11/1988 | Dively |
| 4,792,203 A | 12/1988 | Nelson et al. |
| 4,805,979 A | 2/1989 | Bossard et al. |
| 4,818,824 A | 4/1989 | Dixit et al. |
| 4,822,434 A | 4/1989 | Sawaki et al. |
| 4,834,479 A | 5/1989 | Adl |
| 4,850,014 A | 7/1989 | Gillis et al. |
| 4,859,809 A | 8/1989 | Jervis |
| 4,867,524 A | 9/1989 | Courtney et al. |
| 4,875,952 A | 10/1989 | Mullin et al. |
| 4,882,647 A | 11/1989 | Collins |
| 4,884,863 A | 12/1989 | Throckmorton |
| 4,913,512 A | 4/1990 | Anderton |
| 4,917,615 A | 4/1990 | Franks, Jr. |
| 4,927,227 A | 5/1990 | Bensel, III et al. |
| 4,932,742 A | 6/1990 | Tohme |
| 4,952,798 A | 8/1990 | Graham et al. |
| 4,958,900 A | 9/1990 | Ortiz, Jr. |
| 4,960,317 A | 10/1990 | Briggs et al. |
| 4,961,623 A | 10/1990 | Midkiff et al. |
| 4,963,698 A | 10/1990 | Chang et al. |
| 4,976,510 A | 12/1990 | Davila et al. |
| 4,982,083 A | 1/1991 | Graham et al. |
| 4,986,762 A | 1/1991 | Keith |
| D314,759 S | 2/1991 | Collins et al. |
| 4,989,939 A | 2/1991 | Cox et al. |
| 4,995,688 A | 2/1991 | Anton et al. |
| 5,004,315 A | 4/1991 | Miyazaki |
| 5,011,256 A | 4/1991 | Johnson et al. |
| D318,653 S | 7/1991 | Nieves et al. |
| 5,029,958 A | 7/1991 | Hodge et al. |
| 5,031,984 A | 7/1991 | Eide et al. |
| 5,042,901 A | 8/1991 | Merriken et al. |
| 5,046,811 A | 9/1991 | Jung et al. |
| 5,050,949 A | 9/1991 | DiGiovanni et al. |
| 5,052,773 A | 10/1991 | Noon et al. |
| 5,052,775 A | 10/1991 | Bossard et al. |
| 5,054,868 A | 10/1991 | Hoban et al. |
| 5,066,095 A | 11/1991 | Dekeyser et al. |
| 5,068,890 A | 11/1991 | Nilssen |
| 5,074,808 A | 12/1991 | Beamenderfer et al. |
| 5,076,688 A | 12/1991 | Bowen et al. |
| 5,077,815 A | 12/1991 | Yoshizawa et al. |
| 5,091,987 A | 2/1992 | MacCulloch et al. |
| 5,093,885 A | 3/1992 | Anton |
| 5,097,529 A | 3/1992 | Cobb et al. |
| 5,099,088 A | 3/1992 | Usami et al. |
| 5,100,221 A | 3/1992 | Carney et al. |
| 5,109,458 A | 4/1992 | Dixit et al. |
| 5,115,105 A | 5/1992 | Gallusser et al. |
| 5,121,458 A | 6/1992 | Nilsson et al. |
| 5,122,069 A | 6/1992 | Brownlie et al. |
| 5,125,060 A | 6/1992 | Edmundson |
| 5,127,082 A | 6/1992 | Below et al. |
| 5,129,030 A | 7/1992 | Petrunia |
| 5,133,038 A | 7/1992 | Zipper |
| 5,133,039 A | 7/1992 | Dixit |
| 5,142,606 A | 8/1992 | Carney et al. |
| 5,155,303 A | 10/1992 | Bensel, III et al. |
| 5,179,618 A | 1/1993 | Anton |
| 5,185,844 A | 2/1993 | Bensel, III et al. |
| 5,185,845 A | 2/1993 | Jones |
| 5,194,692 A | 3/1993 | Gallusser et al. |
| 5,204,929 A | 4/1993 | Machall et al. |
| 5,209,958 A | 5/1993 | Katsaros et al. |
| 5,210,812 A | 5/1993 | Nilsson et al. |
| 5,212,761 A | 5/1993 | Petrunia |
| 5,214,735 A | 5/1993 | Henneberger et al. |
| 5,217,808 A | 6/1993 | Cobb |
| 5,224,187 A | 6/1993 | Davidson ........................ 385/87 |
| D337,313 S | 7/1993 | Davis |
| 5,231,687 A | 7/1993 | Handley |
| 5,235,665 A | 8/1993 | Marchesi et al. |
| 5,241,611 A | 8/1993 | Gould |
| 5,245,151 A | 9/1993 | Chamberlain et al. |
| 5,247,135 A | 9/1993 | Rebers et al. |
| 5,259,047 A | 11/1993 | Morrison et al. |
| 5,260,957 A | 11/1993 | Hakimi et al. |
| 5,267,122 A | 11/1993 | Glover et al. |
| 5,308,954 A | 5/1994 | Manock et al. |
| 5,322,973 A | 6/1994 | Dagan |
| 5,335,408 A | 8/1994 | Cobb |
| 5,347,089 A | 9/1994 | Barrat et al. |
| 5,353,367 A | 10/1994 | Czosnowski et al. |
| 5,357,565 A | 10/1994 | Butler, III et al. |
| 5,363,465 A | 11/1994 | Korkowski et al. |
| 5,363,467 A | 11/1994 | Keith |
| 5,367,598 A | 11/1994 | Devenish, III et al. |
| 5,376,196 A | 12/1994 | Grajewski et al. |
| 5,378,853 A | 1/1995 | Clouet et al. |
| 5,381,501 A | 1/1995 | Cardinal et al. |
| 5,386,490 A | 1/1995 | Pan et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,418,874 A | 5/1995 | Carlisle et al. |
| 5,420,958 A | 5/1995 | Henson et al. |
| 5,425,121 A | 6/1995 | Cooke et al. |
| RE34,995 E | 7/1995 | Domenig |
| 5,432,875 A | 7/1995 | Korkowski et al. |
| 5,440,655 A | 8/1995 | Kaplow et al. |
| 5,440,665 A | 8/1995 | Ray et al. |
| 5,442,726 A | 8/1995 | Howard et al. |

(56) References Cited

U.S. PATENT DOCUMENTS

| | | |
|---|---|---|
| 5,446,822 A | 8/1995 | Keith |
| 5,446,823 A | 8/1995 | Bingham et al. |
| 5,450,517 A | 9/1995 | Essert |
| 5,450,518 A | 9/1995 | Burek et al. |
| 5,475,781 A | 12/1995 | Chang et al. |
| 5,481,639 A | 1/1996 | Cobb et al. |
| 5,491,766 A | 2/1996 | Huynh et al. |
| 5,495,549 A | 2/1996 | Schneider et al. |
| 5,509,099 A | 4/1996 | Hermsen et al. |
| 5,509,202 A | 4/1996 | Abdow |
| 5,517,592 A | 5/1996 | Grajewski et al. |
| 5,525,756 A | 6/1996 | Mullaney et al. |
| 5,528,718 A | 6/1996 | Ray et al. |
| 5,553,186 A | 9/1996 | Allen |
| D377,339 S | 1/1997 | Beruscha et al. |
| 5,598,499 A | 1/1997 | Burek et al. |
| 5,623,542 A | 4/1997 | Schneider et al. |
| 5,633,973 A | 5/1997 | Vincent et al. |
| 5,638,481 A | 6/1997 | Arnett |
| 5,640,482 A | 6/1997 | Barry et al. |
| 5,644,671 A | 7/1997 | Goetter et al. |
| 5,645,449 A | 7/1997 | Sabo |
| 5,657,413 A | 8/1997 | Ray et al. |
| 5,659,650 A | 8/1997 | Arnett |
| 5,666,453 A | 9/1997 | Dannenmann |
| 5,684,911 A | 11/1997 | Burgett |
| 5,689,607 A | 11/1997 | Vincent et al. |
| 5,696,864 A | 12/1997 | Smith et al. |
| 5,701,380 A | 12/1997 | Larson et al. |
| 5,708,742 A | 1/1998 | Beun et al. |
| 5,708,753 A | 1/1998 | Frigo et al. |
| 5,732,180 A | 3/1998 | Kaplan |
| 5,734,776 A | 3/1998 | Puetz |
| 5,741,158 A | 4/1998 | Reed et al. |
| 5,745,633 A | 4/1998 | Giebel et al. |
| 5,754,724 A | 5/1998 | Peterson et al. |
| 5,757,997 A | 5/1998 | Birrell et al. |
| 5,758,003 A | 5/1998 | Wheeler et al. |
| 5,767,448 A | 6/1998 | Dong |
| 5,778,122 A | 7/1998 | Giebel et al. |
| 5,781,678 A | 7/1998 | Sano et al. |
| D399,190 S | 10/1998 | Dale et al. |
| 5,823,646 A | 10/1998 | Arizpe et al. |
| 5,825,963 A | 10/1998 | Burgett |
| 5,825,964 A | 10/1998 | Goetter et al. |
| 5,828,807 A | 10/1998 | Tucker et al. |
| D401,568 S | 11/1998 | Alden et al. |
| 5,861,575 A | 1/1999 | Broussard |
| 5,867,621 A | 2/1999 | Luther et al. |
| 5,881,200 A | 3/1999 | Burt |
| 5,892,870 A | 4/1999 | Fingler et al. |
| 5,894,540 A | 4/1999 | Drewing |
| 5,896,486 A | 4/1999 | Burek et al. |
| 5,898,813 A | 4/1999 | Beier |
| 5,903,698 A | 5/1999 | Poremba et al. |
| 5,907,653 A | 5/1999 | Burek et al. |
| 5,914,846 A | 6/1999 | Smith et al. |
| 5,917,648 A | 6/1999 | Harker |
| 5,937,121 A | 8/1999 | Ott et al. |
| 5,945,633 A | 8/1999 | Ott et al. |
| 5,946,440 A | 8/1999 | Puetz |
| 5,956,449 A | 9/1999 | Otani et al. |
| 5,957,415 A | 9/1999 | Perea |
| D415,118 S | 10/1999 | Stanush et al. |
| 5,969,294 A | 10/1999 | Eberle et al. |
| 5,975,769 A | 11/1999 | Larson et al. |
| 5,987,203 A | 11/1999 | Abel et al. |
| 5,997,186 A | 12/1999 | Huynh et al. |
| RE36,592 E | 2/2000 | Giebel et al. |
| 6,037,544 A | 3/2000 | Lee et al. |
| D422,564 S | 4/2000 | Arizpe |
| 6,049,413 A | 4/2000 | Taylor et al. |
| 6,053,054 A | 4/2000 | Wusterbarth et al. |
| D424,598 S | 5/2000 | Simioni |
| 6,061,492 A | 5/2000 | Strause et al. |
| 6,061,870 A | 5/2000 | Dodge et al. |
| 6,064,791 A | 5/2000 | Crawford et al. |
| 6,086,263 A | 7/2000 | Selli et al. |
| 6,104,846 A | 8/2000 | Hodgson et al. |
| 6,122,420 A | 9/2000 | Satoh |
| RE36,952 E | 11/2000 | Zagar et al. |
| 6,151,436 A | 11/2000 | Burek et al. |
| 6,160,946 A | 12/2000 | Thompson et al. |
| 6,167,183 A | 12/2000 | Swain |
| RE37,028 E | 1/2001 | Cooke et al. |
| 6,184,470 B1 | 2/2001 | Froehlich et al. |
| 6,195,494 B1 | 2/2001 | Abbott et al. |
| 6,198,866 B1 | 3/2001 | Nikolaevich |
| 6,206,583 B1 | 3/2001 | Hishikawa et al. |
| 6,208,796 B1 | 3/2001 | Williams Vigliaturo |
| 6,215,930 B1 | 4/2001 | Estes et al. |
| 6,215,939 B1 | 4/2001 | Cloud |
| 6,218,620 B1 | 4/2001 | Michel |
| 6,255,584 B1 | 7/2001 | Renaud |
| 6,259,024 B1 | 7/2001 | Daoud |
| 6,259,851 B1 | 7/2001 | Daoud |
| 6,263,141 B1 | 7/2001 | Smith |
| 6,275,641 B1 | 8/2001 | Daoud |
| 6,278,829 B1 | 8/2001 | Buabbud et al. |
| 6,292,614 B1 | 9/2001 | Smith et al. |
| D449,824 S | 10/2001 | Higa et al. |
| 6,300,562 B1 | 10/2001 | Daoud |
| 6,343,950 B1 | 2/2002 | Eginton et al. |
| 6,353,186 B1 | 3/2002 | Dams et al. ................ 174/65 |
| 6,353,697 B1 | 3/2002 | Daoud |
| 6,359,228 B1 | 3/2002 | Strause et al. |
| 6,363,200 B1 | 3/2002 | Thompson et al. |
| 6,369,883 B1 | 4/2002 | Clark |
| 6,376,774 B1 | 4/2002 | Oh et al. |
| 6,389,213 B1 | 5/2002 | Quesnel |
| 6,389,214 B1 * | 5/2002 | Smith et al. ................ 385/136 |
| 6,407,338 B1 | 6/2002 | Smith |
| 6,417,453 B1 | 7/2002 | Lapp et al. |
| 6,418,262 B1 | 7/2002 | Puetz et al. |
| 6,418,266 B1 | 7/2002 | Vitantonio |
| 6,424,781 B1 | 7/2002 | Puetz et al. |
| 6,427,035 B1 | 7/2002 | Mahony |
| 6,435,727 B1 | 8/2002 | Fingler et al. |
| 6,438,310 B1 | 8/2002 | Lance et al. |
| 6,439,777 B1 | 8/2002 | Harrison et al. |
| 6,439,779 B1 | 8/2002 | Hafer |
| 6,441,944 B1 | 8/2002 | Kim et al. |
| 6,453,106 B1 | 9/2002 | Glaser et al. |
| 6,454,464 B1 | 9/2002 | Nolan |
| 6,466,725 B2 | 10/2002 | Battey et al. |
| 6,487,336 B1 | 11/2002 | Yao |
| 6,493,500 B1 | 12/2002 | Oh et al. |
| 6,508,593 B1 | 1/2003 | Farnsworth et al. |
| 6,533,472 B1 | 3/2003 | Dinh et al. |
| 6,535,579 B1 | 3/2003 | Blake et al. |
| 6,535,682 B1 | 3/2003 | Puetz et al. |
| 6,539,160 B2 | 3/2003 | Battey et al. |
| 6,542,688 B1 | 4/2003 | Battey et al. |
| 6,556,763 B1 | 4/2003 | Puetz et al. |
| 6,565,261 B1 | 5/2003 | Uchiyama et al. |
| 6,577,801 B2 | 6/2003 | Broderick et al. |
| 6,582,132 B1 | 6/2003 | Farnsworth et al. |
| 6,583,867 B1 | 6/2003 | Jennings et al. |
| 6,589,014 B1 | 7/2003 | Hawryluk et al. |
| 6,612,515 B1 | 9/2003 | Tinucci et al. |
| 6,614,665 B2 | 9/2003 | Witty et al. |
| 6,619,697 B2 | 9/2003 | Griffioen et al. |
| 6,628,870 B2 | 9/2003 | Yamaguchi |
| 6,631,237 B2 | 10/2003 | Knudsen et al. |
| D482,667 S | 11/2003 | Yu |
| 6,648,520 B2 | 11/2003 | McDonald et al. |
| 6,650,458 B1 | 11/2003 | Prosyk et al. |
| 6,652,295 B1 | 11/2003 | Glass et al. |
| 6,655,016 B2 | 12/2003 | Renaud |
| 6,661,961 B1 | 12/2003 | Allen et al. |
| 6,668,127 B1 | 12/2003 | Mahony |
| 6,678,457 B2 | 1/2004 | Kim et al. |
| 6,706,968 B2 | 3/2004 | Yaworski et al. |
| 6,710,366 B1 | 3/2004 | Lee et al. |

(56) References Cited

U.S. PATENT DOCUMENTS

| | | | |
|---|---|---|---|
| 6,711,337 B2 | 3/2004 | Hodge et al. | |
| 6,711,340 B2 | 3/2004 | Dickson | |
| 6,721,484 B1 | 4/2004 | Blankenship et al. | |
| 6,721,507 B2 | 4/2004 | Iwata et al. | |
| 6,744,962 B2 | 6/2004 | Allerellie | |
| 6,757,308 B1 | 6/2004 | Eldring et al. | |
| 6,760,531 B1 | 7/2004 | Solheid et al. | |
| 6,764,220 B2 | 7/2004 | Griffiths et al. | |
| 6,766,094 B2 | 7/2004 | Smith et al. | |
| 6,775,456 B2 | 8/2004 | Matsuura | |
| 6,778,752 B2 | 8/2004 | Laporte et al. | |
| 6,782,209 B2 | 8/2004 | Copeland et al. | |
| 6,786,652 B2 | 9/2004 | Marquez et al. | |
| 6,792,191 B1 | 9/2004 | Clapp, Jr. et al. | |
| 6,795,182 B2 | 9/2004 | Rakuljic et al. | |
| 6,795,552 B1 | 9/2004 | Stanush et al. | |
| 6,802,512 B2 | 10/2004 | Muller et al. | |
| 6,804,352 B2 | 10/2004 | Miller et al. | |
| 6,810,194 B2 | 10/2004 | Griffiths et al. | |
| 6,815,612 B2 | 11/2004 | Bloodworth et al. | |
| 6,819,842 B1 | 11/2004 | Vogel et al. | |
| 6,824,312 B2 | 11/2004 | McClellan et al. | |
| 6,856,747 B2 | 2/2005 | Cloud et al. | |
| 6,856,748 B1 | 2/2005 | Elkins, II et al. | |
| 6,861,584 B2 | 3/2005 | Hutchin et al. | |
| 6,863,446 B2 | 3/2005 | Ngo | |
| 6,866,541 B2 | 3/2005 | Barker et al. | |
| 6,873,868 B2 * | 3/2005 | Furnish | 600/435 |
| 6,875,926 B2 | 4/2005 | Buekers et al. | |
| 6,880,219 B2 | 4/2005 | Griffioen et al. | |
| 6,880,986 B2 | 4/2005 | Mynatt et al. | |
| 6,901,200 B2 | 5/2005 | Schray | |
| 6,916,199 B2 | 7/2005 | Follingstad | |
| 6,918,786 B2 | 7/2005 | Barker et al. | |
| 6,920,274 B2 | 7/2005 | Rapp et al. | |
| 6,926,449 B1 | 8/2005 | Keenum et al. | |
| 6,934,433 B2 | 8/2005 | Miyata et al. | |
| 6,940,018 B1 * | 9/2005 | Dewhirst | 174/68.1 |
| 6,968,107 B2 | 11/2005 | Belardi et al. | |
| D512,697 S | 12/2005 | Enns et al. | |
| 6,980,725 B1 | 12/2005 | Swieconek | |
| 6,981,893 B2 | 1/2006 | Barker et al. | |
| 6,983,095 B2 | 1/2006 | Reagan et al. | |
| 7,006,739 B2 | 2/2006 | Elkins, II et al. | |
| 7,013,074 B2 | 3/2006 | Battey et al. | |
| 7,016,592 B2 | 3/2006 | Elkins, II et al. | |
| 7,054,513 B2 | 5/2006 | Herz et al. | |
| 7,088,899 B2 | 8/2006 | Reagan et al. | |
| 7,094,095 B1 | 8/2006 | Caveney | |
| 7,103,255 B2 | 9/2006 | Reagan et al. | |
| 7,113,686 B2 | 9/2006 | Bellekens et al. | |
| 7,120,347 B2 | 10/2006 | Blackwell, Jr. et al. | |
| 7,130,519 B2 | 10/2006 | Grubish et al. | |
| 7,139,461 B2 | 11/2006 | Puetz et al. | |
| 7,142,763 B2 | 11/2006 | Frohlich et al. | |
| 7,142,764 B2 | 11/2006 | Allen et al. | |
| 7,149,398 B2 | 12/2006 | Solheid et al. | |
| 7,171,100 B2 | 1/2007 | Solheid et al. | |
| 7,179,119 B2 | 2/2007 | Follingstad | |
| 7,190,874 B1 | 3/2007 | Barth et al. | |
| 7,200,317 B2 | 4/2007 | Reagan et al. | |
| D543,513 S | 5/2007 | Allen et al. | |
| 7,218,827 B2 | 5/2007 | Vongseng et al. | |
| 7,218,828 B2 | 5/2007 | Feustel et al. | |
| 7,220,145 B2 | 5/2007 | Denovich et al. | |
| 7,221,832 B2 * | 5/2007 | Tinucci | 385/106 |
| 7,239,789 B2 | 7/2007 | Grubish et al. | |
| 7,244,144 B2 | 7/2007 | Follingstad | |
| 7,257,223 B2 | 8/2007 | Sajadi et al. | |
| 7,260,301 B2 | 8/2007 | Barth et al. | |
| 7,274,850 B2 | 9/2007 | Wittmeier et al. | |
| 7,277,620 B2 | 10/2007 | Vongseng et al. | |
| D556,145 S | 11/2007 | Williams et al. | |
| 7,292,763 B2 | 11/2007 | Smith et al. | |
| 7,302,152 B2 | 11/2007 | Luther et al. | |
| D560,170 S | 1/2008 | Ni | |
| 7,327,926 B2 | 2/2008 | Barth et al. | |
| 7,330,625 B2 | 2/2008 | Barth | |
| 7,333,706 B2 | 2/2008 | Parikh et al. | |
| 7,333,707 B2 | 2/2008 | Puetz et al. | |
| 7,333,708 B2 | 2/2008 | Blackwell, Jr. et al. | |
| 7,343,078 B2 | 3/2008 | Spisany et al. | |
| 7,349,616 B1 | 3/2008 | Castonguay et al. | |
| 7,351,909 B1 | 4/2008 | Harwood et al. | |
| 7,362,925 B2 | 4/2008 | Miyata et al. | |
| 7,397,997 B2 | 7/2008 | Ferris et al. | |
| 7,400,816 B2 | 7/2008 | Reagan et al. | |
| 7,433,566 B2 | 10/2008 | Bookbinder et al. | |
| 7,450,807 B2 | 11/2008 | Bickham et al. | |
| 7,489,849 B2 | 2/2009 | Reagan et al. | |
| 7,499,622 B2 | 3/2009 | Castonguay et al. | |
| 7,505,660 B2 | 3/2009 | Bickham et al. | |
| D597,403 S * | 8/2009 | Ho et al. | D8/396 |
| 7,668,431 B2 * | 2/2010 | Cox et al. | 385/135 |
| 7,702,208 B2 | 4/2010 | Mudd et al. | |
| 7,711,236 B2 * | 5/2010 | Gonzalez et al. | 385/137 |
| 7,751,675 B2 | 7/2010 | Holmberg et al. | |
| 8,020,259 B2 * | 9/2011 | Ho et al. | 24/129 R |
| 8,107,785 B2 | 1/2012 | Berglund et al. | |
| 8,135,256 B2 | 3/2012 | Solheid et al. | |
| 8,483,537 B2 * | 7/2013 | Zeng et al. | 385/137 |
| 8,707,515 B2 * | 4/2014 | Payne et al. | 16/2.5 |
| 2001/0052451 A1 | 12/2001 | Ruoss et al. | |
| 2002/0051616 A1 | 5/2002 | Battey et al. | |
| 2002/0061170 A1 | 5/2002 | Wu et al. | |
| 2002/0079697 A1 | 6/2002 | Griffioen et al. | |
| 2002/0146229 A1 | 10/2002 | Roberts | |
| 2002/0181925 A1 | 12/2002 | Hodge et al. | |
| 2003/0010519 A1 | 1/2003 | Pieck | 174/65 R |
| 2003/0063869 A1 | 4/2003 | Elkins, II et al. | |
| 2003/0077041 A1 | 4/2003 | Belaidi et al. | |
| 2003/0103750 A1 | 6/2003 | Laporte et al. | |
| 2003/0123838 A1 | 7/2003 | Wang et al. | |
| 2003/0125719 A1 * | 7/2003 | Furnish | 606/15 |
| 2003/0147597 A1 | 8/2003 | Duran | |
| 2003/0223725 A1 | 12/2003 | Laporte et al. | |
| 2004/0062508 A1 | 4/2004 | Blankenship et al. | |
| 2004/0074852 A1 | 4/2004 | Knudsen et al. | |
| 2004/0123998 A1 | 7/2004 | Berglund et al. | |
| 2004/0126069 A1 | 7/2004 | Jong et al. | |
| 2004/0146266 A1 | 7/2004 | Solheid et al. | |
| 2004/0161217 A1 | 8/2004 | Hodge et al. | |
| 2004/0211774 A1 | 10/2004 | Daoud et al. | |
| 2004/0213620 A1 | 10/2004 | Bergeron et al. | |
| 2004/0228589 A1 | 11/2004 | Melton et al. | |
| 2004/0228598 A1 | 11/2004 | Allen et al. | |
| 2004/0247265 A1 | 12/2004 | Takano et al. | |
| 2004/0256138 A1 | 12/2004 | Grubish et al. | |
| 2005/0002633 A1 | 1/2005 | Solheid et al. | |
| 2005/0021392 A1 | 1/2005 | English et al. | |
| 2005/0025444 A1 | 2/2005 | Barnes et al. | |
| 2005/0053337 A1 | 3/2005 | Mayer | |
| 2005/0053342 A1 | 3/2005 | Melton et al. | |
| 2005/0069275 A1 | 3/2005 | Brants et al. | |
| 2005/0094959 A1 | 5/2005 | Sibley et al. | |
| 2005/0100301 A1 | 5/2005 | Solheid et al. | |
| 2005/0105873 A1 | 5/2005 | Reagan et al. | |
| 2005/0111799 A1 | 5/2005 | Cooke et al. | |
| 2005/0129375 A1 | 6/2005 | Elkins, II et al. | |
| 2005/0129379 A1 | 6/2005 | Reagan et al. | |
| 2005/0135768 A1 | 6/2005 | Rapp et al. | |
| 2005/0145522 A1 | 7/2005 | Bloodworth et al. | |
| 2005/0163448 A1 | 7/2005 | Blackwell, Jr. et al. | |
| 2005/0175307 A1 | 8/2005 | Battey et al. | |
| 2005/0175308 A1 | 8/2005 | Elkins, II et al. | |
| 2005/0185895 A1 | 8/2005 | Keenum et al. | |
| 2005/0213921 A1 | 9/2005 | Mertesdorf et al. | |
| 2005/0220421 A1 | 10/2005 | Keenum et al. | |
| 2005/0259928 A1 | 11/2005 | Elkins, II et al. | |
| 2005/0259929 A1 | 11/2005 | Elkins, II et al. | |
| 2005/0271344 A1 | 12/2005 | Grubish et al. | |
| 2005/0276552 A1 | 12/2005 | Cooke et al. | |
| 2005/0281526 A1 | 12/2005 | Vongseng et al. | |
| 2006/0008231 A1 | 1/2006 | Reagan et al. | |

(56) References Cited

U.S. PATENT DOCUMENTS

| | | |
|---|---|---|
| 2006/0029353 A1 | 2/2006 | Bolster et al. |
| 2006/0056782 A1 | 3/2006 | Elkins, II et al. |
| 2006/0093302 A1 | 5/2006 | Solheid et al. |
| 2006/0093303 A1 | 5/2006 | Reagan et al. |
| 2006/0153517 A1 | 7/2006 | Reagan et al. |
| 2006/0165366 A1 | 7/2006 | Feustel et al. |
| 2006/0193588 A1 | 8/2006 | Mertesdorf et al. |
| 2006/0222309 A1 | 10/2006 | Grubish et al. |
| 2006/0233506 A1 | 10/2006 | Noonan et al. |
| 2006/0263029 A1 | 11/2006 | Mudd et al. |
| 2007/0031100 A1 | 2/2007 | Garcia et al. |
| 2007/0036488 A1 | 2/2007 | Harrison et al. |
| 2007/0116413 A1 | 5/2007 | Cox |
| 2007/0140642 A1 | 6/2007 | Mertesdorf et al. |
| 2007/0165995 A1 | 7/2007 | Reagan et al. |
| 2007/0192817 A1 | 8/2007 | Landry et al. |
| 2007/0237484 A1 | 10/2007 | Reagan et al. |
| 2008/0056654 A1 | 3/2008 | Bickham et al. |
| 2008/0069511 A1 | 3/2008 | Blackwell, Jr. et al. |
| 2008/0075411 A1 | 3/2008 | Solheid et al. |
| 2008/0166094 A1 | 7/2008 | Bookbinder et al. |
| 2008/0253730 A1* | 10/2008 | Cox et al. ............... 385/138 |
| 2009/0169163 A1 | 7/2009 | Abbott, III et al. |
| 2010/0092146 A1 | 4/2010 | Conner et al. |
| 2011/0042529 A1* | 2/2011 | Walter .................. 248/68.1 |
| 2011/0097050 A1 | 4/2011 | Blackwell, Jr. et al. |
| 2012/0027361 A1 | 2/2012 | Brower et al. |
| 2012/0051710 A1* | 3/2012 | Zeng et al. ............ 385/137 |
| 2013/0028568 A1* | 1/2013 | Beamon et al. ....... 385/136 |
| 2013/0043069 A1* | 2/2013 | Okuyama ............. 174/659 |
| 2013/0146355 A1 | 6/2013 | Strasser et al. |
| 2013/0233597 A1* | 9/2013 | Suiter .................... 174/135 |
| 2013/0259428 A1 | 10/2013 | Isenhour et al. |
| 2013/0294735 A1 | 11/2013 | Burris et al. |

FOREIGN PATENT DOCUMENTS

| | | | |
|---|---|---|---|
| DE | 3900021 A1 | 10/1990 | |
| EP | 0110673 A1 | 6/1984 | |
| EP | 0124987 A2 | 11/1984 | |
| EP | 0251396 A1 | 1/1988 | |
| EP | 0320189 A2 | 6/1989 | |
| EP | 0320236 A2 | 6/1989 | |
| EP | 0511147 A1 | 10/1992 | |
| EP | 0512811 A1 | 11/1992 | |
| EP | 0514174 A1 | 11/1992 | |
| EP | 0620462 A1 | 10/1994 | |
| EP | 0646294 A1 | 4/1995 | |
| EP | 0805536 A1 | 11/1997 | |
| EP | 0844504 A2 | 5/1998 | |
| EP | 0851257 A1 | 7/1998 | |
| EP | 0903604 A2 | 3/1999 | |
| EP | 1138828 A2 | 10/2001 | |
| EP | 1361465 A1 | 11/2003 | |
| EP | 1380828 A1 | 1/2004 | |
| EP | 1012642 B1 | 12/2007 | ............... G02B 6/00 |
| FR | 2667955 A1 | 4/1992 | |
| FR | 2780209 A1 | 12/1999 | |
| FR | 2853775 A1 | 10/2004 | |
| GB | 1324177 A | 7/1973 | |
| GB | 2087170 A | 5/1982 | |
| GB | 2248729 A | 4/1992 | |
| JP | 58105114 A | 6/1983 | |
| JP | 60169813 A | 9/1985 | |
| JP | 60169815 A | 9/1985 | |
| JP | 61220536 A | 9/1986 | |
| JP | 6254204 | 3/1987 | |
| JP | 6259906 | 3/1987 | |
| JP | 63130317 | 6/1988 | |
| JP | 63136007 | 6/1988 | |
| JP | 63180915 | 7/1988 | |
| JP | 63200105 | 8/1988 | |
| JP | 63257701 | 10/1988 | |
| JP | 63287916 | 11/1988 | |
| JP | 1177709 A | 7/1989 | |
| JP | 1182802 A | 7/1989 | |
| JP | 1225240 A | 9/1989 | |
| JP | 1265211 A | 10/1989 | |
| JP | 4309906 | 2/1992 | |
| JP | 6027510 A | 2/1994 | |
| JP | 6127510 A | 5/1994 | |
| JP | 6181861 | 7/1994 | |
| JP | 6227312 A | 8/1994 | |
| JP | 6337317 | 12/1994 | |
| JP | 8114724 | 5/1996 | |
| JP | 915426 | 1/1997 | |
| JP | 10133033 A | 5/1998 | |
| JP | 2000241631 A | 9/2000 | |
| JP | 2002207127 A | 7/2002 | |
| JP | 2002233028 A | 8/2002 | |
| JP | 2003057512 | 2/2003 | |
| JP | 2003177254 A | 6/2003 | |
| JP | 2005338436 A | 12/2005 | |
| WO | 9105281 A1 | 4/1991 | |
| WO | 9110927 A1 | 7/1991 | |
| WO | 9326069 A1 | 12/1993 | |
| WO | 9507478 A1 | 3/1995 | |
| WO | 9523449 A1 | 8/1995 | |
| WO | 0206879 A1 | 1/2002 | |
| WO | 02093215 A2 | 11/2002 | |
| WO | 2004086112 A1 | 10/2004 | |
| WO | 2004095107 A1 | 11/2004 | |
| WO | 2005008307 A2 | 1/2005 | |
| WO | 2005050277 A2 | 6/2005 | |
| WO | 2005088373 A1 | 9/2005 | |
| WO | 2005119322 A1 | 12/2005 | |
| WO | 2006044080 A1 | 4/2006 | |
| WO | 2006050505 A1 | 5/2006 | |
| WO | 2006052355 A1 | 5/2006 | |
| WO | 2006076120 A1 | 7/2006 | |
| WO | 2006135524 A2 | 12/2006 | |
| WO | 2008118603 A2 | 10/2008 | |
| WO | 2009076536 A1 | 6/2009 | |
| WO | 2009089327 A2 | 7/2009 | |

OTHER PUBLICATIONS

Advisory Action for U.S. Appl. No. 12/323,373 mailed Oct. 22, 2010, 3 pages.

Final Office Action for U.S. Appl. No. 12/323,373 mailed Aug. 6, 2010, 7 pages.

Non-final Office Action for U.S. Appl. No. 12/323,373 mailed May 31, 2011, 6 pages.

Non-final Office Action for U.S. Appl. No. 12/323,373 mailed Feb. 3, 2010, 6 pages.

Non-final Office Action for U.S. Appl. No. 12/069,639 mailed Jun. 25, 2009, 10 pages.

Final Office Action for U.S. Appl. No. 12/069,639 mailed Jan. 28, 2009, 12 pages.

Non-final Office Action for U.S. Appl. No. 12/069,639 mailed Jul. 3, 2008, 10 pages.

Non-final Office Action for U.S. Appl. No. 11/285,130 mailed Jun. 20, 2006, 8 pages.

Final Office Action for U.S. Appl. No. 11/285,130 mailed Feb. 9, 2007, 10 pages.

Non-final Office Action for U.S. Appl. No. 12/323,373 mailed May 3, 2012, 7 pages.

Non-final Office Action for U.S. Appl. No. 11/901,800 mailed Mar. 13, 2009, 8 pages.

Non-final Office Action for U.S. Appl. No. 11/881,518 mailed Mar. 10, 2009, 7 pages.

Non-final Office Action for U.S. Appl. No. 11/804,452 mailed Nov. 13, 2008, 10 pages.

Non-final Office Action for U.S. Appl. No. 11/439,088 mailed Sep. 2, 2008, 14 pages.

Non-final Office Action for U.S. Appl. No. 11/432,570 mailed Apr. 10, 2007, 29 pages.

Non-final Office Action for U.S. Appl. No. 11/432,570 mailed Nov. 1, 2007, 23 pages.

(56) References Cited

OTHER PUBLICATIONS

Non-final Office Action for U.S. Appl. No. 11/432,570 mailed Aug. 19, 2008, 9 pages.
Non-final Office Action for U.S. Appl. No. 11/285,130 mailed Oct. 4, 2007, 9 pages.
Final Office Action for U.S. Appl. No. 11/285,130 mailed Jul. 9, 2008, 11 pages.
Advisory Action for U.S. Appl. No. 11/285,130 mailed Oct. 6, 2008, 3 pages.
Non-final Office Action for U.S. Appl. No. 11/285,130 mailed Jan. 23, 2009, 10 pages.
Final Office Action for U.S. Appl. No. 11/285,130 mailed Jul. 22, 2009, 11 pages.
Non-final Office Action for U.S. Appl. No. 12/082,330 mailed Jul. 25, 2008, 8 pages.
Non-final Office Action for U.S. Appl. No. 12/082,330 mailed Jan. 8, 2009, 9 pages.
Patent Cooperation Treaty, Annex to the Invitation to Pay Additional Fees, Communication Relating to the Results of the Partial International Search, International Application No. PCT/US07/012281 mailed Jul. 11, 2008, 4 pages.
Patent Cooperation Treaty, International Search Report for International Application No. PCT/US2008/004344, Aug. 19, 2008, 3 pages.
Patent Cooperation Treaty, International Search Report for International Application No. PCT/US2008/010766, Dec. 19, 2008, 3 pages.
Notice of Allowance for U.S. Appl. No. 11/804,452 mailed Oct. 6, 2009, 8 pages.
Notice of Allowance for U.S. Appl. No. 11/432,570 mailed Oct. 30, 2009, 4 pages.
Notice of Allowance for U.S. Appl. No. 11/432,570 mailed Apr. 16, 2009, 8 pages.
Supplemental Notice of Allowance for U.S. Appl. No. 11/285,130 mailed May 27, 2010, 4 pages.
Notice of Allowance for U.S. Appl. No. 11/285,130 mailed Mar. 9, 2010, 7 pages.
Notice of Allowance for U.S. Appl. No. 11/901,800 mailed Jan. 26, 2010, 8 pages.
Notice of Allowance for U.S. Appl. No. 11/901,800 mailed Sep. 25, 2009, 7 pages.
Notice of Allowance for U.S. Appl. No. 11/881,518 mailed Sep. 3, 2009, 8 pages.
Notice of Allowance for U.S. Appl. No. 11/439,088 mailed Feb. 18, 2009, 8 pages.
Notice of Allowance for U.S. Appl. No. 12/082,330 mailed Oct. 1, 2009, 6 pages.
Notice of Allowance for U.S. Appl. No. 11/804,452 mailed Jun. 10, 2009, 8 pages.
International Search Report for PCT/US06/44993 mailed Mar. 29 2007, 2 pages.
International Search Report for PCT/US10/53026 mailed Feb. 8, 2011, 3 pages.
International Search Report for PCT/US2007/12281 mailed Jul. 11, 2008, 4 pages.
International Search Report for PCT/US2008/04344 mailed Aug. 19, 2008, 3 pages.
International Search Report for PCT/US2008/10766 mailed Dec. 19, 2008, 3 pages.
International Search Report for PCT/US2009/057069 mailed Feb. 24, 2010, 2 pages.
Final Office Action for U.S. Appl. No. 12/323,373 mailed Feb. 17, 2012, 8 pages.
Notice of Allowance for U.S. Appl. No. 12/758,458 mailed Dec. 28, 2010, 8 pages.
Non-final Office Action for U.S. Appl. No. 12/758,458 mailed Sep. 3, 2010, 7 pages.
Notice of Allowance for U.S. Appl. No. 29/264,332 mailed Sep. 3, 2008, 6 pages.
Non-final Office Action for U.S. Appl. No. 29/264,332 mailed Apr. 22, 2008, 7 pages.
Notice of Allowance for U.S. Appl. No. 11/432,570 mailed Oct. 14, 2012, 6 pages.
Final Office Action for U.S. Appl. No. 12/323,373 mailed May 31, 2011, 6 pages.
Non-final Office Action for U.S. Appl. No. 12/323,373 mailed May 3, 2012, 13 pages.
Non-final Office Action for U.S. Appl. No. 13/206,157 mailed Apr. 11, 2013, 10 pages.
Final Office Action for U.S. Appl. No. 13/206,157 mailed Aug. 22, 2013, 9 pages.
Advisory Action for U.S. Appl. No. 13/206,157 mailed Nov. 12, 2013, 3 pages.
Advisory Action for U.S. Appl. No. 13/206,157 mailed May 14, 2014, 3 pages.
Non-final Office Action for U.S. Appl. No. 13/206,157 mailed Jun. 20, 2014, 8 pages.
Non-final Office Action for U.S. Appl. No. 13/657,030 mailed Apr. 24, 2014, 8 pages.
Final Office Action for U.S. Appl. No. 13/206,157 mailed Mar. 6, 2014, 10 pages.
Non-final Office Action for U.S. Appl. No. 13/282,498 mailed Jul. 22, 2013, 9 pages.
Final Office Action for U.S. Appl. No. 13/282,498 mailed Nov. 12, 2013, 12 pages.
Notice of Allowance for U.S. Appl. No. 13/282,498 mailed Mar. 4, 2014, 8 pages.
International Search Report for PCT/US2011/058023 mailed Feb. 14, 2012, 3 pages.
International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pages.
International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 19 pages.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Kagan, Val et al., "Recent Advances and Challenges in Induction Welding of Reinforced Nylon in Automotive Application," SAE Technical Paper, No. 2004-01-0733, Presented at SAE 2004 World Conference and Exhibition, Mar. 8-11, 2004, Detroit, Michigan, SAE International, 8 pages.
Monro, et al., "Holey Fibers with Random Cladding Distributions," Optics Letters, vol. 25, No. 4, Feb. 15, 2000, 3 pages.
Pickrell, et al., "Novel Techniques for the Fabrication of Holey Optical Fibers," SPIE Conference Proceedings, Fiber Optic Sensor Technology and Applications, vol. 4578, pp. 271-282, 2001.

* cited by examiner

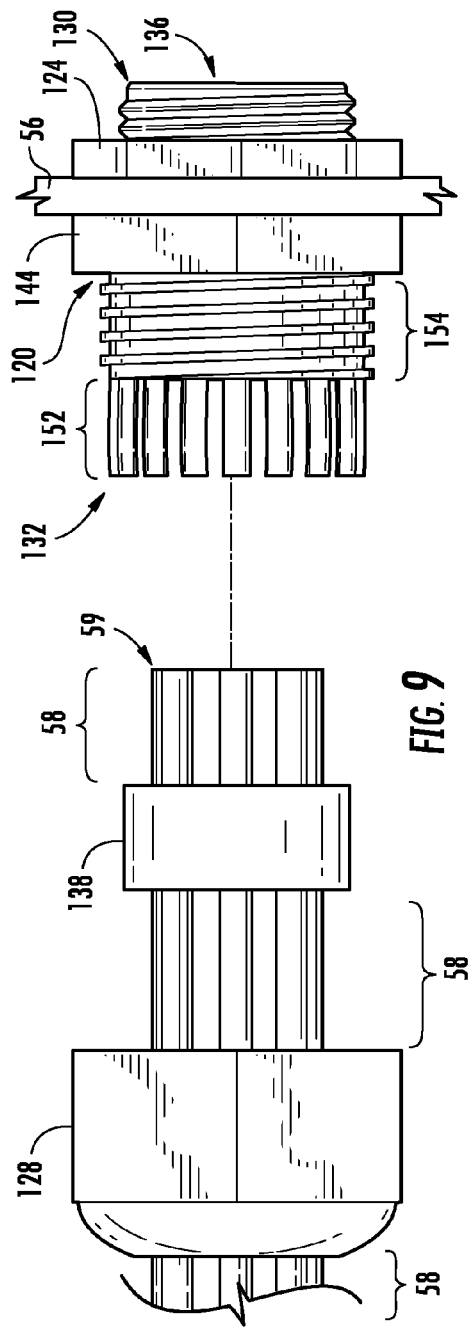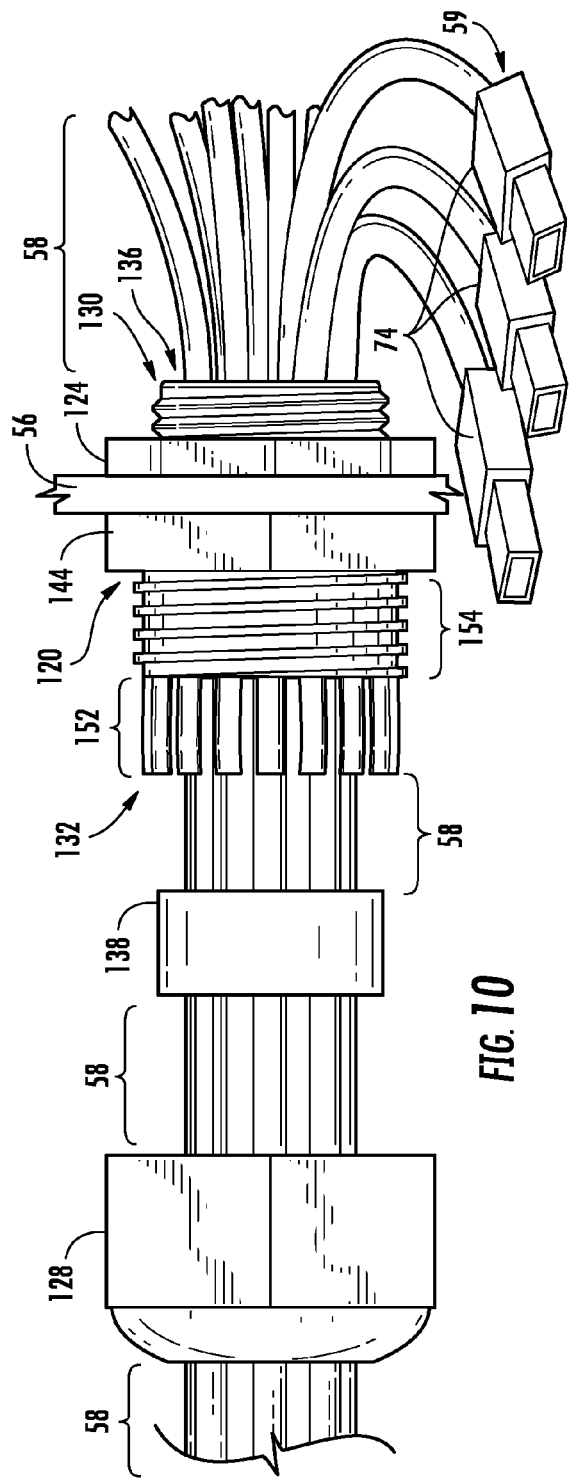

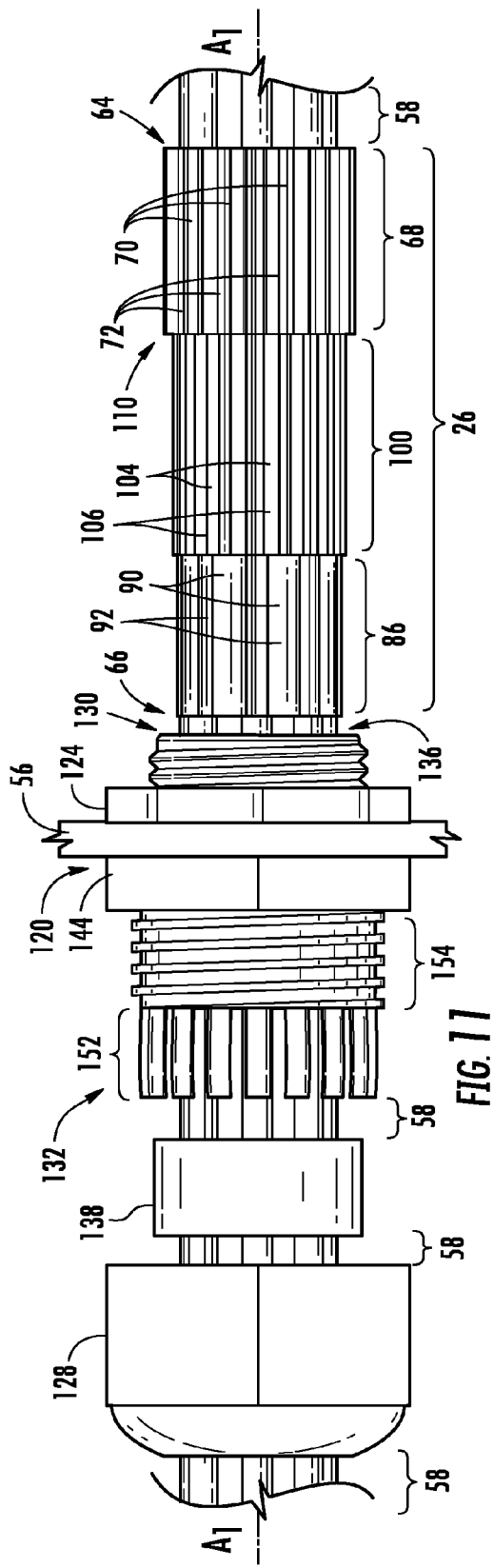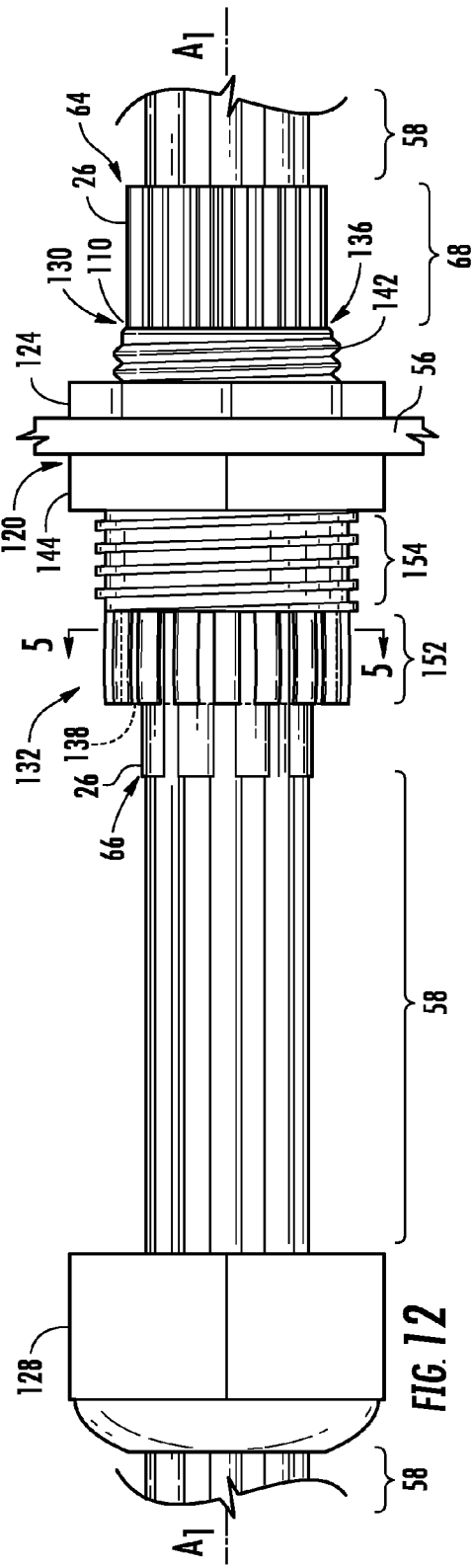

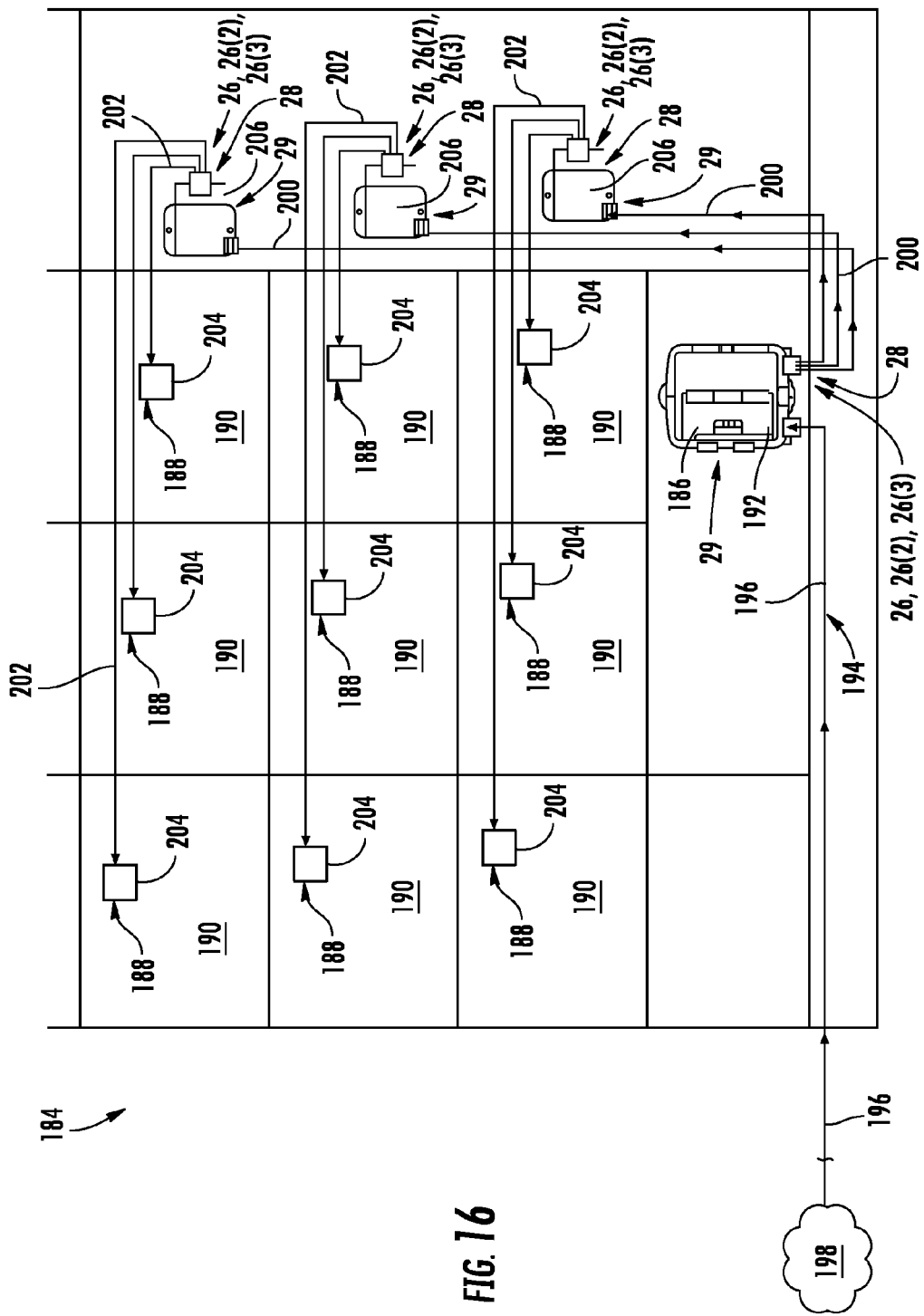

FIBER OPTIC ENCLOSURES EMPLOYING CLAMPING ASSEMBLIES FOR STRAIN RELIEF OF CABLES, AND RELATED ASSEMBLIES AND METHODS

BACKGROUND

1. Field of the Disclosure

The technology of the disclosure relates to fiber optic equipment, such as local convergence points (LCPs) and fiber distribution terminals (FDTs), and strain relief of fiber optic cables disposed therein which provide fiber optic connections to subscribers.

2. Technical Background

To provide improved performance to subscribers, communication and data networks are increasingly employing optical fiber. The benefits of optical fiber are well known and include higher signal-to-noise ratios and increased bandwidth. To further improve performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTx). In this regard, FIG. 1 illustrates an exemplary fiber optic network 10. The fiber optic network 10 in this example is a passive optical network (PON). A PON is a point-to-multipoint FTTx network architecture to enable an optical fiber to serve multiple premises. A PON configuration generally reduces the amount of optical fiber and central office equipment as compared with point-to-point optical network architectures.

The fiber optic network 10 in FIG. 1 provides optical signals from switching points 12 over a distribution network 13 comprised of fiber optic feeder cables 14. The switching points 12 include optical line terminals (OLTs) or forward lasers/return receivers 15 that convert electrical signals to and from optical signals. The optical signals may then be carried over the fiber optic feeder cables 14 to local convergence points (LCPs) 16. The LCPs 16 serve as consolidation points for splicing and making cross-connections and interconnections, as well as providing locations for optical couplers and splitters. The optical couplers and splitters in the LCPs 16 enable a single optical fiber to serve multiple subscriber premises 20. Fiber optic cables 18, such as distribution cables, exit the LCPs 16 to carry optical signals between the fiber optic network 10 and the subscriber premises 20. Typical subscriber premises 20 include single-dwelling units (SDU), multi-dwelling units (MDU), businesses, and/or other facilities or buildings. End subscribers in the subscriber premises 20 may contain network devices configured to receive electrical signals as opposed to optical signals. Thus, optical network terminals (ONTs) and/or optical network units (ONUs) 21 may be provided at the subscriber premises 20 to convert optical signals received over the fiber optic cables 18 to electronic signals.

Because LCPs 16 are typically configured to service multiple premises 20, the fiber optic cables 18 leaving the LCPs 16 are typically run to one or more intermediate fiber distribution terminals (FDTs) 22. FDTs 22 facilitate FTTx applications by providing network access points to the fiber optic network 10 to groupings of subscriber premises 20. Optical interconnections to the subscriber premises 20 are typically provided via indoor/outdoor drop cables 24 that are optically interconnected with the fiber optic cables 18 within the FDTs 22. The FDTs 22 may also provide a consolidated location for technicians or other installation personnel to make and protect splices and/or connections between the drop cables 24 and the fiber optic cables 18 as opposed to making splices and/or connections in sporadic locations.

A fiber optic enclosure may be part of a fiber optic terminal that may serve as a LCP 16 or FDT 22 in the fiber optic network 10 of FIG. 1. A cable fitting assembly may be attached around an opening of a wall of the fiber optic enclosure. The opening and cable fitting assembly provides a passageway for one or more fiber optic cables to travel between an outside and an inside of the fiber optic enclosure. Once outside, the fiber optic cables may be routed to the subscriber premises 20, for example, to support the multi-dwelling units.

The fiber optic cables exiting a fiber optic terminal may need strain relief as optical fiber movement may damage the cable or cause signal attenuation. Conventional fiber optic terminals have at least one strain relief mechanism inside the fiber optic enclosure to relieve strain in the separate fiber optic cables. Conventional mechanisms providing strain relief occupy valuable space in the fiber optic enclosure that could be used for additional fiber optic equipment.

SUMMARY OF THE DETAILED DESCRIPTION

Embodiments disclosed herein include fiber optic enclosures employing clamping assemblies for strain relief of cables, and related assemblies and methods. The fiber optic enclosures may be part of a fiber optic terminal in a fiber optic network. The fiber optic enclosures may include openings in the walls of the fiber optic enclosure. A cable fitting assembly may be attached to a portion of the wall around an opening to form a passageway for fiber optic cables to enter the fiber optic enclosure. An elongated member may be used to guide the fiber optic cables through the passageway. The elongated member may have a first end and second end. The elongated member may include a clamping assembly at the first end to provide strain relief to the fiber optic cables by clamping strength members of the fiber optic cables.

In one embodiment, an elongated member is disclosed for sealing off an opening located through an enclosure wall of a fiber optic enclosure. The fiber optic enclosure may have a plurality of fiber optic cables disposed therethrough. The elongated member may include a first end and a second end disposed opposite the first end along a longitudinal axis. The second end may be configured to guide a plurality of fiber optic cables into the opening of the enclosure. The elongated member may also include a strain relief portion disposed at the first end. The strain relief portion may include a plurality of recesses forming a plurality of openings. The plurality of recesses may be configured to each receive one of the plurality of fiber optic cables. Each of the plurality of recesses may be separated by one of a plurality of external surfaces and disposed parallel to the longitudinal axis. The elongated member may also include a clamping assembly. The clamping assembly may be configured to clamp strength members of the plurality of fiber optic cables. This embodiment may provide strain relief to the fiber optic cables through the strength members and thereby may reduce damage to the fiber optic cables.

In another embodiment, a cable fitting assembly for an opening of a fiber optic enclosure is disclosed. The cable fitting assembly may include a cable fitting and an elongated member. The cable fitting assembly may include an elongated cable fitting body including a first cable fitting end. The first cable fitting end may comprise a first threaded portion. The first cable fitting end may also comprise a second cable fitting end opposite the first cable fitting end. The first cable fitting end may also include an orifice disposed therethrough from the first cable fitting end to the second cable fitting end. The orifice may be configured to receive a plurality of fiber optic cables. The first cable fitting end may also include a cable fitting base that may be disposed between a first fitting end and a second fitting end. The cable fitting base may comprise a base wall surface configured to form a contact area on a surface around an orifice of an enclosure wall. The cable fitting base may also include a clamping mechanism. The cable fitting base may also include a locknut including a threaded orifice and locknut bushing surface.

As part of this embodiment, the locknut may be configured to be removeably attached to the first cable fitting end and may be configured to pull the base wall surface against the contact area. The elongated member may include a first end and a second end. The first end may be disposed within the orifice of the elongated cable fitting body. The first end may also be opposite a second end along a longitudinal axis. The elongated member may also include a strain relief portion disposed at the first end. The strain relief portion may include a plurality of recesses forming a plurality of openings that are configured to each receive one of the plurality of fiber optic cables. Each of the plurality of recesses may be separated by one of a plurality of external surfaces and disposed parallel to the longitudinal axis. The elongated member may also include a clamping assembly disposed at the first end. The clamping assembly may be configured to clamp strength members of the plurality of fiber optic cables. This embodiment may provide strain relief to the plurality of fiber optic cables exiting through the opening of the fiber optic enclosure and thereby may reduce signal attenuation for signals traveling over the plurality of fiber optic cables.

In another embodiment, a method is disclosed for installing a cable fitting assembly with a plurality of fiber optic cables into an opening of a fiber optic enclosure. This method may include inserting a first cable fitting end of an elongated cable fitting body through an opening of a fiber optic enclosure and securing the first cable fitting end to the fiber optic enclosure with a locknut. Next, the method may also include inserting an end of the plurality of fiber optic cables through an orifice of the elongated cable fitting body. The method may also include receiving a threaded bushing through a bushing opening and into a bushing bore disposed at a first end of an elongated member. Next, the method may include stripping the plurality of fiber optic cables from the end of the fiber optic cables to a transition point and separating strength members of the plurality of fiber optic cables from optical fibers of the plurality of fiber optic cables. Next, the method may also include creating a strength member gap. The method may also include receiving the plurality of fiber optic cables through a plurality of openings into a plurality of recesses in a strain relief portion disposed at the first end of the elongated member. Each of the plurality of recesses may be separated by one of a plurality of external surfaces and disposed parallel to the longitudinal axis. The method may also include engaging a clamping assembly. This embodiment may provide an efficient manner to provide strain relief for the plurality of fiber optic cables installed into the opening of the fiber optic enclosure.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 9 is a side view showing a sealing ring and the compression cap of FIG. 4A being slid onto the plurality of fiber optic cables;

FIG. 10 is a side view showing the plurality of fiber optic cables of FIG. 4A being inserted through the elongated cable fitting body of FIG. 3A;

FIG. 11 is a side view showing the plurality of fiber optic cables being received into the elongated member of FIG. 4A;

FIG. 12 is a side view showing the sealing portion of elongated cable fitting body inserted through the elongated cable fitting body of FIG. 4A;

FIG. 16 depicts an exemplary MDU that includes fiber optic terminals that include local convergence points (LCPs) and fiber distribution terminals (FDTs) providing connectivity of end subscribers to the fiber optic network using the elongated member of the cable fitting assembly depicted in FIG. 4A;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include fiber optic enclosures employing clamping assemblies for strain relief cables, and related assemblies and methods. The fiber optic enclosures may be part of a fiber optic terminal in a fiber optic network. The fiber optic enclosures may include openings in the walls of the fiber optic enclosure. A cable fitting assembly may be attached to a portion of the wall around an opening to form a passageway for fiber optic cables to enter the fiber optic enclosure. An elongated member may be used to guide the fiber optic cables through the passageway. The elongated member may have a first end and second end. The elongated member may include a clamping assembly at the first end to provide strain relief to the fiber optic cables by clamping strength members of the fiber optic cables.

Figure 1:
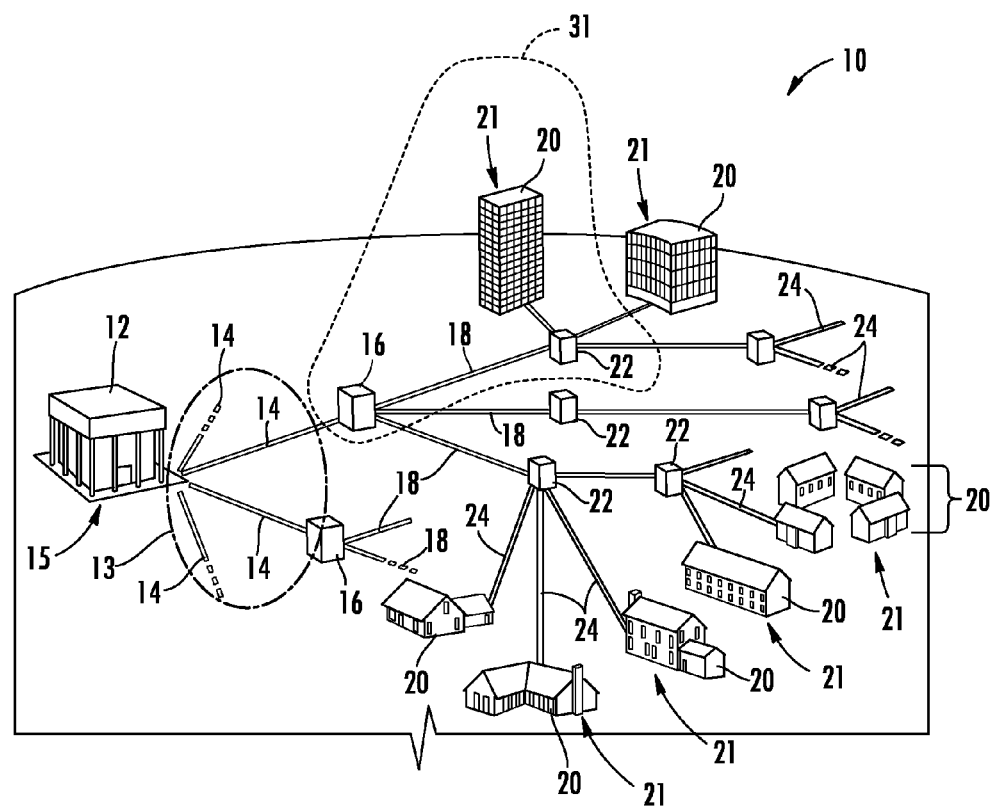
FIG. 1 illustrates an exemplary passive optical network (PON) in the prior art including an exemplary multi-dwelling unit (MDU) that includes optical network terminals (ONTs) and optical network units (ONUs) for converting electrical signals to optical signals, and vice versa, and fiber optic terminals for carrying optical signals over a fiber optic network.
Figure 2:
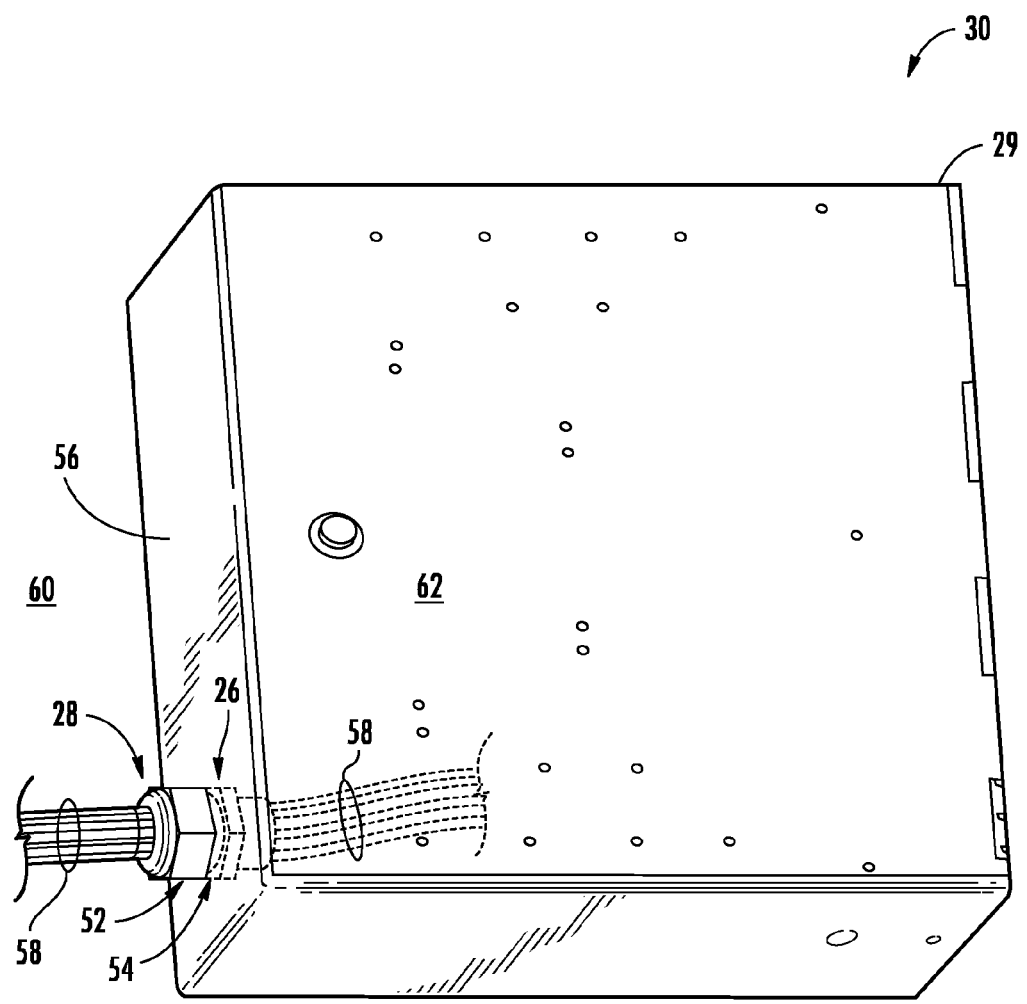
FIG. 2 illustrates an exemplary fiber optic terminal that may be employed with a cable fitting including an exemplary elongated member.

FIG. 2 shows a fiber optic enclosure 29 as part of a fiber optic terminal 30. The fiber optic terminal 30 may serve as a local convergence point (LCP) or a fiber optic distribution terminal (FDT) in a fiber optic network, as non-limiting examples. A cable fitting assembly 28 may be attached to a contact surface 52 around an opening 54 of a wall 56 of the fiber optic enclosure 29. The cable fitting assembly 28 may include an elongated member 26 (discussed later) to provide strain relief and/or sealing against contamination. The opening 54 provides a passageway for a plurality of fiber optic cables 58 to travel between an outside 60 and an inside 62 of the fiber optic enclosure 29. The opening 54 may be made during initial manufacturing or later during installation by removing "knockout" material by, for example, cutting or applying force.

The fiber optic terminals 30 provide convenient access points in a telecommunications or data network for a field technician to install and reconfigure optical fiber connections between network-side and subscriber-side fiber optic cables. The fiber optic terminals 30 are configured to allow one or more optical fibers provided in one or more network-side or upstream fiber optic cables, for example feeder cables, to be easily and readily interconnected with one or more optical fibers in one or more subscriber-side or downstream fiber optic cables, for example drop cables. By the term "subscriber-side," it is meant that optical fiber, fiber optic cable, or optical connection, as the case may be, is provided anywhere between the end subscriber and the fiber optic terminals 30. A subscriber-side fiber optic cable, optical fiber, or optical connection may be provided directly to an end subscriber or may be provided to one or more intermediate optical terminals or components before reaching an end subscriber. By the term "network-side," it is meant that the optical fiber, fiber optic cable, or optical connection, as the case may be, is provided between a fiber optic network, central switching point, central office, head end, or the like and the fiber optic terminals 30.

Sealing the fiber optic enclosure 29 from outside water and other contaminants is an important consideration for the fiber optic networks. Mold, water, and other contaminants could over time enter the fiber optic terminals and degrade the performance of the fiber optic equipment inside. The fiber optic terminals 29 with a fiber optic cable exiting an opening are relatively straightforward to seal. An opening 54 may be created in the outer wall 56 of the fiber optic terminal 29 consistent with a standard fiber optic cable size and cable fittings that are commercially available. The cable fitting may be configured to attach to the outer wall 56 and through the opening 54, and clamp a circular seal ring around the outer jacket of the fiber optic cable. Multiple optical fibers may be "broken-out" from the outer jacket at a fiber optic terminal 30 closer to a group of the subscriber premises 20, so that they may travel to separately to each of the subscriber premises 20.

In the case of subscriber-side fiber optic cables 46 that are not enclosed in a common outer cable jacket when exiting the opening 54, one solution has been to utilize cable fittings used for fiber optic cables having outer jackets. In this instance, each of the loose fiber optic cables can be inserted through separate longitudinal holes disposed inside a flexible cylinder member. The flexible cylinder member can be inserted into the cable fitting assembly 28 to facilitate providing an outer surface to create a seal. The inner diameters of the longitudinal holes are sized to allow the fiber optic cables to fit therethrough without gaps that would be incompatible with sealing. However, by this arrangement, cables that are pre-connectorized cannot be disposed through the longitudinal holes of the cylinder member, because the connectors cannot fit through the longitudinal holes. A solution would be to increase the inner diameter of the longitudinal holes of the cylinder member to accommodate the connectors. However, the effective sealing capability is reduced because of unacceptable gap spacing between the outer diameter of the fiber optic cable and the inner diameter of the longitudinal holes.

Further, the fiber optic cables 58 entering a fiber optic terminal 30 may need strain relief as part of bend radius management and optical fiber movement that can damage the cable or cause signal attenuation. Conventional fiber optic terminals have at least one strain relief mechanism (not shown) inside the fiber optic enclosure to relieve strain in the separate fiber optic cables. Strain relief mechanisms occupy valuable space in the fiber optic enclosure that could be used for additional fiber optic equipment, but the strain relief mechanisms are beneficial because they resist longitudinal forces placed on the fiber optic cables. Thus, there is an unmet need to provide strain relief capability without occupying as much valuable space in the fiber optic terminal.

Figure 3A:
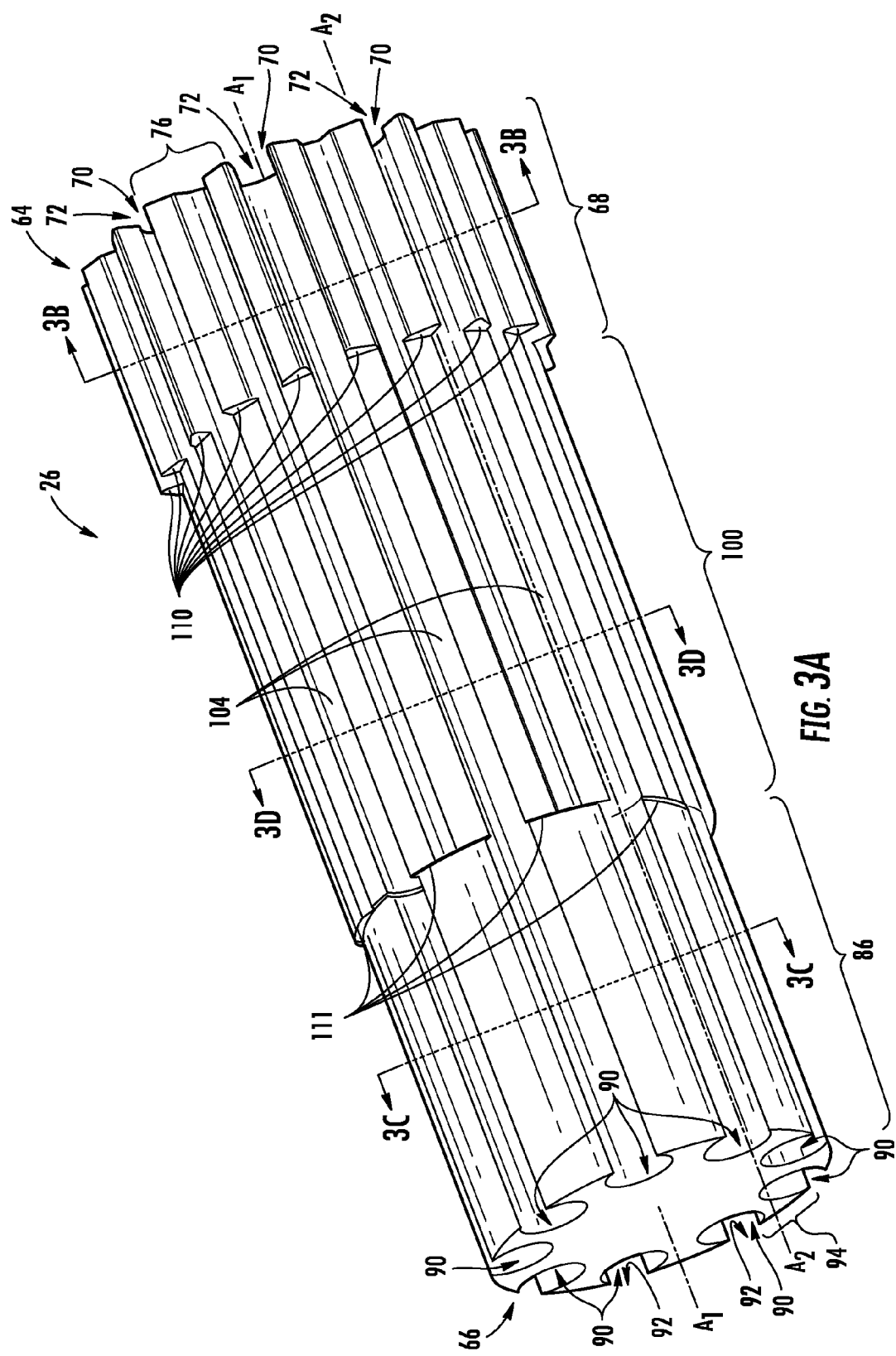
FIG. 3A is a side view of an exemplary elongated member for providing sealing and/or strain relief for multiple fiber optic cables disposed through an opening of a fiber optic terminal.

In this regard, FIG. 3A is a side view of the exemplary elongated member 26 for providing sealing and/or strain relief for multiple fiber optic cables disposed through an opening of a fiber optic terminal, such as fiber optic terminal 30 in FIG. 2 as an example. FIG. 3A illustrates a perspective close-up view of the elongated member 26 including a first end 64 and a second end 66 disposed opposite the first end 64 along a longitudinal axis $A_1$. A strain relief portion 68 may be disposed at the first end 64 and may serve to reduce the strain on each of the plurality of fiber optic cables 58 by securely attaching them to the elongated member 26 and resisting longitudinal movement of the plurality of fiber optic cables 58. The strain relief portion 68 may effectively resist longitudinal forces of up to ten (10) pounds on the plurality of fiber optic cables 58 by applying sufficient forces normal to the longitudinal axis of each the plurality of fiber optic cables 58 thereby preventing optical fiber movement within outer cable jackets (not shown). Optical fiber movement may cause undesirable effects, for example, signal attenuation and/or breakage. The strain relief portion 68 may effectively resist longitudinal forces of over ten (10) pounds on the plurality of fiber optic cables 58 by a use of a circular clamp (discussed later).

Figure 3B:
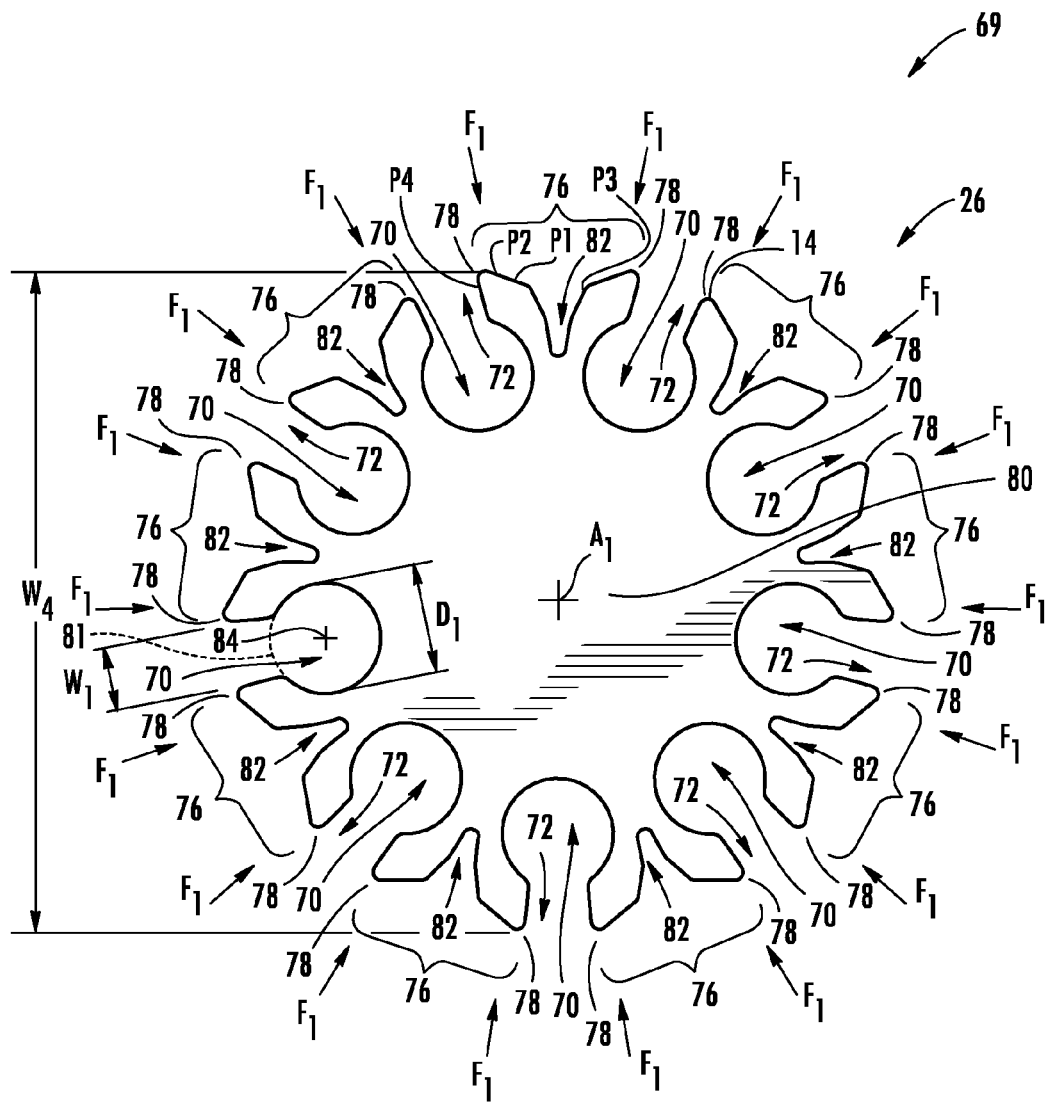
FIG. 3B is a cross-section of a strain relief portion of the elongated member of FIG. 3A.

As shown in a cross-section 69 of the strain relief portion 68 perpendicular to the longitudinal axis in FIG. 3B, the strain relief portion 68 includes a plurality of recesses 70 forming a plurality of openings 72 configured to each receive one of the plurality of fiber optic cables 58. The plurality of fiber optic cables 58 may be received into the plurality of recesses 70 through the plurality of openings 72 in a direction substantially perpendicular to the longitudinal axis $A_1$ as opposed to sliding the plurality of fiber optic cables 58 longitudinally through the plurality of recesses 70. Sliding the plurality of fiber optic cables 58 may not be feasible if the plurality of fiber optic cables 58 have connectors 74 (shown later in FIG. 10) which would be too wide to slide in a longitudinal direction through the plurality of recesses 70. Each of the plurality of recesses 70 may be separated by one of a plurality of external surfaces 76 and may be disposed or orientated parallel to the longitudinal axis $A_1$.

In the embodiment of the elongated member 26 depicted in FIG. 3A, each of the plurality of external surfaces 76 has at least one extension member 78, and specifically two (2) extension members 78. Each of the at least one extension member 78 in FIG. 3B extends away from the interior 80 of the strain relief portion 68, thus the points on the plurality of the external surfaces 76 cannot be equidistant to the longitudinal axis $A_1$. For example, as depicted in FIG. 3B, points $P_1$, $P_2$, $P_3$, and $P_4$ are not equidistant from the longitudinal axis $A_1$ but are on two of the at least one extension members 78 and therefore also on the plurality of external surfaces 76. Each of the at least one extension member 78 are configured to at least partially close one of the plurality of openings 72 when subject to a plurality of inward-facing forces $F_1$ directed towards an interior 80 of the strain relief portion 68.

One or more of the plurality of external surfaces 76 may include at least one groove 82 as depicted in FIG. 3B. The at least one groove 82 may provide more flexibility to the plurality of external surfaces 76, and particularly to the at least one extension member 78, to enable the plurality of fiber optic cables 58 to be more easily received through the plurality of openings 72 to be disposed in the plurality of recesses 70.

Each of the plurality of recesses 70 may include a circular-shaped cross-section 81 having a diameter $D_1$ and a center 84, The circular-shaped cross-section 81 may enable the plurality of recesses 70 to better fit the contour of a circular-shaped cross section of each of the plurality of fiber optic cables 58 (discussed later) and thereby improve strain relief by preventing slippage of plurality of fiber optic cables 58.

The diameter $D_1$ of the circular-shaped cross-section 81 may be sized for the particular cable size that will be received. Currently, the plurality of fiber optic cables 58 having diameters of 4.8 millimeters or 1.6 millimeters are in wide use at multi-dwelling unit (MDU) installations. In the embodiment shown in FIG. 3B, the diameter $D_1$ may be 4.8 millimeters to 4.5 millimeters and thereby may be approximately up to 6% smaller than the nominal diameter of the plurality of fiber optic cables 58. The elongated member 26 may include the plurality of recesses 70 that each have diameters $D_1$ of a same length to accommodate a single cable diameter distance or various lengths to accommodate the plurality of fiber optic cables 58 comprising a variety of different cable diameters for the elongated member 26.

The plurality of recesses 70 in the embodiment of the elongated member 26 shown in FIG. 3B comprises nine (9) recesses 70. The quantity of recesses 70 in the elongated member may vary.

Each of the plurality of openings 72 may include a width $W_1$. The width $W_1$ may be a minimum width within a cross-section 69 of each of the plurality of openings 72. For each of the plurality of openings 72, the width $W_1$ may be of a smaller distance than the diameter $D_1$ of the circular-shaped cross-section 81 of the plurality of recesses 70. The plurality of fiber optic cables 58 may be held more tightly in the plurality of recesses 70 if the width $W_1$ is of the smaller distance.

The strain relief portion 68 may be made of a strong, resilient material, for example, a thermoplastic, thermoplastic elastomer or a thermoplastic polyester elastomer. The cross-section 69 of the strain relief portion 68 may remain unchanged parallel to the longitudinal axis $A_1$ to enable the strain relief portion 68 to be manufactured using an extrusion process (not shown). The strain relief portion 68 may also be manufactured via an injection molding or casting process.

With continuing reference to FIG. 3A, a sealing portion 86 may be disposed at the second end 66 of the elongated member 26 and may serve to seal the opening 54 of the wall 56 of the fiber optic enclosure 29. The sealing portion 86 may allow the cable fitting assembly 28 to be at least compliant to the industry-standard Telecordia® GR-3123 water intrusion requirements by resisting water from fire sprinkler heads from entering the inside 62 of the fiber optic enclosure 29 from the outside 60. Water entry into the fiber optic enclosure 29 may have undesirable effects, for example, mold growth or corrosion.

Figure 3C:
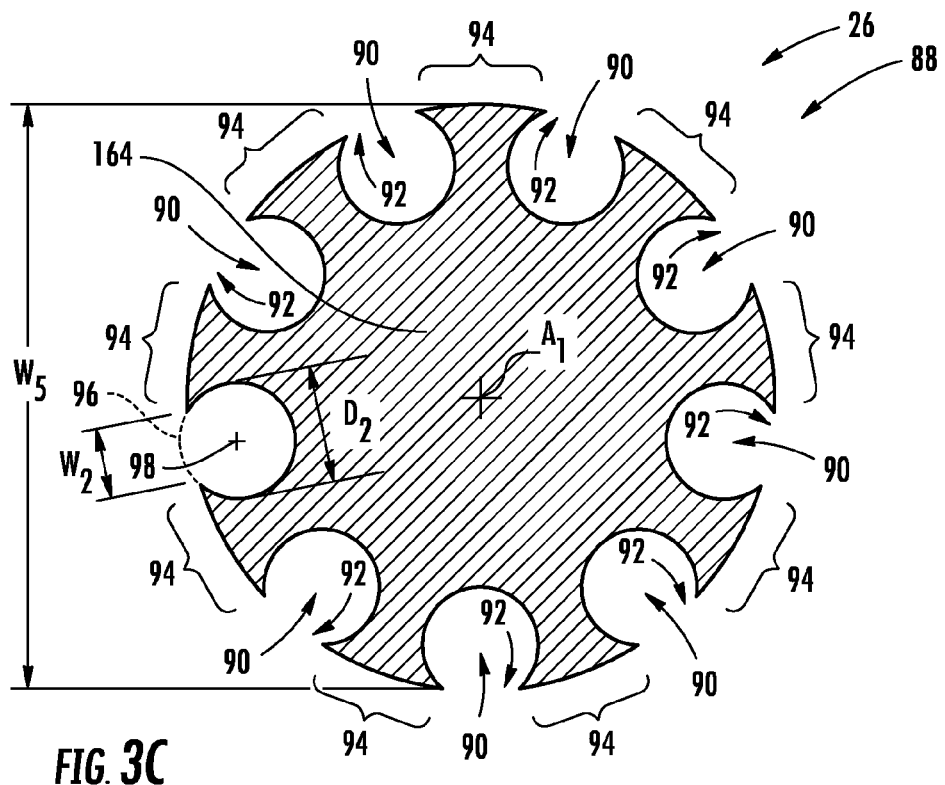
FIG. 3C is a cross-section of a sealing portion of the elongated member of FIG. 3A.

As shown in a cross-section 88 of the sealing portion 86 perpendicular to the longitudinal axis $A_1$ in FIG. 3C, the sealing portion 86 includes a plurality of second recesses 90 forming a plurality of second openings 92 configured to each receive one of the plurality of fiber optic cables 58. The plurality of fiber optic cables 58 may be received into plurality of second recesses 90 through the plurality of second openings 92 in a direction substantially perpendicular to the longitudinal axis $A_1$ as opposed to sliding the plurality of fiber optic cables 58 longitudinally through the plurality of second recesses 90. Sliding the plurality of fiber optic cables 58 longitudinally may not be feasible if the plurality of fiber optic cables 58 have the connectors 74 (shown later in FIG. 10) which would be too wide to slide in a longitudinal direction through the plurality of second recesses 90. Each of the plurality of second recesses 90 may be separated by one of a plurality of second external surfaces 94 and may be disposed or orientated parallel to the longitudinal axis $A_1$.

The plurality of second external surfaces 94 may or may not be equidistant to the longitudinal axis $A_1$. In the exemplary embodiment of the elongated member 26 depicted in FIGS. 3A and 3C, each of the plurality of second external surfaces 94 may be equidistant to the longitudinal axis $A_1$.

Each of the plurality of second recesses 90 may include a circular-shaped cross-section 96 having a diameter $D_2$ and a center 98. The circular-shaped cross-section 96 may enable the plurality of second recesses 90 to better fit the contour of a circular-shaped cross section of each of the plurality of fiber optic cables 58 (discussed later) and thereby better prevent the passage of water or contaminants past the plurality of fiber optic cables 58 and into the fiber optic enclosure 29.

The diameter $D_2$ may be sized for the particular cable size that will be received. Currently, the plurality of fiber optic cables 58 having a diameter of 4.8 millimeters or 1.6 millimeters are in wide use at multi-dwelling unit (MDU) installations. In the embodiment shown in FIG. 3C, the diameter $D_2$ may be 4.8 millimeters to 4.5 millimeters and thereby may be approximately up to 6% smaller than the nominal diameter of the plurality of fiber optic cables 58. The elongated member 26 may include the plurality of second recesses 90 that each have diameters $D_2$ of a same length to accommodate a single cable diameter or various distances to accommodate the plurality of fiber optic cables 58 comprising a variety of different cable diameters for the elongated member 26.

The plurality of second recesses 90 in the embodiment of the elongated member 26 shown in FIG. 3C comprises nine (9) second recesses 90. The quantity of second recesses 90 in the elongated member 26 may vary.

Each of the plurality of second openings 92 may include a width $W_2$. The width $W_2$ may be a minimum width within a cross-section 88 of each of the plurality of second openings 92. For each of the plurality of second openings 92, the width $W_2$ may be of a smaller distance than the diameter $D_2$ of the circular-shaped cross-section 96 of the plurality of second recesses 90. The plurality of fiber optic cables 58 may be held more tightly in the plurality of second recesses 90 if the width $W_2$ is of the smaller distance.

The sealing portion 86 may be made of a strong, resilient material, for example, a thermoplastic, thermoplastic elastomer or a thermoplastic polyester elastomer. The cross-section 88 of the sealing portion 86 may remain unchanged parallel to the longitudinal axis $A_1$ to enable the sealing portion 86 to be manufactured using an extrusion process (not shown). The sealing portion 86 may also be manufactured via an injection molding or casting process.

With continuing reference to FIG. 3A, an intermediate portion 100 (see FIG. 3A) may be disposed between the strain relief portion 68 and the sealing portion 86. The intermediate portion 100 may serve to both guide the plurality of fiber optic cables 58 between the plurality of recesses 70 of the strain relief portion 68 and the plurality of second recesses 90 of the sealing portion 86, and to connect the strain relief portion 68 to the sealing portion 86.

Figure 3D:
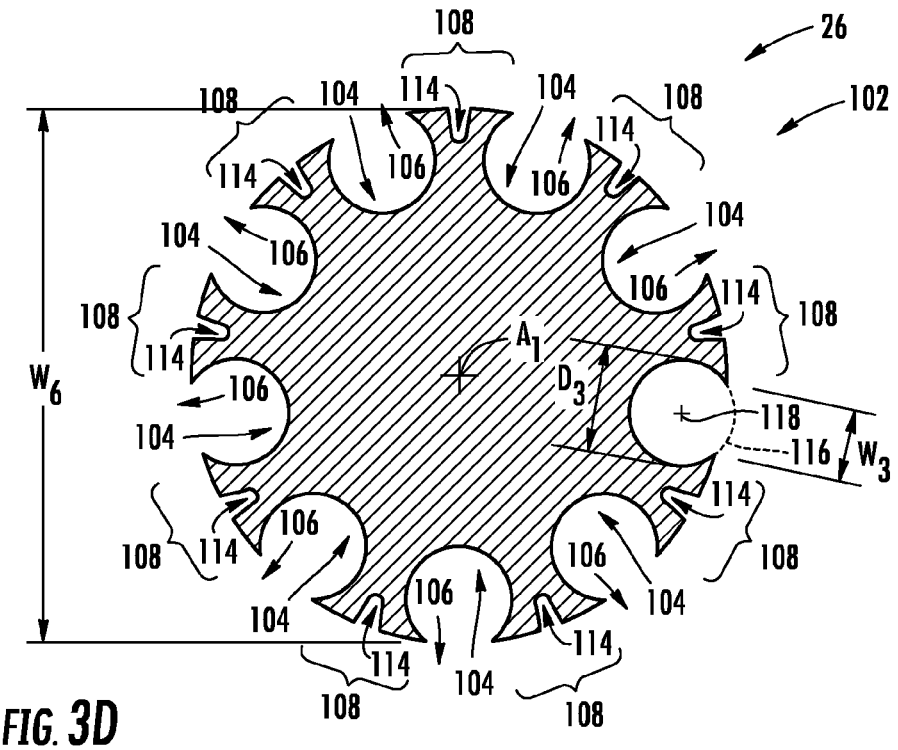
FIG. 3D is a cross-section of an intermediate portion of the elongated member of FIG. 3A.

As shown in a cross-section 102 of the intermediate portion 100 perpendicular to the longitudinal axis $A_1$ in FIG. 3D, the intermediate portion 100 includes a plurality of third recesses 104 forming a plurality of third openings 106 configured to each receive one of the plurality of fiber optic cables 58. The plurality of fiber optic cables 58 may be received into plurality of third recesses 104 through the plurality of third openings 106 in a direction substantially perpendicular to the longitudinal axis $A_1$ as opposed to sliding the plurality of fiber optic cables 58 longitudinally through the plurality of third recesses 104. Sliding the plurality of fiber optic cables 58 longitudinally may not be feasible if the plurality of fiber optic cables 58 have the connectors 74 (shown later in FIG. 10) which would be too wide to slide in a longitudinal direction through the plurality of third recesses 104. Each of the plurality of third recesses 104 may be separated by one of a plurality of third external surfaces 108 and may be disposed or orientated parallel to the longitudinal axis $A_1$.

As depicted in FIGS. 3A, 3B and 3D, a width $W_4$ of the cross-section 69 of the strain relief portion 68 may be wider than a width $W_6$ of the cross-section 102 of the intermediate portion 100. This difference enables the plurality of external surfaces 76 and the plurality of third external surfaces 108 to be attached to a plurality of shoulder surfaces 110 (see FIG. 3A). The plurality of shoulder surfaces 110 may be disposed between the strain relief portion 68 and the intermediate portion 100 and may partially face longitudinally toward the second end 66 of the elongated member 26. Likewise, as depicted in FIGS. 3A, 3C and 3D, a width $W_6$ of the cross-section 102 of the intermediate portion 100 may be wider than a width $W_5$ of the cross-section 88 of the sealing portion 86. This difference enables the plurality of second external surfaces 94 and the plurality of third external surfaces 108 to be attached to a plurality of second shoulder surfaces 111. The plurality of second shoulder surfaces 111 (see FIG. 3A) may be disposed between the sealing portion 86 and the intermediate portion 100 and may partially face longitudinally toward the second end 66 of the elongated member 26.

The plurality of shoulder surfaces 110 and plurality of second shoulder surfaces 111 may be utilized to position the elongated member 26 within the cable fitting assembly 28, and to prevent the elongated member 26 from being pulled out of the cable fitting assembly 28 attached to the fiber optic enclosure 29 (discussed later) to the outside by a tensile force on the plurality of fiber optic cables 58 directed away from the fiber optic enclosure 29.

As shown in FIG. 3D, one or more of the plurality of third external surfaces 108 may include at least one second groove 114. The at least one second groove 114 may provide more flexibility to the plurality of third external surfaces 108 to enable the plurality of fiber optic cables 58 to be more easily received through the plurality of third openings 106 to be disposed in the plurality of third recesses 104.

Each of the plurality of third recesses 104 may include a circular-shaped cross-section 116 having a diameter $D_3$ and a center 118. The circular-shaped cross-section 116 may enable the plurality of third recesses 104 to better fit the contour of a circular-shaped cross section of each of the plurality of fiber optic cables 58 (discussed later) and thereby improve strain relief by preventing slippage of plurality of fiber optic cables 58.

The diameter $D_3$ may be sized for the particular cable size that will be received and thereby may be approximately up to 6% smaller than the nominal diameter of the plurality of fiber optic cables 58.

Each of the plurality of third openings 106 may include a width $W_3$. The width $W_3$ may be a minimum width within a cross-section 102 of each of the plurality of third openings 106. For each of the plurality of third openings 106, the width $W_3$ may be of a smaller distance than the diameter $D_3$ of the circular-shaped cross-section 116 of the plurality of third recesses 104. The plurality of fiber optic cables 58 may be held more tightly in the plurality of third recesses 104 if the width $W_3$ is of the smaller distance.

The intermediate portion 100 may be made of a strong, resilient material, for example, a thermoplastic, thermoplastic elastomer or a thermoplastic polyester elastomer. The cross-section 102 of the intermediate portion 100 may remain unchanged parallel to the longitudinal axis $A_1$ to enable the intermediate portion 100 to be manufactured using an extrusion process (not shown) using these or other materials.

The plurality of recesses 70, plurality of second recesses 90, and the plurality of third recesses 104 may be aligned to permit the plurality of fiber optic cables 58 to be received by all of these recesses as depicted by longitudinal axis $A_2$ in FIG. 3A. The diameter $D_1$, diameter $D_2$, and diameter $D_3$ may be equal. Further, each of the plurality of recesses 70, the plurality of second recesses 90, and the plurality of third recesses 104 may be configured to maintain each of the plurality of fiber optic cables 58 equidistant from the longitudinal axis $A_1$ between the first end 64 and the second end 66 (as shown later in FIG. 11).

Finally, the outer diameter $W_6$ of the intermediate portion 100 may be less than the outer diameter $W_4$ of the strain relief portion 68 and greater than the outer diameter $W_5$ of the sealing portion 86. The difference in outer diameters may permit the elongated member from being pulled out through an orifice (introduced later as orifice 136) of the cable fitting assembly 28, which has a smaller inner diameter than the outer diameter of the strain relief portion 68.

Figure 4A:
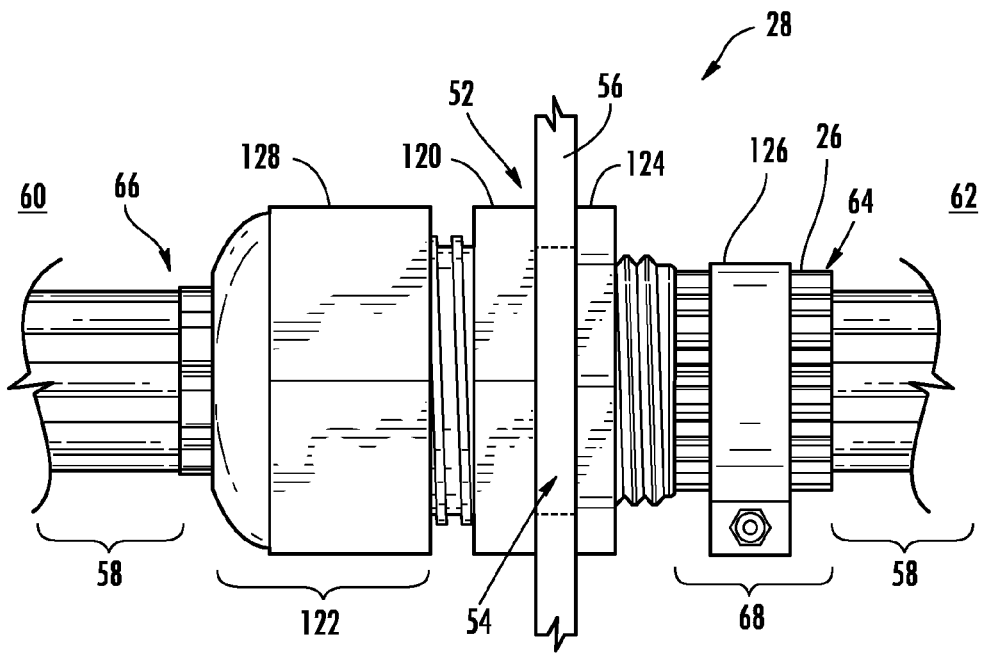
FIG. 4A is a side view of the cable fitting assembly containing the elongated member of FIG. 3A.

FIG. 4A depicts the cable fitting assembly 28 and the elongated member 26 for the opening 54 in the wall 56 of the fiber optic enclosure 29. The cable fitting assembly 28 may include an elongated cable fitting body 120, clamping mechanism 122, locknut 124, and circular clamp 126. In one embodiment, the elongated cable fitting body 120 and the clamping mechanism 122 may both be commercially available as a non-metallic cable gland, catalog number CC-NPT1-B, from the Thomas & Betts Corporation, headquartered in Memphis, Tenn. The locknut 124 may be a locknut designated as catalog number LN503, also commercially available from the Thomas & Betts Corporation.

The plurality of fiber optic cables 58 may enter the cable fitting assembly 28 from outside 60 the fiber optic enclosure 29 and exit inside 62 of the wall 56 of the fiber optic enclosure 29. The first end 64 and the second end 66 of the elongated member 26 may be disposed in the inside 62 and outside 60 of the wall 56, respectively. The second end 66 of the elongated member 26 may extend out of a compression cap 128 of the clamping mechanism 122. A circular clamp 126 may be secured to the strain relief portion 68 of the elongated member 26.

Note that in FIG. 4A, the plurality of individual fiber optic cables 58 are provided that are not disposed inside a single, common outer jacket or sheath to form a single fiber optic cable. However, in other embodiments, the fiber optic cables 58 could represent optical fibers that are disposed in a single cable jacket or sheath to form a fiber optic cable, with the fiber optic cables 58 broken out from an outer jacket or sheath of a fiber optic cable. The optical fibers may be disposed in individual jackets, sheaths, and/or outer coatings. The cross-section of each of the plurality of fiber optic cables 58 may be circular-shaped. The elongated member 26 could be provided to receive optical fibers broken out from an outer jacket or sheath of a fiber optic cable as discussed herein for the fiber optic cables 58. In this regard, fiber optic cables, including fiber optic cables 58 described herein as being received in the elongated member 26, also means that the fiber optic cables 58 could be individual optical fibers, jacketed or not, and coated or not.

Figure 4B:
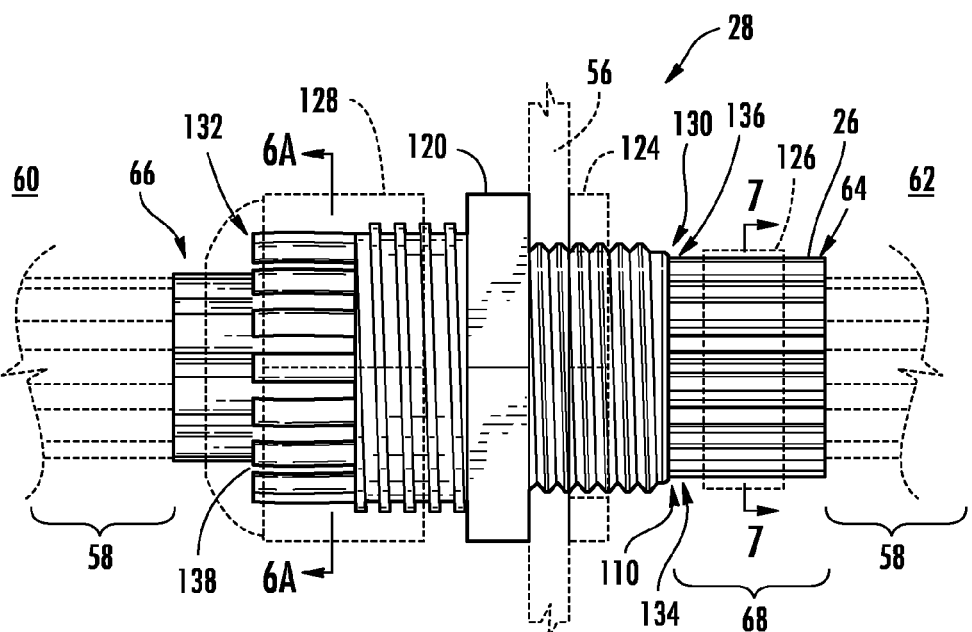
FIG. 4B is a partial cutaway side view of the cable fitting assembly containing the elongated member of FIG. 4A.

FIG. 4B illustrates a cutaway side view of the cable fitting assembly 28 showing a relative position of the elongated member 26 with respect to the elongated cable fitting body 120. Both the first cable fitting end 130 and the second cable fitting end 132 may be disposed between the first end 64 and second end 66 of the elongated member 26. This orientation permits the elongated cable fitting body 120 to serve as a platform to support the sealing and strain relief functions of the elongated member 26 and also to secure the elongated member 26 to the wall 56. The relative position may be determined by the plurality of shoulder surfaces 110 which are configured to form an interference fit 134 with the first cable fitting end 130 of the elongated fitting body as the second end 66 of the elongated member 26 may be disposed through an orifice 136 of the elongated cable fitting body 120, and the strain relief portion 68 remains outside the elongated cable fitting body 120.

Figure 4C:
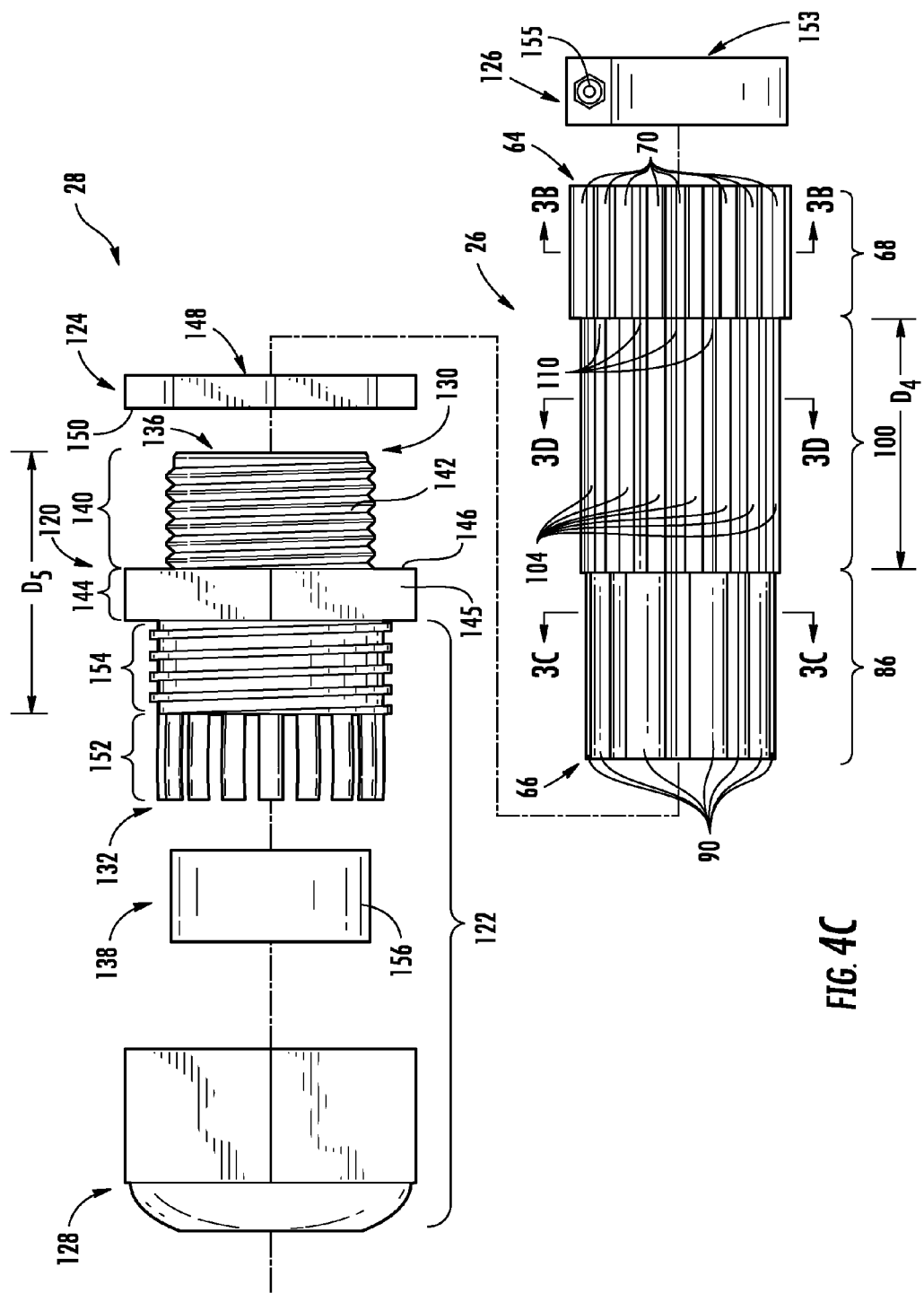
FIG. 4C is an exploded side view of the cable fitting assembly of FIG. 4A.
Figure 4D:
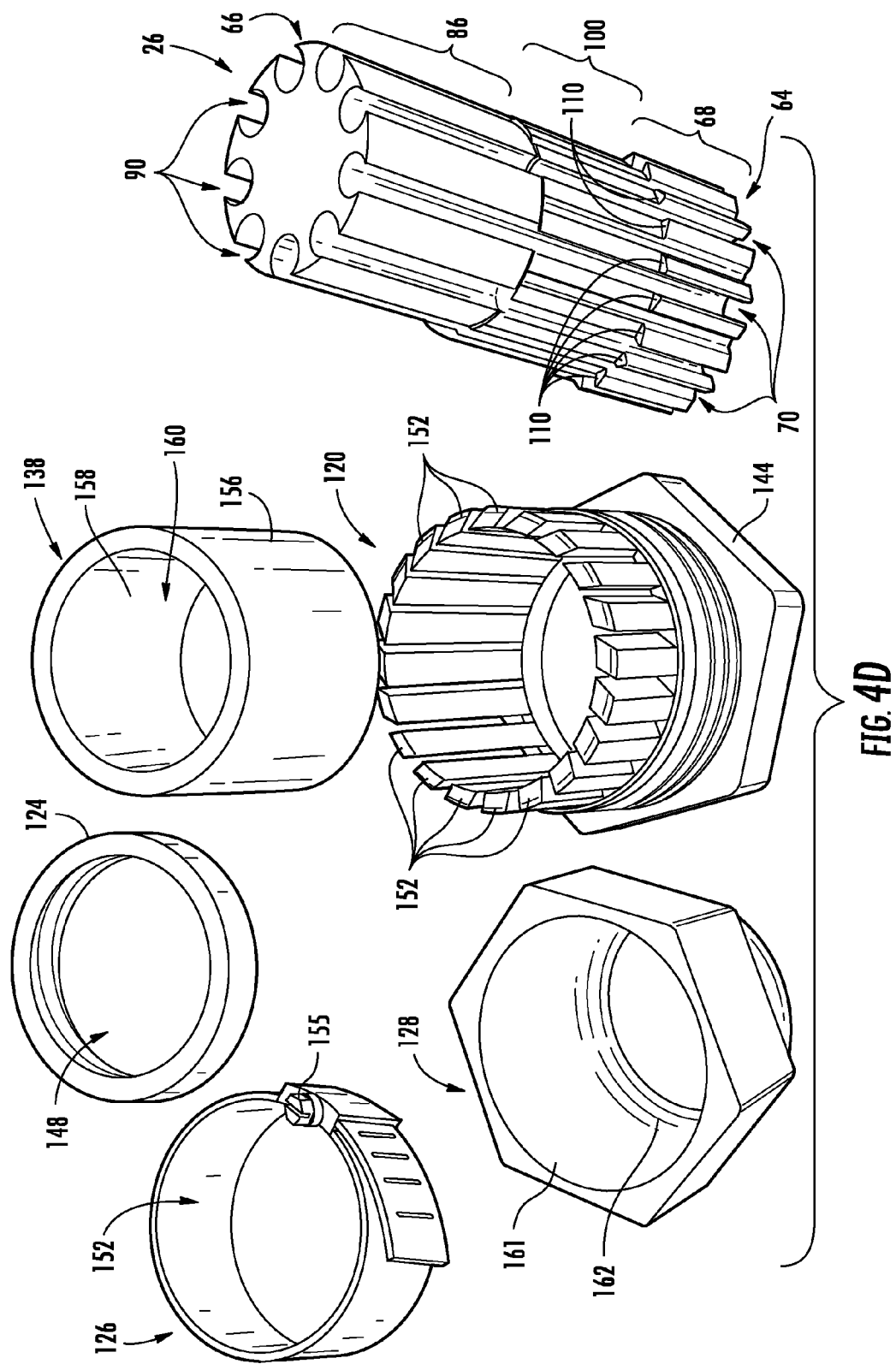
FIG. 4D is an exploded perspective view of the cable fitting assembly of FIG. 4A.

FIGS. 4C and 4D depict an exploded side and perspective views respectively of the elongated member 26 and the cable fitting assembly 28, showing the elongated cable fitting body 120, the compression cap 128, a seal ring 138, locknut 124, and circular clamp 126. The circular clamp 126 may be a hose clamp. The elongated cable fitting body 120 may include the first cable fitting end 130 comprising a first threaded portion 140 having a male thread 142, a second cable fitting end 132 opposite the first cable fitting end 130, an orifice 136, and a cable fitting base 144 disposed between the first cable fitting end 130 and the second cable fitting end 132.

The orifice 136 may be disposed through the elongated cable fitting body 120 from the first cable fitting end 130 to the second cable fitting end 132. The orifice 136 may also be configured to receive the plurality of fiber optic cables 58. The cable fitting base 144 may include a base wall surface 146 configured to contact the contact surface 52 around the opening 54 of the wall 56. The cable fitting base 144 may include flats 145 for interfacing with tools, for example, wrenches (not shown) to attach the elongated cable fitting body 120 to the wall 56.

The locknut 124 may include a threaded orifice 148 and locknut pushing surface 150. The locknut 124 may be configured to be removeably attached to the first cable fitting end 130 and may be configured to push the base wall surface 146 against the contact surface 52 around the opening 54 of the wall 56.

The circular clamp 126 may include an orifice 153 and a fastener 155 for securing the circular clamp 126 around the strain relief portion 68 of the elongated member 26. The fastener 155 may be used to adjust a size of the orifice 153.

The clamping mechanism 122 helps secure the elongated member 26 to the elongated cable fitting body 120 and it also seals the opening 54 in the wall 56. The clamping mechanism 122 includes a plurality of longitudinal protrusions 152, a second threaded portion 154 of the elongated cable fitting body 120, the seal ring 138, and the compression cap 128. The longitudinal protrusions 152 may be contained as part of the elongated cable fitting body 120 and disposed at the second cable fitting end 132. The longitudinal protrusions 152 are flexible to move to decrease an inner diameter of the second cable fitting end 132. The elongated cable fitting body 120 may include the second threaded portion 154 disposed between the plurality of longitudinal protrusions 152 and the cable fitting base 144.

The seal ring 138 may be disposed between the elongated member 26 and the plurality of longitudinal protrusions 152. The seal ring 138 may have a hollow cylindrical shape with an outer diameter surface 156, inner diameter surface 158, and orifice 160. The outer diameter surface 156 of the seal ring 138 may have a size to fit within the plurality of longitudinal protrusions 152. The inner diameter surface 158 of the seal ring 138 may have a size to fit around the sealing portion 86 of the elongated member 26 and may be the same size as the orifice 136 of the elongated cable fitting body 120.

The compression cap 128 may include a threaded portion 161 that may be removeably connected to the second threaded portion 154 of the elongated cable fitting body 120. A curved inner surface 162, which is curved in the longitudinal direction of the compression cap 128, may provide a plurality of second inwardly-directed forces directed towards an interior 164 (see FIG. 6A) of the sealing portion 86.

Figure 5:
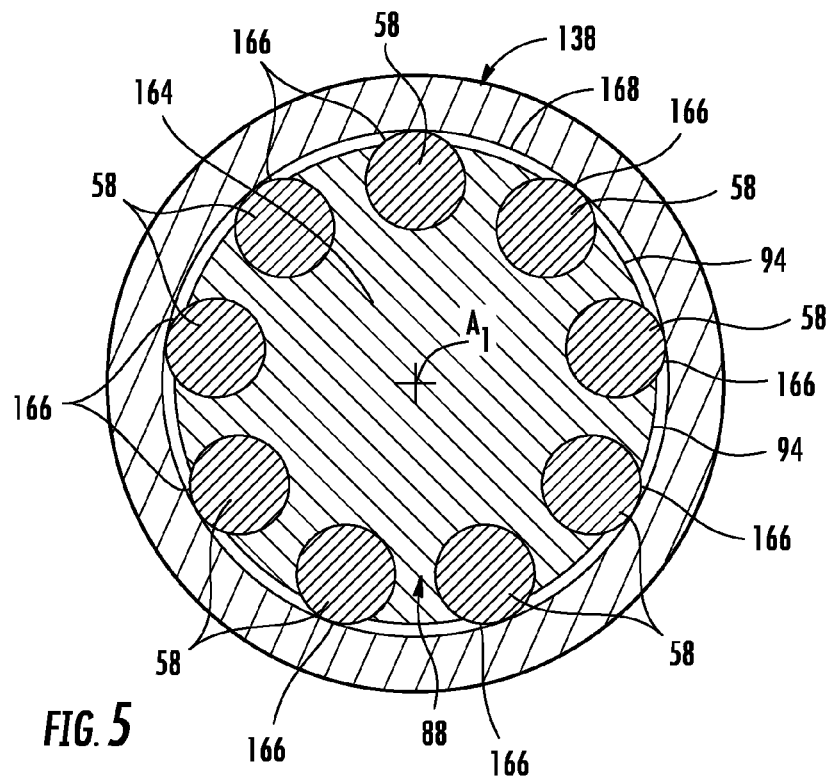
FIG. 5 is a partial cross-section of the cable fitting assembly of FIG. 4A showing the sealing ring, plurality of fiber optic cables, and gap between (before the compression cap is attached)

FIG. 5 depicts the plurality of fiber optic cables 58 received within the cross-section 88 of the sealing portion 86 which may be disposed within the longitudinal protrusions 152 and the seal ring 138 during assembly (depicted later in FIG. 12). A gap 168 may be disposed between the seal ring 138 and the cross-section 88 of the sealing portion 86. The gap 168 may be a portion of the opening 54 in the fiber optic enclosure 29 because it may be within the orifice 136 of the elongated cable fitting body 120. The orifice 136 may be the only passageway through of the opening 54 in the fiber optic enclosure 29 once the elongated cable fitting body 120 may be secured to the wall 56 with the locknut 124. Portions of the plurality of fiber optic cables 58 exposed from the plurality of second openings 92 may be disposed in this gap 168 prior to when the compression cap 128 may be removeably connected to the second threaded portion 154. The location of the cross-section of FIG. 5 is depicted in FIG. 12.

Figure 6A:
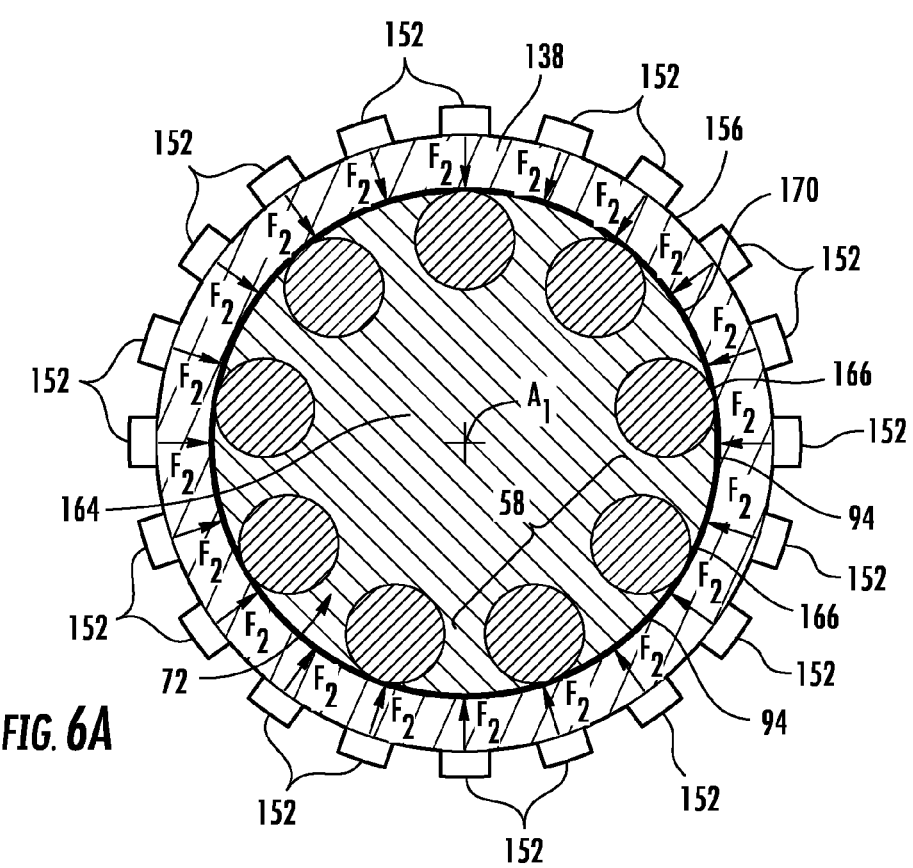
FIG. 6A is a partial cross-section of the cable fitting assembly of FIG. 4A showing a multi-component cylindrical surface.

FIG. 6A illustrates the formation of a multi-component cylindrical surface 170 located within the cable fitting assembly 28 as depicted in FIG. 4B. The multi-component cylindrical surface 170 may be formed when the plurality of second external surfaces 94 and portions 166 of the plurality of fiber optic cables 58 are subject to a plurality of second inwardly-directed forces $F_2$ directed towards an interior 164 of the sealing portion 86. The multi-component cylindrical surface 170 may be formed as the gap 168 is removed as the interior 164 may be compressed by up to 30%. Removing the gap 168 allows the opening 54 in the fiber optic enclosure 29 to be sealed and thereby seal the opening 54 of the wall 56 of the fiber optic enclosure 29.

The plurality of second inwardly-directed forces $F_2$ may be created as the threaded portion 161 of the compression cap 128 may be removeably connected to the second threaded portion 154 of the elongated cable fitting body 120. This removable connection forces the curved inner surface 162 into the plurality of longitudinal protrusions 152, which are flexible and able to transfer the plurality of second inwardly-directed forces $F_2$ to the outer diameter surface 156 of the seal ring 138. The seal ring 138 transfers this force to the plurality of second external surfaces 94 and portions 166 of the plurality of fiber optic cables 58 as shown in FIGS. 5 and 6A. The location of the cross-section of FIG. 6A is depicted in FIG. 4B.

Figure 6B:
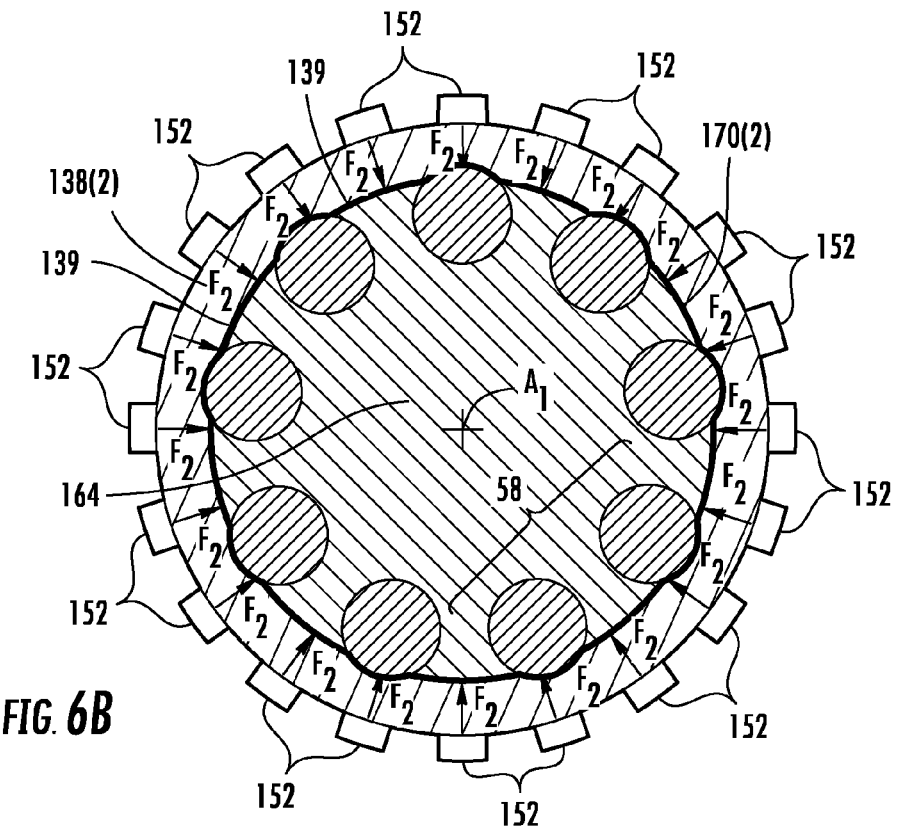
FIG. 6B is a partial cross-section of the cable fitting assembly of FIG. 4A showing an alternative embodiment to the multi-component cylindrical surface.
Figure 6C:
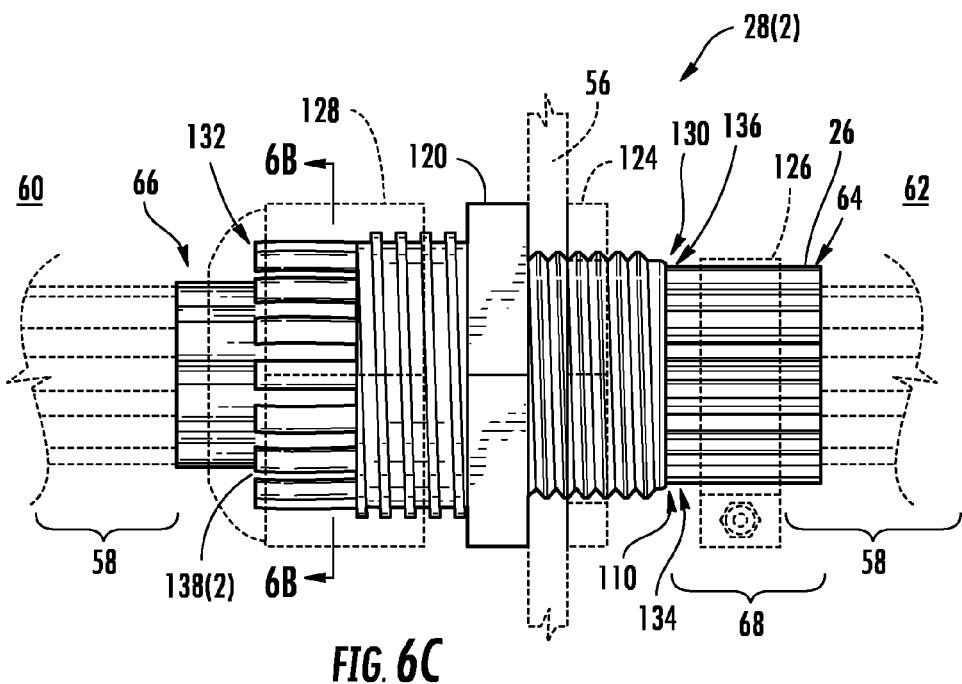
FIG. 6C is a partial cutaway side view of a second embodiment of a cable fitting assembly containing the elongated member of FIG. 4A and a second embodiment of a seal ring.

FIG. 6B depicts a cross-section of an alternative embodiment of the multi-component cylindrical surface 170 realized as a multi-component cylindrical surface 170(2) shown in FIG. 6C. In this alternative embodiment, a seal ring 138(2) may be made of a more flexible material easier to deform under the plurality of second inwardly-directed forces $F_2$ than the seal ring 138 of the embodiment of FIG. 6A. Accordingly, portions 139 of the seal ring 138(2) deform to fill the gap 168 between the portions 166 of the fiber optic cables 58 and thereby seal the opening 54 of the wall 56 of the fiber optic enclosure 29. The more flexible material may include an elastomer, for example, a saturated or unsaturated rubber. The location of the cross-section of FIG. 6B is depicted in FIG. 6C.

Figure 7:
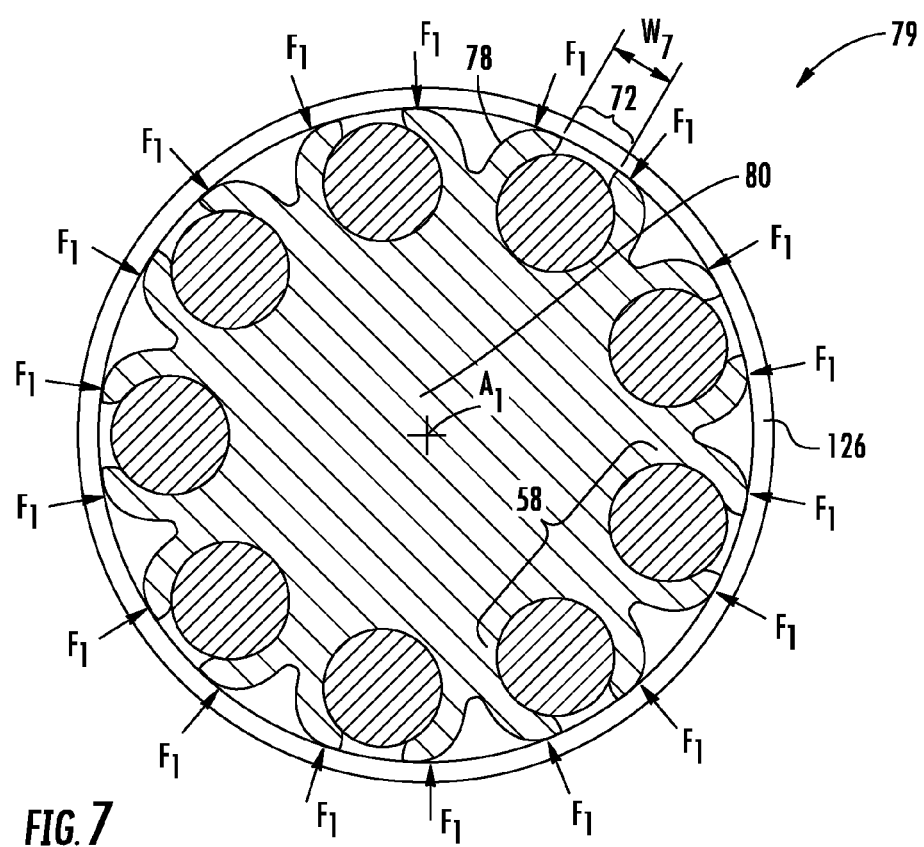
FIG. 7 is a partial cross-section of the cable fitting assembly of FIG. 4A showing the strain relief portion, the plurality of fiber optic cables, and plurality of inward-facing forces $F_1$.

In an analogous manner, FIG. 7 shows a cross-section 79 located within the cable fitting assembly 28 as depicted in FIG. 4B. The circular clamp 126 subjects the plurality of external surfaces 76, which comprise at least one extension member 78, to the plurality of inwardly-directed forces $F_1$. Each of the plurality of inwardly-directed forces $F_1$ is directed towards an interior 80 of the strain relief portion 68. A width $W_7$ of each of the plurality of openings 72 after the application of the plurality of inwardly-directed forces $F_1$ may be smaller than the width $W_1$ of the plurality of openings 72 prior to the application of the plurality of inwardly-directed forces $F_1$.

Figure 8A:
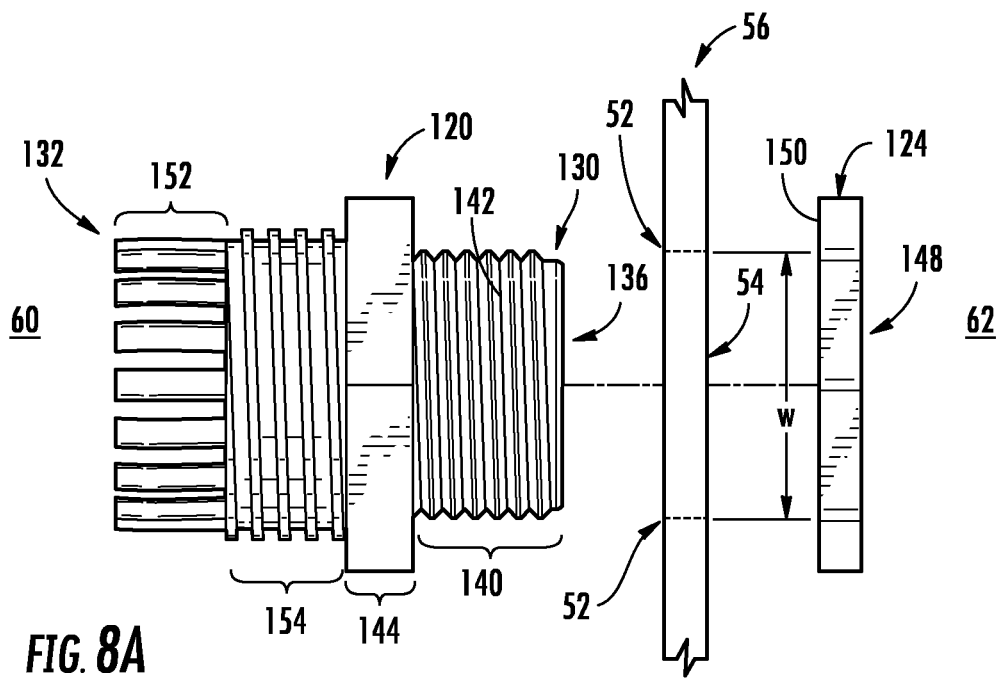
FIG. 8A is a side view showing an elongated cable fitting body and a locknut of FIG. 4A prior to attachment to a wall of a fiber optic enclosure (or terminal)

FIGS. 8A to 12 depict an exemplary method for installing the cable fitting assembly 28 with the plurality of fiber optic cables 58 inserted into the opening 54 of the wall 56 of the fiber optic enclosure 29. In FIG. 8A the elongated cable fitting body 120 and the locknut 124 may be provided to be made available for the installation. The elongated member 26 may be provided later in FIG. 11.

Figure 8B:
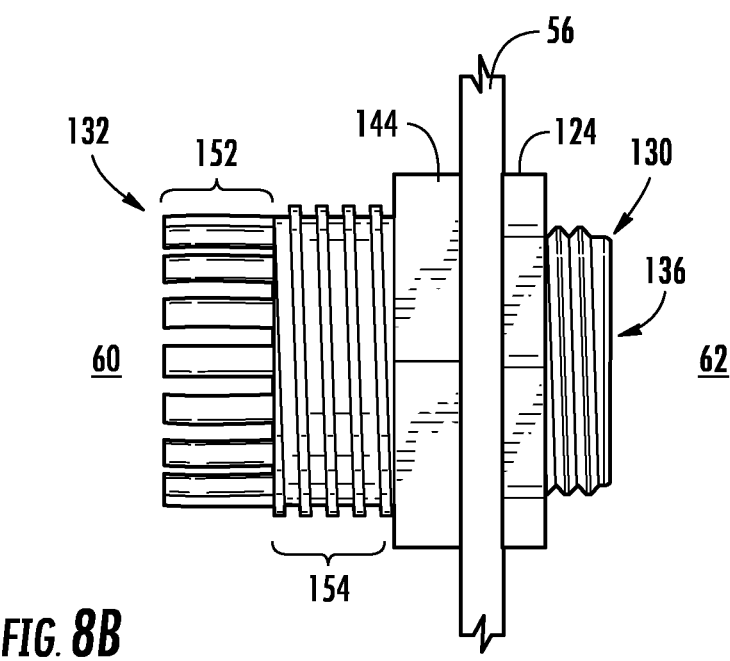
FIG. 8B is a side view showing an elongated cable fitting body and a locknut of FIG. 4A after attachment to the wall of the fiber optic enclosure (or terminal)

In FIG. 8B the first cable fitting end 130 of the elongated cable fitting body 120 may be inserted into an opening 54 of the wall 56 of the fiber optic enclosure 29. The locknut 124 may be secured to the first cable fitting end 130 to secure the elongated cable fitting body 120 to the opening 54 of the fiber optic enclosure 29 at a contact surface 52 around the opening 54.

In FIG. 9 the compression cap 128 and the seal ring 138 are slid onto the end 59 of the plurality of fiber optic cables 58. In FIG. 10 the end 59 of the plurality of fiber optic cables 58 are inserted through an orifice 136 of the elongated cable fitting body 120. The end 59 of the plurality of fiber optic cables 58 may include connectors 74.

FIG. 11 depicts that the plurality of fiber optic cables 58 may be received in the plurality of recesses 70 in the strain relief portion 68 through the plurality of openings 72 and in the plurality of second recesses 90 in the sealing portion 86 through the plurality of second openings 92. The plurality of fiber optic cables 58 may also be received in the plurality of third recesses 104 in the intermediate portion 100 through the plurality of third openings 106.

FIG. 12 illustrates disposing the second end 66 of the elongated member 26 through the orifice 136 of the elongated cable fitting body 120. As the elongated member 26 moves through the orifice 136, the plurality of shoulder surfaces 110 will come in contact with the first cable fitting end 130 of the elongated cable fitting body 120 and prevent the strain relief portion 68 from entering the orifice 136. An interference fit may be formed because the plurality of shoulder surfaces 110 are positioned adjacent to the strain relief portion 68, which may have the width $W_4$ wider than the width of the orifice 136.

Moreover, the longitudinal length $D_4$ of the intermediate portion 100 may be less than the sum (shown by distance $D_5$ in FIG. 4C) of the longitudinal lengths of the first threaded portion 140 (see FIG. 4C), second threaded portion 154, and the cable fitting base 144. A longitudinal length $D_4$ of the intermediate portion 100 (see FIG. 4C), that is shorter than the longitudinal distance $D_4$ will prevent the intermediate portion 100 from contacting the plurality of longitudinal protrusions 152.

FIG. 12 further shows the seal ring 138 disposed between the elongated member 26 and the plurality of longitudinal protrusions 152 at the second cable fitting end 132 of the elongated cable fitting body 120. This new position of the seal ring 138 will enable the plurality of second inwardly-directed forces $F_2$ to be transferred from the plurality of longitudinal protrusions 152 to the sealing portion 86 (see FIGS. 5 and 12).

Results of additional steps in the method are depicted in FIG. 4A. The compression cap 128 may be secured to the second threaded portion 154 (see FIG. 4C), of the elongated cable fitting body 120 to subject the plurality of second external surfaces 94 and portions 166 (see FIG. 6A) of the plurality of fiber optic cables 58 to the plurality of second inwardly-directed forces $F_2$ directed towards an interior 164 of the sealing portion 86. The second inwardly-directed forces $F_2$ create the multi-component cylindrical surface 170 (see FIG. 6A), which seals a portion of the opening 54 in the fiber optic enclosure 29 disposed between the seal ring 138 and the elongated member 26. The portion of the opening 54 in the fiber optic enclosure 29 (see FIG. 2) may be the gap 168 illustrated in FIG. 5.

Further, the circular clamp 126 may be tightened around the plurality of fiber optic cables 58 and the at least one extension member 78 of the strain relief portion 68 to thereby apply a plurality of inwardly-directed forces $F_1$ directed towards an interior 80 of the strain relief portion 68 to the at least one extension member 78 as shown earlier in FIG. 7.

Figure 13:
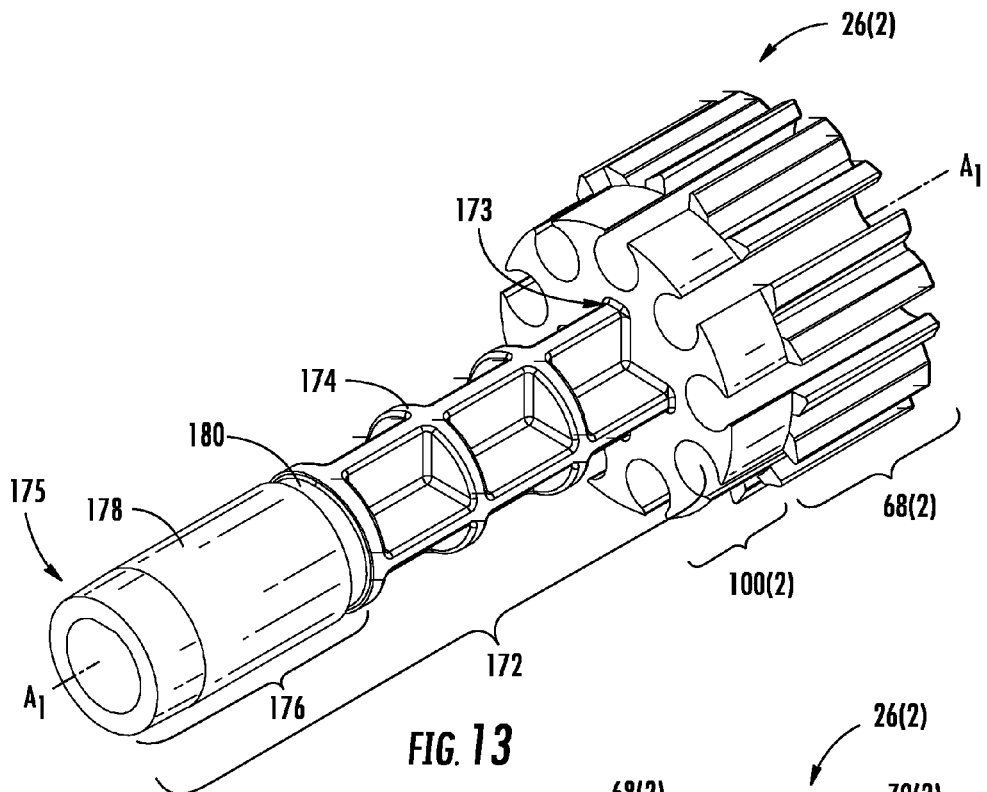
FIG. 13 is a perspective view of a second exemplary embodiment of an elongated member without a second embodiment of a sealing portion attached.
Figure 14:
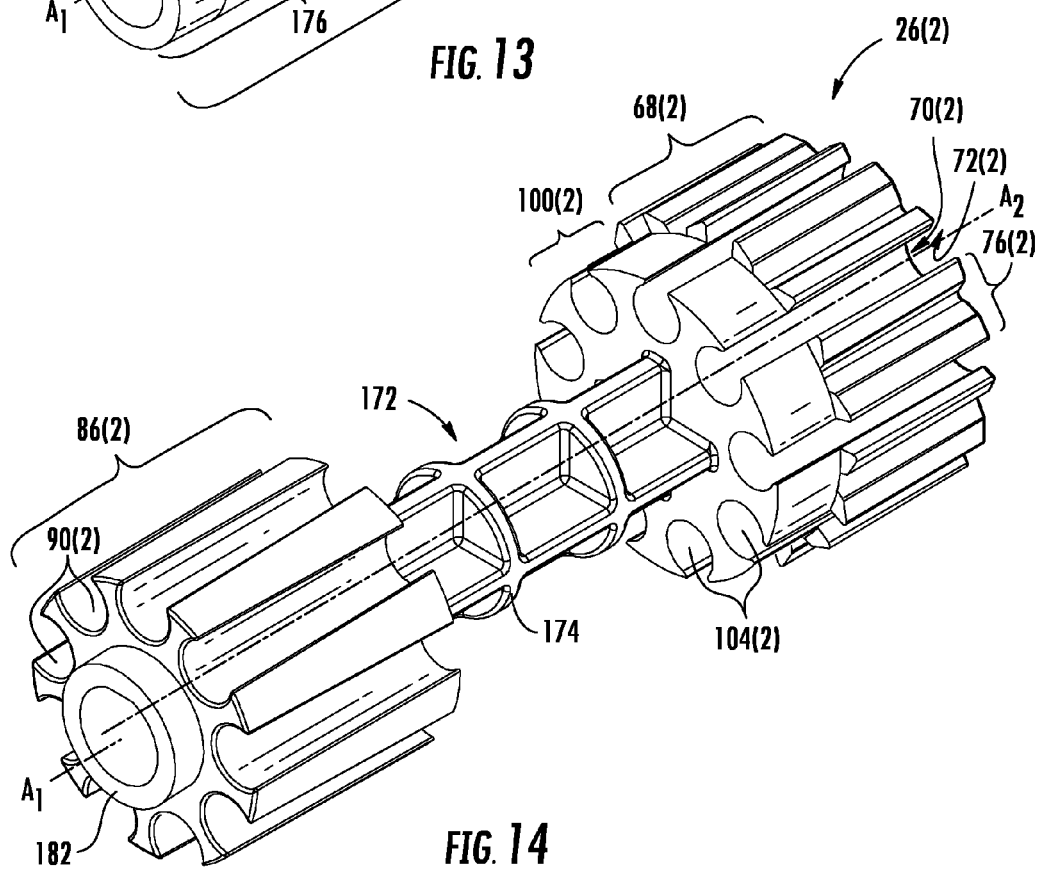
FIG. 14 is a perspective view of the elongated member of FIG. 13 with the second embodiment of the sealing portion attached.

Next, FIGS. 13 to 14 disclose a second embodiment of an elongated member 26(2). The main differences between this embodiment and the earlier embodiment may be that a strain relief portion 68(2), an intermediate portion 100(2), and an axial member 172 may be formed as an integrated component as shown in FIG. 13. Later, a sealing portion 86(2) may be overmolded upon the axial member 172 as shown in FIG. 14. The axial member 172 may be connected to the sealing portion 86(2) and the axial member 172 may be connected to the intermediate portion 100(2). However, the intermediate portion 100(2) may not be connected to the sealing portion 86(2) in order to save material costs.

The elongated member 26(2) may include the strain relief portion 68(2), the sealing portion 86(2), and the intermediate portion 100(2) having a plurality of recesses 70(2), plurality of second recesses 90(2), and plurality of third recesses 104(2), respectively. The plurality of recesses 70(2), the plurality of second recesses 90(2), and the plurality of third recesses 104(2) may be aligned as shown by the longitudinal axis $A_2$.

The axial member 172 may have a first end 173 and a second end 175, and the sealing portion 86(2) may be disposed on the second end 175 of the axial member 172 and the first end 173 of the axial member 172 may be disposed adjacent to the intermediate portion 100(2). The axial member 172 may connect the intermediate portion 100(2) to the sealing portion 86(2). The axial member 172 may be molded as a part of the strain relief portion 68(2) to simplify the manufacturing process.

The axial member 172 may be created from a molding process that creates an outer surface 174 including ribs that are dimensioned to a size to allow the mold material to properly flow (not shown) during manufacturing. The axial member 172 may extend from the intermediate portion 100(2) to form a core portion 176 having an outer surface 178 where the sealing portion 86(2) may be formed in an overmolding process on the outer surface 178. The outer surface may include at least one recess 180 to better attach the sealing portion 86(2) to the core portion 176 in order to prevent slipping. The axial member 172 may extend further from the intermediate portion 100(2) to a distal end 182. The distal end 182 may not be attached to the sealing portion 86(2) and thereby serve as a dimensional reference point during manufacturing.

One advantage to the elongated member 26(2) may be that at least one of the plurality of the fiber optic cables 58 may not contact the elongated member 26(2) at the outer surface 174 between the sealing portion 86(2) and the intermediate portion 100(2). This lack of contact permits the plurality of fiber optic cables 58 to be received easier into the elongated member 26(2).

Figure 15:
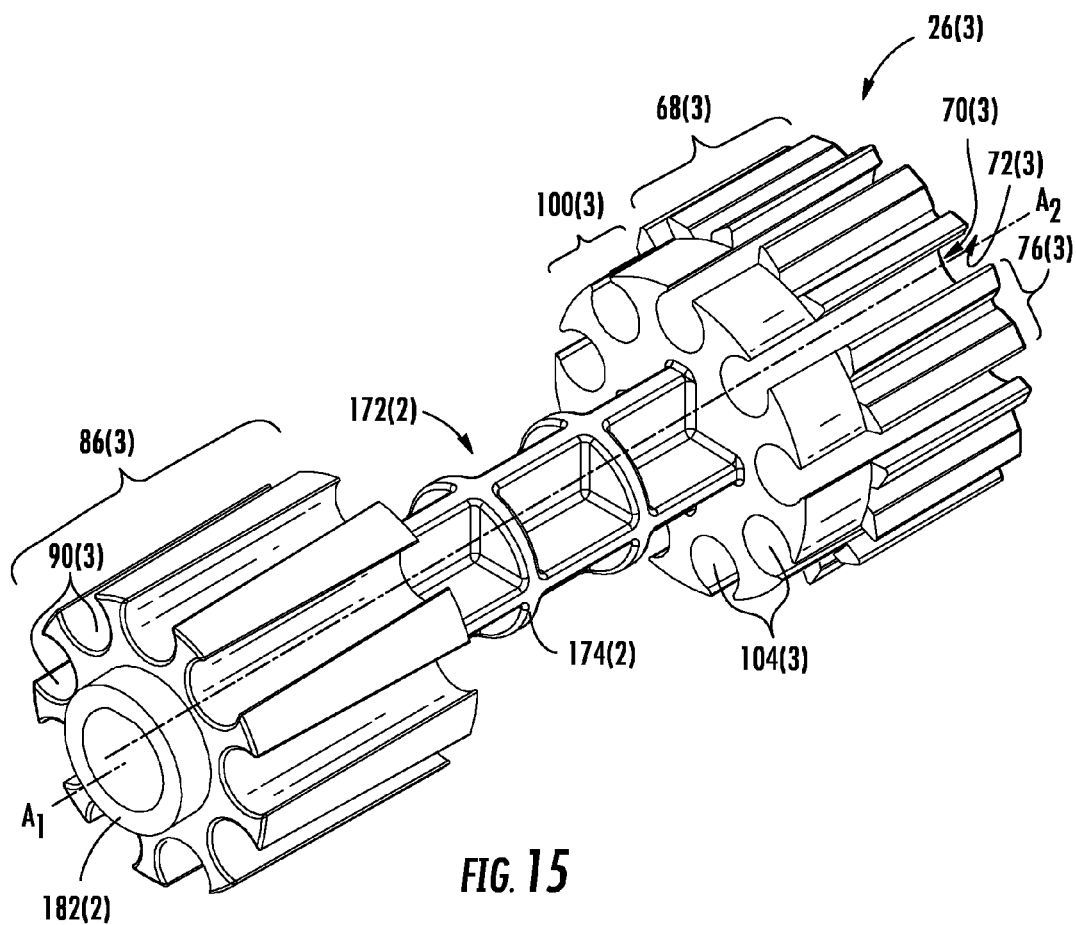
FIG. 15 is a perspective view of a third exemplary embodiment of an elongated member formed as an integrated body.

FIG. 15 depicts another embodiment of an elongated member 26(3). The elongated member 26(3) may include a strain relief portion 68(3), sealing portion 86(3), and intermediate portion 100(3) having a plurality of recesses 70(3), plurality of second recesses 90(3), and plurality of third recesses 104(3), respectively. The plurality of recesses 70(3), the plurality of second recesses 90(3), and the plurality of third recesses 104(3) may be aligned as shown by the longitudinal axis $A_2$. One difference between the elongated member 26(3) in this embodiment and the embodiment of the elongated member 26(2) in FIG. 14 is that the sealing portion 86(3), axial member 172(2), the intermediate portion 100(3), and the strain relief portion 68(3) may be manufactured as a single molded part. Other external characteristics of the third embodiment of the elongated member 26(3) may be the same as the second embodiment of the elongated member 26(2), for example, an outer surface 174(2), distal end 182(2), openings 72(3), and external surfaces 76(3). Manufacturing cost savings may be realized by making the elongated member 26(3) as a single molded part.

FIG. 16 illustrates high-level overview of the various exemplary installations within a multi-dwelling unit (MDU) 184 of the fiber optic terminal 29 having the cable fitting assembly 28 with any embodiment of the elongated member 26, 26(2), 26(3). The MDU 184 includes a portion of a fiber optic network from the LCP 186 to the ONU 188 at the multi-dwelling unit 190. The MDU 184 in this example includes nine (9) dwelling units 190 for illustrative purposes only. The LCP 186 is positioned on the ground floor or basement in the illustrated embodiment; however, the LCP 186 could be positioned at any location relative to the MDU 184. The LCP 186 includes a cable assembly 192 that is optically connected to a network-side fiber optic cable 194. For example, the network-side fiber optic cable 194 may be a feeder cable 196 optically connected to a central office or switching point 198. One or more subscriber-side fiber optic cables 200 may carry optical signals to and from the central switching point 198 and can be connected to the LCP 186, and exit the LCP 186 to extend throughout the MDU 184. For example, the subscriber-side fiber optic cables 200 may be distribution cables. The subscriber-side fiber optic cables 200 carry optical signals to and from the LCP 186 received from the central switching point 198 and extend to each dwelling unit 190 via subscriber-side optical fibers 202 or drop cables and eventually terminate at a subscriber termination point 204, such as an adapter in a wall outlet, an adapter in a floor panel, an adapter behind a ceiling tile, or the like such that the subscriber can optically connect to a subscriber-side optical fiber 202.

The subscriber-side optical fibers 202 can be directly provided from optical fibers from the subscriber-side fiber optic cable 200, or can be provided from one or more intermediate FDTs 206. The FDTs 206 can be provided to simplify the routing and installation of the subscriber-side optical fibers 202 between the LCP 186 and the subscriber termination points 204 by allowing the subscriber-side optical fibers 202 to be grouped between the LCP 186 and FDTs 206 and then separated at the FDTs 206. The FDTs 206 are configured to receive the subscriber-side fiber optic cables 200 and provide each of the subscriber-side optical fibers 202 to the subscriber termination points 204. Accordingly, there are fewer optical fibers 202 and/or fiber optic cables 200 extending between the floors of the MDU 184, thus simplifying routing of optical fibers through the MDU 184. Although floors of the MDU 184 are described in the illustrated embodiments, it should be appreciated that FDTs 206 may be used to facilitate optical fiber routing to any layout of areas within the MDU 184. Further, although the subscriber-side optical fibers 202 and the subscriber-side fiber optic cables 200 include arrows pointing in the direction of the subscriber termination points 204, it should be appreciated that optical signals may be passed in either direction as required for the particular application; the arrows are merely provided for illustrative purposes.

Consistent with the discussion above related to the MDU 184, there are various types of fiber optic terminals 29 (LCPs and FDTs) that have the opening 54 to allow the subscriber-side fiber optic cables 200 to exit and travel towards the subscriber premises 190. As the fiber optic network continues to adapt to the needs of subscribers, more fiber optic terminals 29 may be installed having a plurality of fiber optic cables 58 exiting the opening 54. The plurality of fiber optic cables 58 may be the subscriber-side fiber optic cables 200 or the subscriber-side optical fibers 202.

Figure 17A:
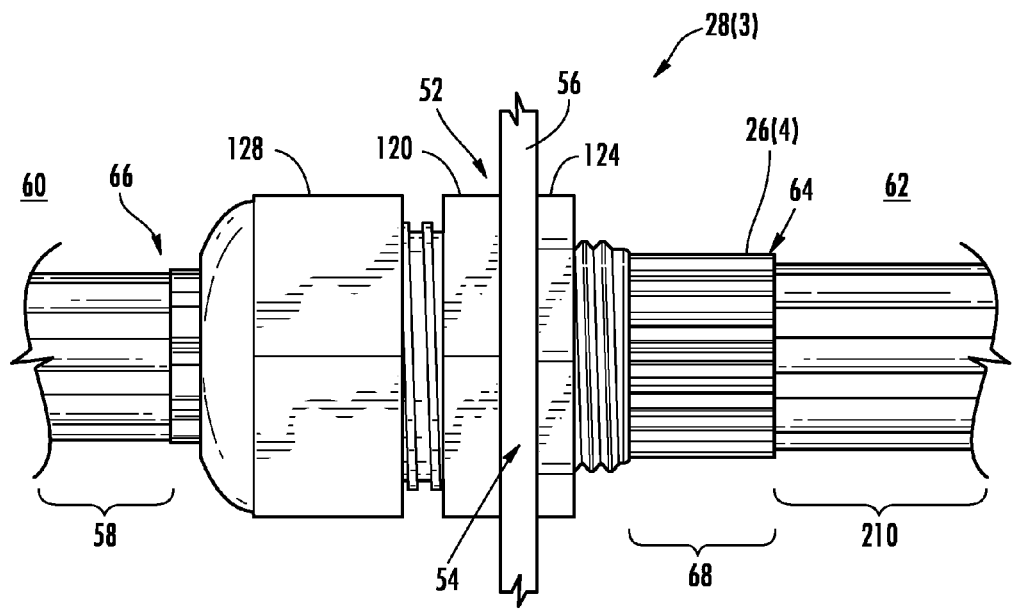
FIGS. 17A and 17B are a side view and a partial side view, respectively, of another embodiment of a cable fitting assembly.
Figure 17B:
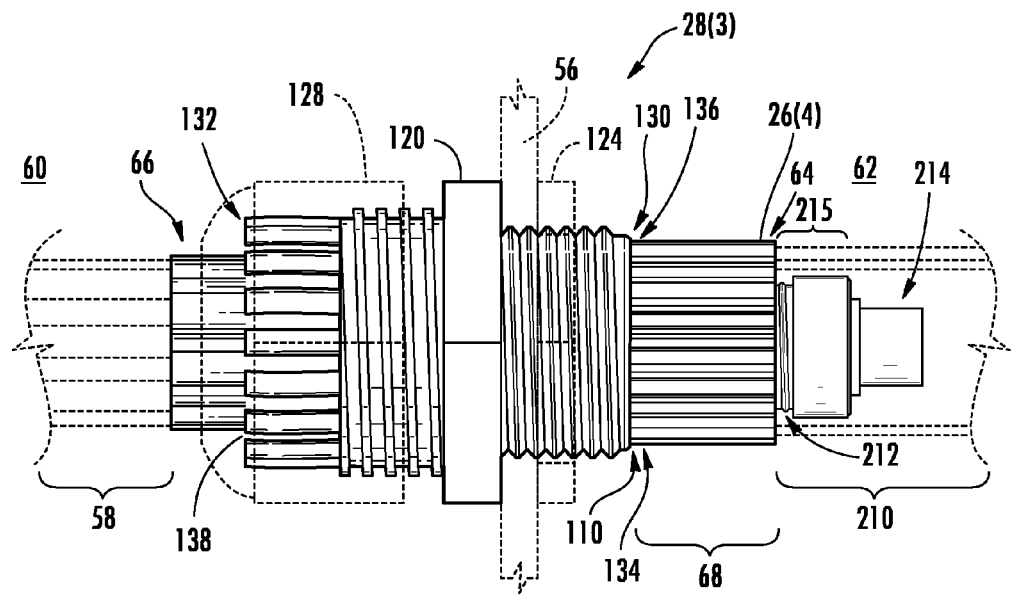
Figure 17C:
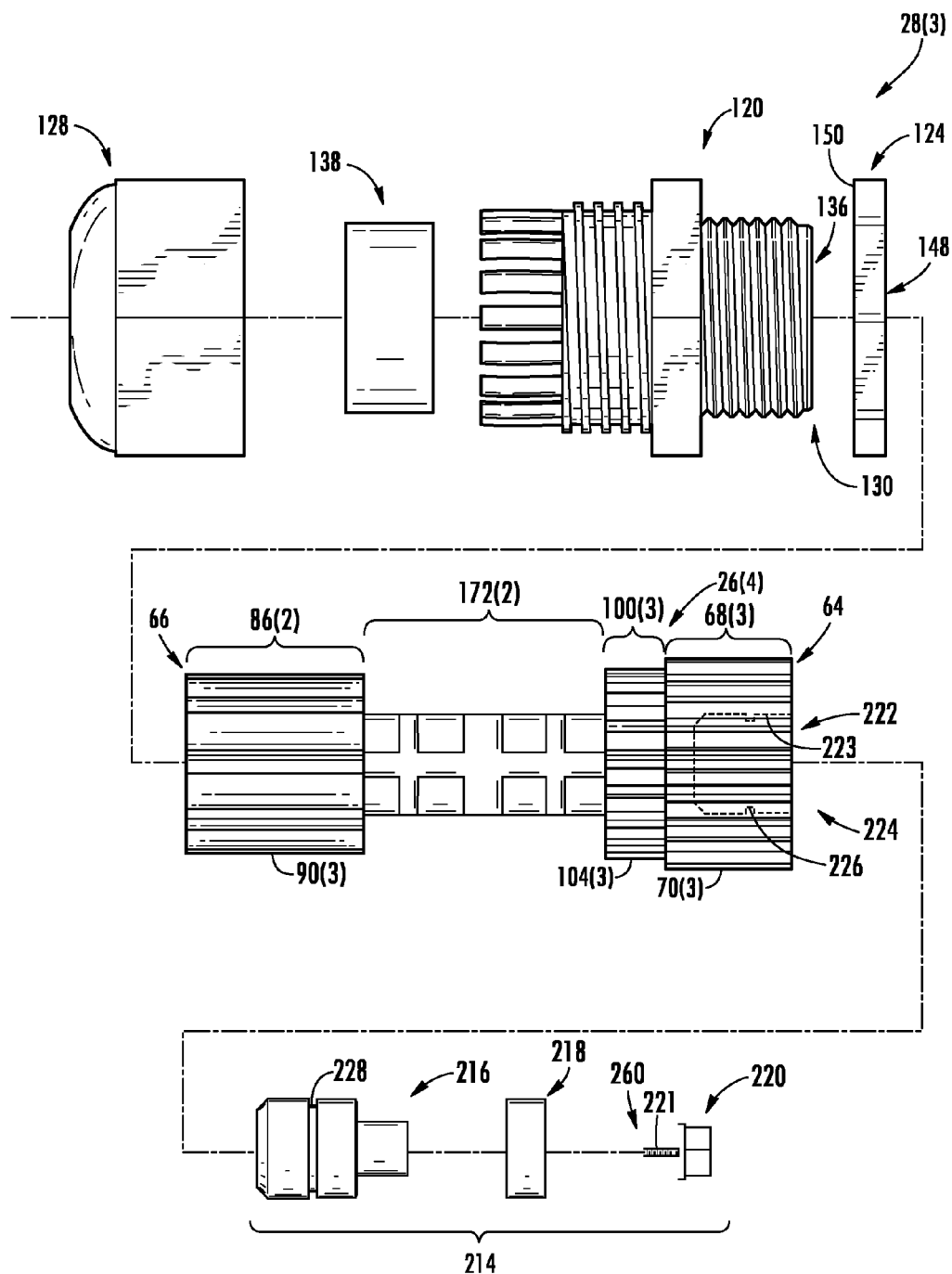
FIG. 17C is an exploded side view of the cable fitting assembly of FIGS. 17A and 17B.

FIGS. 17A through 17C depict another embodiment of a cable fitting assembly 28(3). As similarly discussed earlier, the cable fitting assembly 28(3) may be attached to the contact surface 52 around the opening 54 of a wall 56 of the fiber optic enclosure 29. The cable fitting assembly 28(3) may include an elongated member 26(4) (discussed later) to provide strain relief and/or sealing against contamination. The cable fitting assembly 28(3) may provide a higher level of strain relief than the earlier embodiments discussed. The opening 54 provides a passageway for a plurality of fiber optic cables 58 to travel between the outside 60 and the inside 62 of the fiber optic enclosure 29. The opening 54 may be made during initial manufacturing or later during installation by removing "knockout" material by, for example, cutting or applying force.

The cable fitting assembly 28(3) may include many of the same components introduced earlier including the compression cap 128, the elongated cable fitting body 120, the locknut 124, seal ring 138, and the fiber optic cables 58.

As shown in FIG. 17A, the first end 64 and the second end 66 of the elongated member 26(4) may be disposed in the inside 62 and in the outside 60, respectively, of the fiber optic enclosure 29. It is noted that optical fibers 210 extend from the elongated member 26(4) into the inside 62 of the fiber optic enclosure 29. The fiber optic cables 58 may comprise the optical fibers 210 and strength members 212. FIG. 17B shows the strength members 212 may be connected to the first end 64 of the elongated member 26(4) with a clamping assembly 214. The clamping assembly 214 may form a strength member gap 215 in which the strength members 212 may be disposed. It is noted that the clamping assembly 214 may be used without the circular clamp 126 as introduced earlier in FIG. 4A.

FIG. 17C shows the clamping assembly 214 in exploded view along with the other elements of the cable fitting assembly 28(3). The clamping assembly 214 may include a threaded bushing 216, collar 218, and a fastener 220. The fastener 220 may be configured to communicate with the threaded bushing 216 and thereby create a clamping force $F_3$ (see FIG. 29) applied to contents of the strength member gap 215 (FIG. 17B) disposed between the threaded bushing 216 and the fastener 220. The threaded bushing 216 may be received into a bushing opening 222 and then into a bushing bore 224 formed by an internal surface 223 within the first end 64 of the elongated member 26(4). The bushing bore 224 may be parallel to the recesses 70(3) of the strain relief portion 68(3). The bushing bore 224 may include a containment rib 226 to be inserted into a bushing recess 228 of the threaded bushing 216 when the threaded bushing 216 may be inserted into the bushing bore 224.

Now details of the clamping assembly 214 will be discussed with regard to FIGS. 18A through 18D. The threaded bushing 216 may include an insertion portion 230 and a clamping portion 232.

The insertion portion 230 may be configured to be received into the bushing bore 224 of the elongated member 26(4). The insertion portion 230 may have a bushing contact surface 234 that is configured to communicate with the internal surface 223 of the elongated member 26(4). The bushing contact surface 234 may be concentric to a longitudinal axis $A_1$ and have a diameter $D_6$. The bushing contact surface 234 may include a diamond knurl surface 236 to increase the resistance to sliding against the internal surface 223 of the elongated member 26(4). The bushing recess 228 may include an interference surface 239 to contact the containment rib 226 of the bushing bore 224 to prevent the insertion portion from departing the bushing bore 224. The insertion portion 230 of the threaded bushing 216 may also include a chamfer 238 to more easily allow the insertion portion 230 to be inserted within the bushing bore 224.

The clamping portion 232 of the threaded bushing 216 may include a bushing protrusion 240 which may extend from the insertion portion 230. The bushing protrusion 240 may also extend longitudinally (parallel to the longitudinal axis $A_1$) from the first end 64 of the elongated member 26(4) and extend away from the second end 66. The bushing protrusion 240 may include a protrusion surface 242 which may be concentric around the longitudinal axis $A_1$ and include a diameter $D_7$. The strength members 212 may be wrapped around the protrusion surface 242 (see FIG. 25B) to hold the strength members 212 in the strength member gap 215 before the clamping assembly 214 is engaged (as discussed later).

The diameter $D_7$ may be smaller than a diameter $D_6$ to provide more volume in the strength member gap 215 for the strength members 212.

The clamping portion 232 may also include a clamping surface 244 configured to contact the strength members 212 when the strength members 212 are in the strength member gap 215. The clamping surface 244 may include grooves 246. The grooves 246 may be concentric to the longitudinal axis $A_1$ to prevent the strength members 212 disposed within the strength member gap 215 from moving away from the protrusion surface 242 once the clamping assembly 214 is engaged.

Figure 18A:
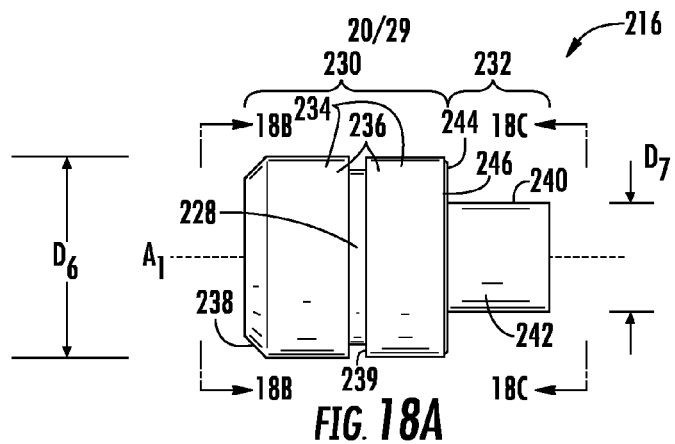
FIGS. 18A through 18D are a side view, a front view, a back view, and a cutaway view, respectively, of a threaded bushing of the cable fitting assembly of FIGS. 17A and 17B.
Figure 18B:
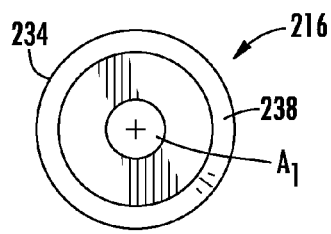
Figure 18C:
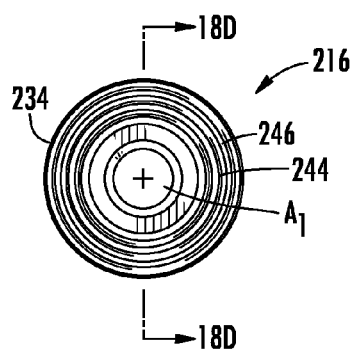
Figure 18D:
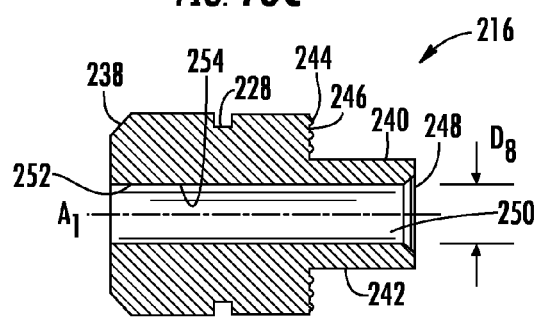

The threaded bushing 216 may also include a fastener opening 248 leading to a threaded bore 250, as shown in FIG. 18D. The threaded bore 250 may be formed by an inner threaded surface 252. The inner threaded surface 252 may include, for example, an inner thread 254. The inner thread 254 may have, for example, a 0.164 inch major diameter $D_8$, and thirty-two (32) threads per inch. The threaded bushing 216 may be made of a resilient strong material, for example, steel, brass, or thermoplastic.

It is noted that a different embodiment (not shown) of the elongated member 26(4) may not require the threaded bushing 216. Instead, features of the clamping portion 232 of the threaded bushing 216 may be made integral as part of the different embodiment of the elongated member 26(4). These features that may be made integral as part of the different embodiment of the elongated member 26(4) may include one or more of: the bushing protrusion 240, the protrusion surface 242, the clamping surface 244, the grooves 246, the fastener opening 248, the threaded bore 250, the inner threaded surface 252, and/or the inner thread 254. By making one or more of these features integral as part of the elongated member 26(4), a quantity of parts may be reduced in the cable fitting assembly 28(3).

Figure 19A:
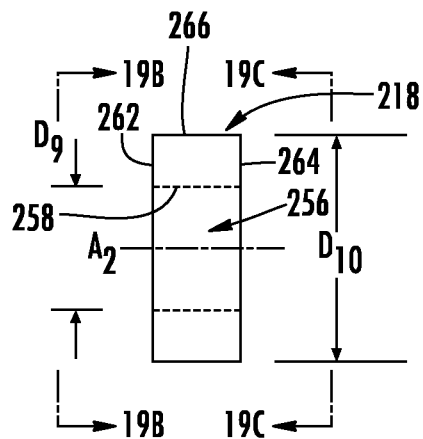
FIGS. 19A through 19C are a side view, a front view, and a back view, respectively, of a collar of the cable fitting assembly of FIGS. 17A and 17B.
Figure 19B:
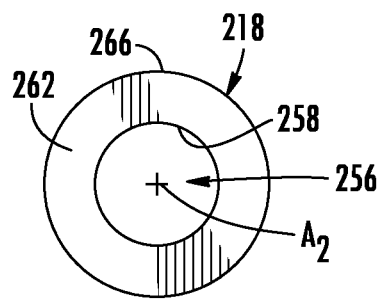
Figure 19C:
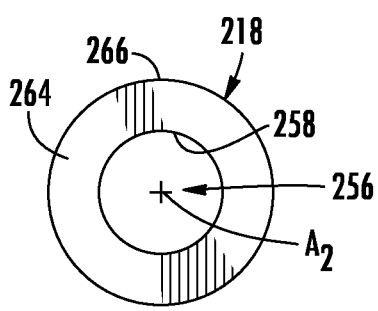

Next, FIGS. 19A through 19C describe features of the collar 218. At least a portion of the collar 218 may be disposed within the strength member gap 215 and may be configured to transfer the clamping force $F_3$ (see FIG. 29) from the fastener 220 to the portion 213 of the strength members 212 in the strength member gap 215. The collar 218 may include an inner collar bore 256 formed by an inner collar surface 258 concentric with a longitudinal axis $A_2$ of the collar 218. The inner collar surface 258 may have a diameter $D_9$ sufficient to let a distal end 260 (see FIG. 17C) of the fastener 220 pass through the inner collar bore 256. The collar 218 may include a first collar surface 262 opposite a second collar surface 264. The first collar surface 262 and the second collar surface 264 may contact and transfer the clamping force $F_3$ between the strength members 212 and the fastener 220, respectively, when the clamping assembly 214 may be engaged. The collar 218 may include an outer collar surface 266 which may be concentric to the longitudinal axis $A_2$ and positioned sufficiently far away from the inner collar surface 258 to provide enough room on the first collar surface 262 and the second collar surface 264 to contact the strength members 212 and the fastener 220. The outer collar surface may have a diameter $D_{10}$. The diameter $D_{10}$ may be, for example, less than the diameter $D_6$ of the bushing contact surface 234. The diameter $D_{10}$ greater than the diameter $D_6$ may be unnecessary because the portion of the strength members 212 may be clamped against the clamping surface 244 of the threaded bushing 216 which may be within the diameter $D_6$. The collar 218 may protect the strength members 212 from direct contact with the fastener 220 which may damage the strength members 212 during engagement by rotating. The collar 218 may or may not rotate during engagement and so may be less damaging to the strength members 212 than the fastener 220. The collar 218 may be made of a strong resilient material with a relatively low coefficient of friction, for example, a hard thermoplastic.

The fastener 220 (see FIG. 17C) may be standard hex screw including an outer thread 221 compatible with the inner thread 254 (FIG. 18D) of the threaded bushing 216. The fastener 220 may be long enough to pass through the collar 218, to provide a strength member gap 215 to accommodate the strength members 212, and to engage with the inner thread 254 of the threaded bushing 216. The clamping assembly 214 may be engaged when the outer thread 221 engages the inner thread 254 of the threaded bushing 216 and applies the clamping force $F_3$ against the strength members 212 disposed in the strength member gap 215. The fastener 220 may be made of a strong resilient material, for example, steel, brass, or thermoplastic.

Figure 20A:
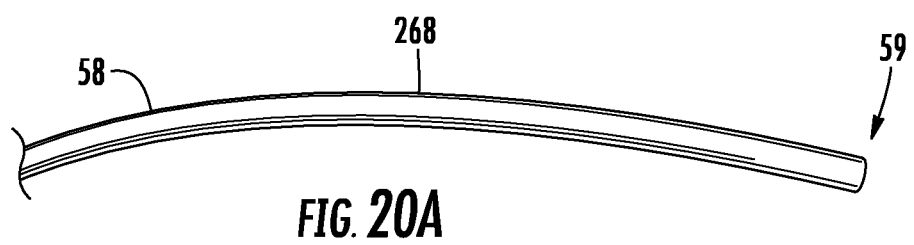
FIG. 20A is a side view of an unstripped fiber optic cable.
Figure 20B:
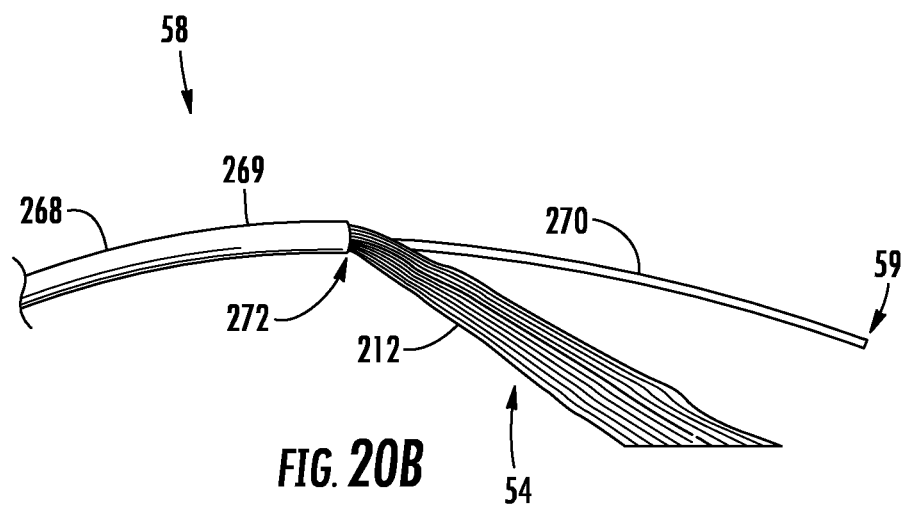
FIG. 20B is a side view of the fiber optic cable of FIG. 20A after being stripped as utilized with the cable fitting assembly of FIGS. 17A and 17B.

FIG. 20A depicts the end 59 of one of the fiber optic cables 58 in unstripped form and a cable jacket 268 forms an exterior longitudinal surface of the fiber optic cable 58. The fiber optic cable 58 may comprise at least one optical fiber 270 and the strength members 212 as shown in FIG. 20B when the cable jacket 268 may be removed to a transition point 272. The transition point 272 may be disposed between the unstripped portion 269 of the fiber optic cable 58 and the optical fibers 270 which are separated from the strength members 212.

As shown in FIG. 17C, the elongated member 26(4) may include a strain relief portion 68(3), sealing portion 86(2), and intermediate portion 100(3) having a plurality of recesses 70(3), plurality of second recesses 90(3), and plurality of third recesses 104(3), respectively. The plurality of recesses 70(3), the plurality of second recesses 90(3), and the plurality of third recesses 104(3) may be aligned.

Figure 21:
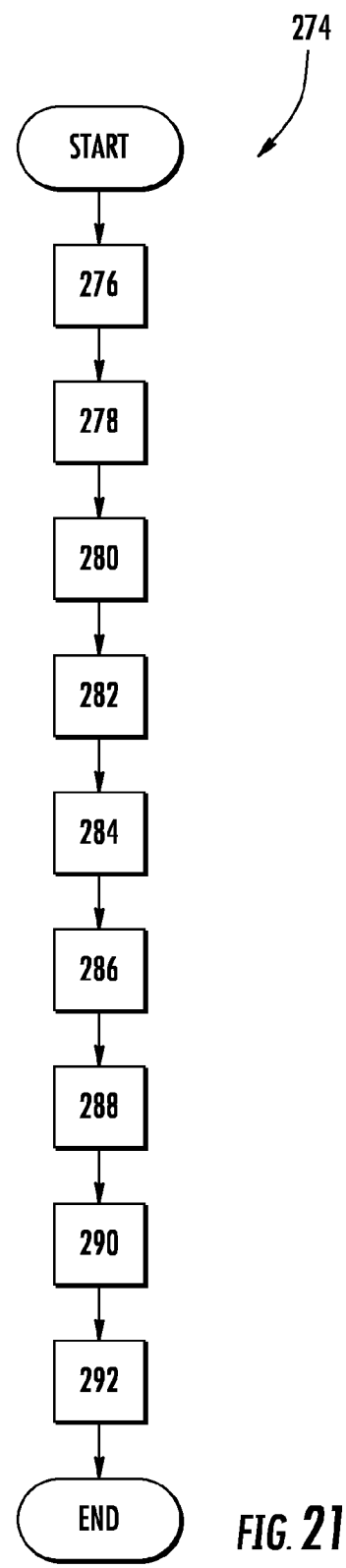
FIG. 21 is a block diagram of an exemplary process for installing the cable fitting assembly of FIGS. 17A and 17B with at least one of the fiber optic cable of FIG. 20B into an opening of a fiber optic enclosure.

FIG. 21 provides an exemplary process 274 for installing the cable fitting assembly 28(3) with the plurality of fiber optic cables 58 into the opening 54 of the fiber optic enclosure 29. The process 274 in FIG. 21 will be described using the terminology and information provided above and in reference to FIGS. 8A through 9, 12, 20B, and 22A through 29.

Figure 22A:
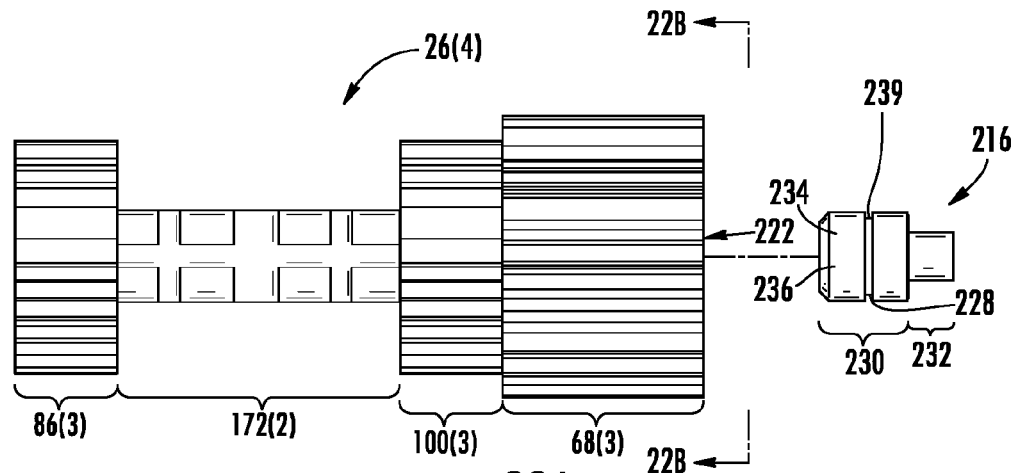
FIG. 22A is a side view of an elongated member of the cable fitting assembly of FIGS. 17A and 17B with a threaded bushing detached.
Figure 22B:
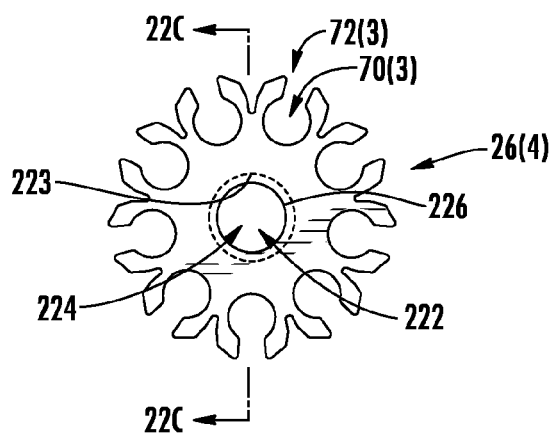
FIG. 22B is a front side view of the elongated member of FIG. 22A.
Figure 22C:
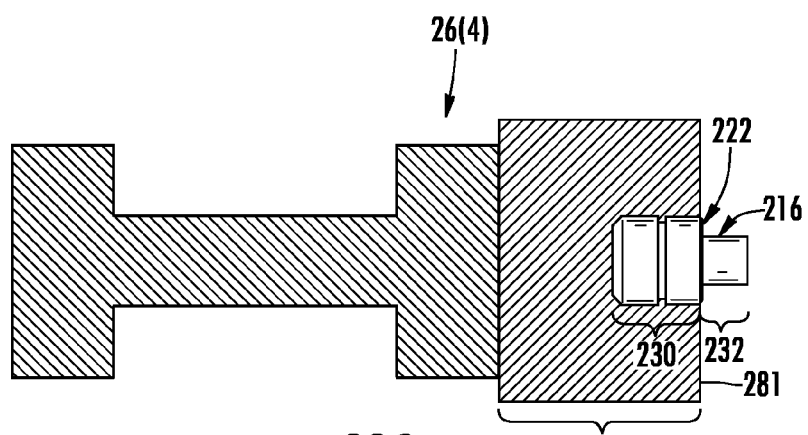
FIG. 22C is a partial cutaway view of the threaded bushing received by the elongated member of FIG. 22A.

The first step in the process 274 may be to attach the elongated cable fitting body 120 to the contact surface 52 of the wall 56 with the locknut 124 as shown in FIGS. 8A and 8B (step 276 in FIG. 21). Next, as shown in FIG. 9, the compression cap 128 and the seal ring 138 are slid onto the end 59 of the fiber optic cables 58 (step 278 in FIG. 21). Next, as shown in FIG. 20B, each of the fiber optic cables 58 is stripped from the end 59 to the transition point 272 to separate the strength members 212 from the optical fibers 270 (step 280 in FIG. 21). Next, as shown in FIGS. 22A through 22C, the threaded bushing 216 may be received through the bushing opening 222 and into the bushing bore 224 (step 282 in FIG. 21). It is noted that the threaded bushing 216 may be received into the bushing bore 224 in a factory-setting as opposed to the field to minimize the number of parts in the field. The clamping surface 244 of the threaded bushing 216 may be flush with a first surface 281 of the elongated member 26(4) or be disposed outside of the bushing bore 224. This positioning of the clamping surface 244 may avoid having the clamping force $F_3$ from the fastener 220 or the collar 218 pushing against the first surface 281 and thereby loosening the threaded bushing 216 from the bushing bore 224.

The bushing contact surface 234 may communicate with the internal surface 223 to hold the threaded bushing 216 within the bushing bore 224. The internal surface 223 may deform to conform to the diamond knurl surface 236 of the threaded bushing 216 to also hold the threaded bushing 216 within the bushing bore 224. The interference surface 239 of the bushing recess 228 may communicate with the containment rib 226 of the internal surface 223 of the elongated member 26(4) to also hold the threaded bushing 216 within the bushing bore 224.

Figure 23:
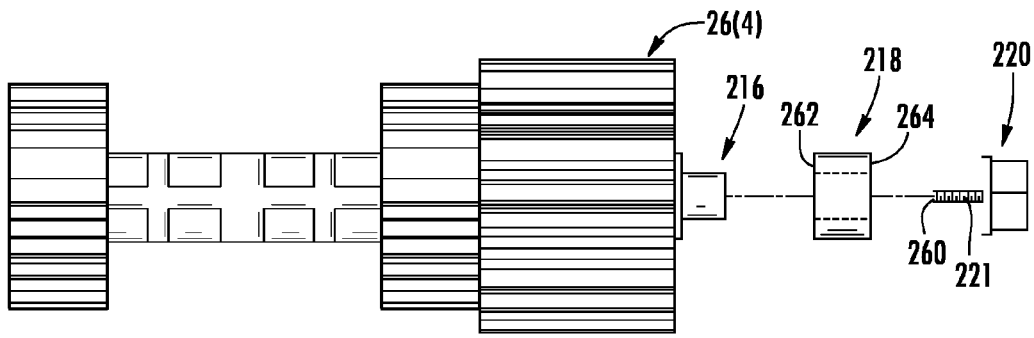
FIG. 23 is a side view of the elongated member of FIG. 22C adjacent to a collar and a fastener.
Figure 24:
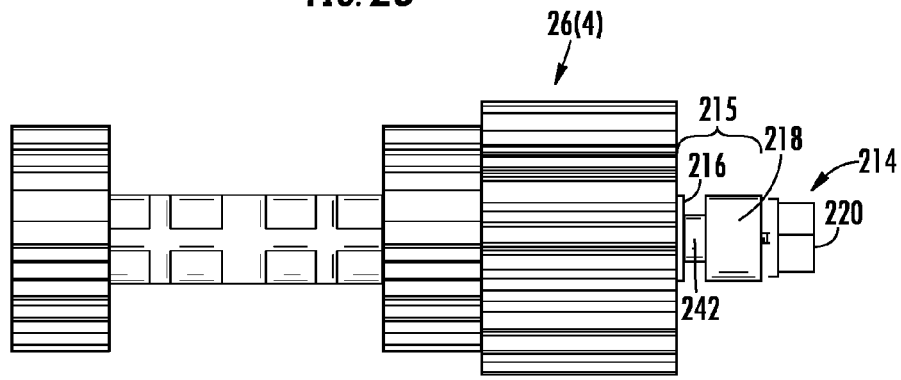
FIG. 24 is a side view of the elongated member of FIG. 23 with the fastener in communication with the threaded bushing.

Next, as shown in FIGS. 23 through 24, the strength member gap 215 may be created by passing the distal end 260 of the fastener 220 through the collar 218 and by partially engaging the outer thread 221 of the fastener 220 with the inner thread 254 of the threaded bushing 216 (step 284 in FIG. 21). The strength member gap 215 may also be created without the collar 218 by directly engaging the outer thread 221 of the fastener 220 with the inner thread 254.

Next, as shown in FIGS. 24 through 27, the portion 213 of each of the strength members 212 of the fiber optic cable 58 may be sequentially received in the strength member gap 215 and wrapped around the protrusion surface 242 of the threaded bushing 216 before a second portion 217 of the strength members 212 may be received through the openings 72(3) into the recess 70(3) of the strain relief portion 68(3) (see FIG. 22B) of the elongated member 26(4) (step 286 in FIG. 21). The unstripped portion 269 of the fiber optic cable 58 may also be received through the openings 72(3) and into the recess 70(3) so that the unstripped portion 269 may be disposed between the strength member 212 in the recess 70(3) and the opening 72(3) of the recess 70(3) as shown in FIGS. 25A and 26B.

Figure 25A:
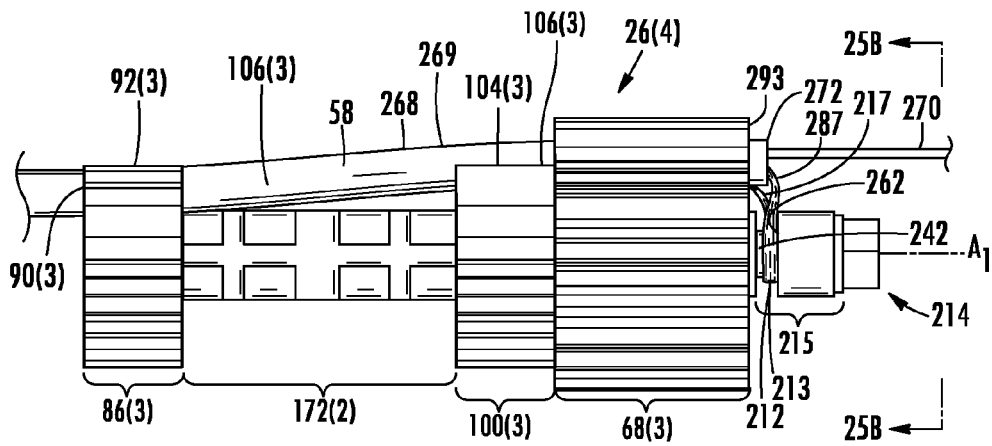
FIGS. 25A and 25B are a side view and a longitudinal side view, respectively, of the elongated member of FIG. 24 with a strength member wrapped around a clamping assembly.
Figure 25B:
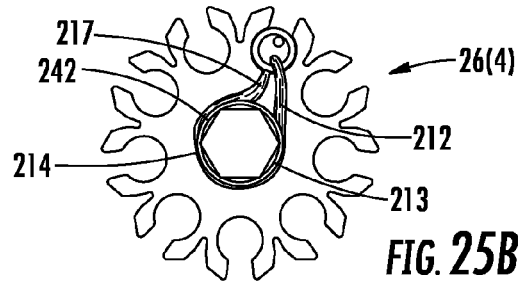
Figure 26A:
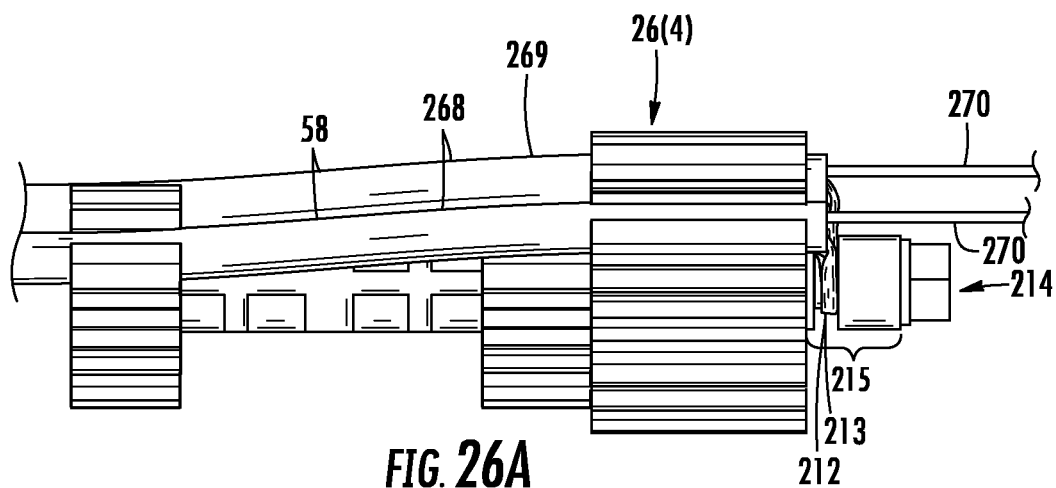
FIGS. 26A and 26B are a side view and a longitudinal side view, respectively, of the elongated member of FIGS. 25A and 25B with a second strength member wrapped around the clamping assembly.
Figure 26B:
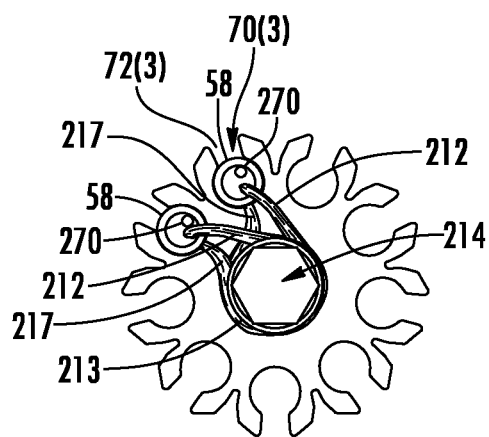
Figure 27:
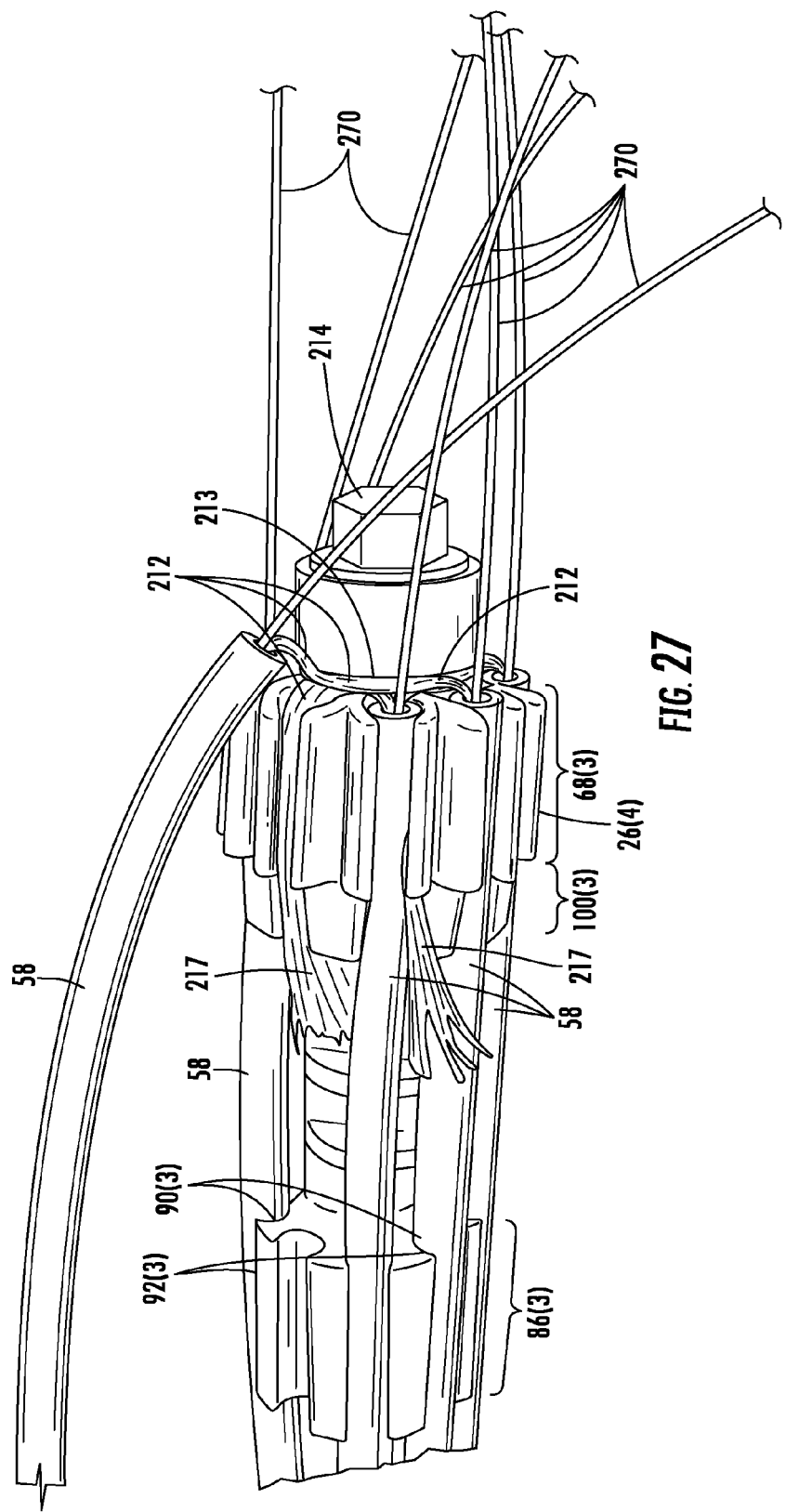
FIG. 27 is a perspective view of the elongated member of FIGS. 26A and 26B with multiple strength members wrapped around the clamping assembly.

As shown in FIG. 25A, the transition point 272 of the fiber optic cable 58 may be disposed adjacent to a recess exit 293 of the recess 70(3). The recess exit 293 may be configured to release the optical fibers 270 of the plurality of fiber optic cables 58 into the inside 62 of the fiber optic enclosure 29 and to provide the freedom for the strength members 212 to bend from the cable jacket 268 to the clamping assembly 214. Accordingly at the transition point 272 each of the strength members 212 may include a bend 287 from a direction parallel to the longitudinal axis $A_1$ to a direction perpendicular (or angled) to the longitudinal axis $A_1$ of the elongated member 26(4) as shown in FIG. 25A. The bend 287 may help provide strain relief to the fiber optic cables 58 by resisting movement of the strength members 212. The bend 287 increases friction resistance to movement of the strength member 212 because tension in the strength members 212 increases a normal force of each of the strength members 212 towards the elongated member 26(4) at each of the bends 287.

FIG. 25A depicts the plurality of fiber optic cables 58 may be also received into the plurality of second recesses 90(3) in the sealing portion 86(3) through the plurality of second openings 92(3). The plurality of fiber optic cables 58 may also be received in the plurality of third recesses 104(3) in the intermediate portion 100(3) through the plurality of third openings 106(3).

Figure 28:
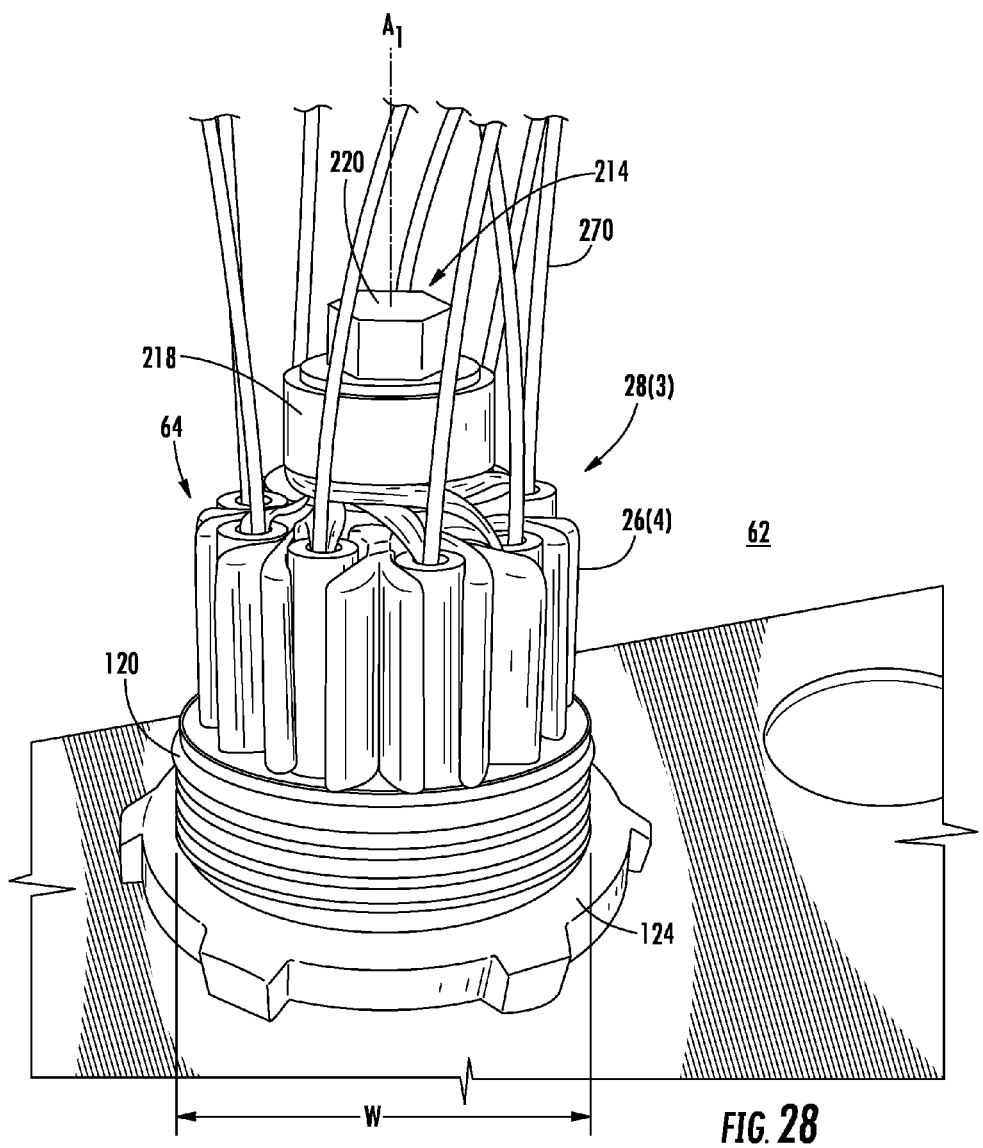
FIG. 28 is a perspective view of the elongated member of FIG. 27 received into an elongated cable fitting body.

Next, as shown in FIG. 28, the elongated member 26(4) may be received within elongated cable fitting body 120 (step 288 in FIG. 21). At this point the first end 64 of the elongated member 26(4) may be disposed within the inside 62 of the fiber optic enclosure 29.

Figure 29:
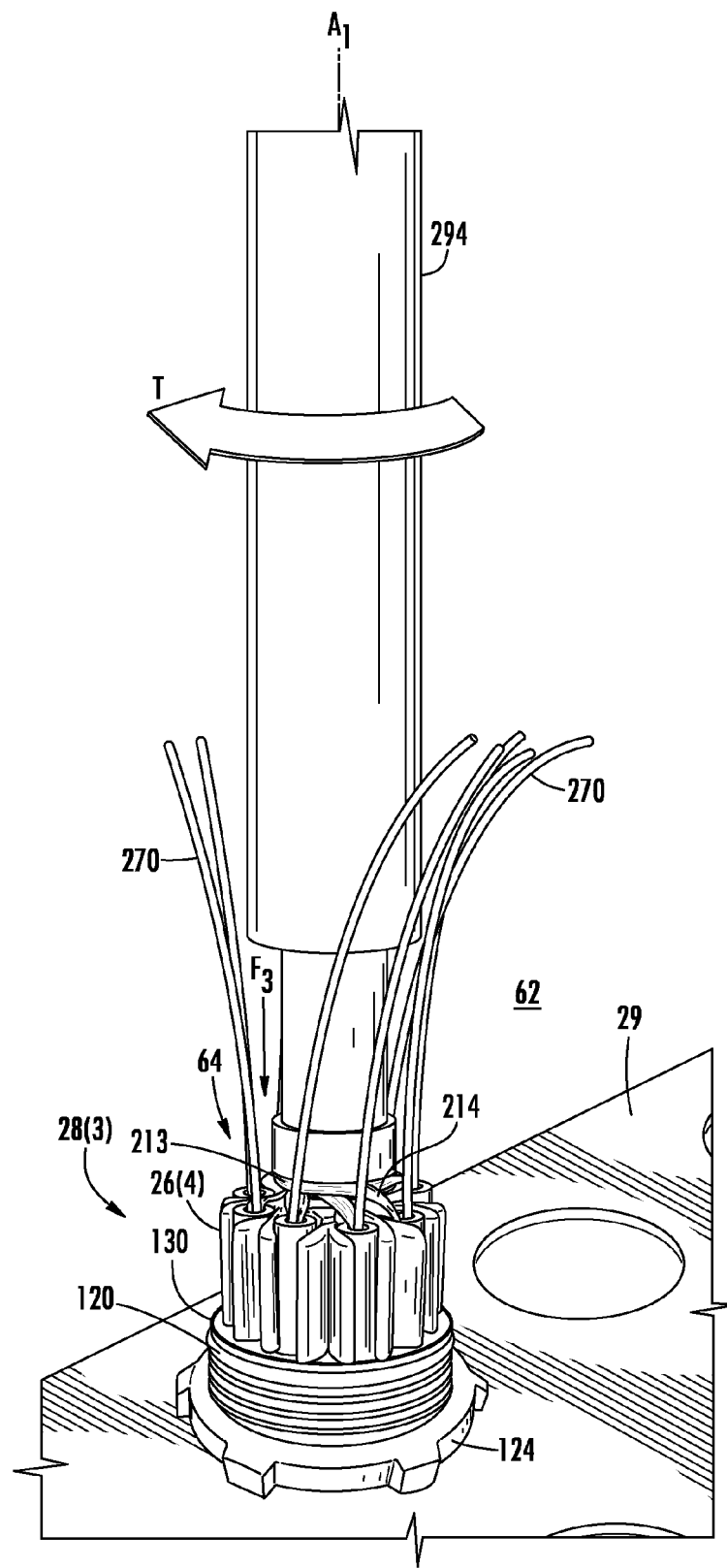
FIG. 29 is a perspective view of the elongated member of FIG. 28 with a torque T being applied to the fastener to engage the clamping assembly.

Next, as shown in FIG. 29, the clamping assembly 214 may be engaged to clamp down on the strength members 212 disposed within the strength member gap 215 (step 290 in FIG. 21). The clamping assembly 214 may be engaged with, for example, a wrench 294. The wrench 294 may be, for example, a 216C Tool, made by General Machine Products Company of Trevose, Pa. The wrench 294 may apply a torque T to the fastener 220 to tighten. The torque T may be, for example, at least ten (10) inch-pounds and at most twelve (12) inch-pounds. The torque T may narrow the strength member gap 215 and thereby apply the clamping force $F_3$ to the portion 213 of the strength members 212 in the strength member gap 215. The clamping force $F_3$ may be in the longitudinal direction $A_1$ of the elongated member 26(4).

Next, as shown conceptually in FIG. 12, the compression cap 128 may be tightened on the second threaded portion 154 of the elongated cable fitting body 120 (step 292 in FIG. 21). Tightening the compression cap 128 may seal the opening 54 of the fiber optic enclosure 29 with the sealing portion 86(3) of the elongated member 26(4).

As used herein, it is intended that terms "fiber optic cables" and/or "optical fibers" include all types of single mode and multi-mode light waveguides, including one or more optical fibers that may be up-coated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments not set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An elongated member for sealing off an opening disposed through an enclosure wall having a plurality of fiber optic cables disposed therethrough, comprising:
   a first end and a second end disposed opposite the first end along a longitudinal axis, the second end configured to guide a plurality of fiber optic cables into an opening of an enclosure;
   a strain relief portion disposed at the first end, the strain relief portion includes a plurality of recesses forming a plurality of openings configured to each receive one of the plurality of fiber optic cables, each of the plurality of recesses separated by one of a plurality of external surfaces and disposed parallel to the longitudinal axis; and
   a clamping assembly disposed at the first end, the clamping assembly configured to clamp strength members of the plurality of fiber optic cables, wherein the clamping assembly comprises:
   a threaded bushing attached to the first end;
   a fastener in communication with the threaded bushing;
   a strength member gap configured to receive a portion of the strength members; and
   a bushing protrusion, the bushing protrusion includes a protrusion surface configured for the portion of the strength members to be wrapped around.

2. The elongated member of claim 1, further comprising a sealing portion disposed at the second end, the sealing portion includes a plurality of second recesses forming a plurality of second openings configured to each receive one of the plurality of fiber optic cables, each of the plurality of second recesses separated by one of a plurality of second external surfaces and disposed parallel to the longitudinal axis.

3. The elongated member of claim 1, wherein the strength member gap is disposed between the threaded bushing and the fastener.

4. The elongated member of claim 1, wherein the fastener is configured to apply a clamping force to the portion of the strength members disposed within the strength member gap.

5. The elongated member of claim 4, wherein the clamping assembly further comprises a collar configured to transfer the clamping force from the fastener to the portion of the strength members.

6. The elongated member of claim 5, wherein at least a portion of the collar is disposed within the strength member gap.

7. The elongated member of claim 1, wherein the threaded bushing includes an insertion portion received into a bushing bore within the first end.

8. The elongated member of claim 7, wherein the insertion portion of the threaded bushing includes a bushing contact surface communicating with an internal surface of the elongated member.

9. The elongated member of claim 1, wherein the protrusion surface extends longitudinally from the first end of the elongated member.

10. The elongated member of claim 1, wherein each of the plurality of recesses is configured to receive a second portion of the strength members and an unstripped portion of one of the plurality of fiber optic cables, and each of the strength members is clamped within the strength member gap by the clamping assembly.

11. The elongated member of claim 10, wherein each of the plurality of recesses includes a recess exit configured to release optical fibers of the plurality of fiber optic cables into an inside of the enclosure, and to guide the strength members to and from the clamping assembly.

12. The elongated member of claim 11, wherein each of the recess exits is configured to be adjacent to a transition point of each of the plurality of fiber optic cables.

13. The elongated member of claim 11, wherein each of the recess exits is disposed at a distance from the clamping assembly, and the distance is less than a width of the opening of the enclosure.

14. A cable fitting assembly for an opening of a fiber optic enclosure, comprising:
a cable fitting, comprising
an elongated cable fitting body including a first cable fitting end comprising a first threaded portion, a second cable fitting end opposite the first cable fitting end, an orifice disposed therethrough from the first cable fitting end to the second cable fitting end, the orifice configured to receive a plurality of fiber optic cables, and a cable fitting base disposed between the first cable fitting end and the second cable fitting end, the cable fitting base comprising a base wall surface configured to form a contact area on a surface around an orifice of an enclosure wall,
a clamping mechanism,
a locknut including a threaded orifice and a locknut pushing surface, the locknut configured to be removeably attached to the first cable fitting end and configured to pull the base wall surface against the contact area; and
an elongated member comprising
a first end and a second end, the first end is disposed within the orifice of the elongated cable fitting body, and the first end opposite the second end along a longitudinal axis,
a strain relief portion disposed at the first end, the strain relief portion includes a plurality of recesses forming a plurality of openings configured to each receive one of the plurality of fiber optic cables, each of the plurality of recesses separated by one of a plurality of external surfaces and disposed parallel to the longitudinal axis, and
a clamping assembly configured to clamp strength members of the plurality of fiber optic cables at the first end, wherein the clamping assembly comprises:
a threaded bushing attached to the first end;
a fastener in communication with the threaded bushing;
a strength member gap configured to receive a portion of the strength members; and
a bushing protrusion, the bushing protrusion includes a protrusion surface configured for the portion of the strength members to be wrapped around.

15. The cable fitting assembly of claim 14, wherein the elongated member further comprises a sealing portion disposed at the second end, the sealing portion includes a plurality of second recesses forming a plurality of second openings configured to each receive one of the plurality of fiber optic cables, each of the plurality of second recesses separated by one of a plurality of second external surfaces and disposed parallel to the longitudinal axis.

16. The cable fitting assembly of claim 14, wherein the strength member gap is disposed between the threaded bushing and the fastener.

17. The cable fitting assembly of claim 14, wherein the fastener is configured to apply a clamping force to the portion of the strength members disposed within the strength member gap.

18. The cable fitting assembly of claim 14, wherein the threaded bushing includes an insertion portion received into a bushing bore within the first end.

19. The cable fitting assembly of claim 14, wherein each of the plurality of recesses is configured to receive one of the strength members and an unstripped portion of one of the plurality of fiber optic cables, and each of the strength members is clamped within the strength member gap by the clamping assembly.

20. The cable fitting assembly of claim 19, wherein each of the plurality of recesses includes a recess exit configured to release optical fibers of the plurality of fiber optic cables into an inside of the enclosure, and guide the strength members to and from the clamping assembly.

21. The cable fitting assembly of claim 20, wherein each recess exit is configured to be adjacent to a transition point of each of the plurality of fiber optic cables.

22. The elongated member of claim 20, wherein each of the recess exits is disposed at a distance from the clamping assembly which is less than the width of the opening of the enclosure.

23. A method of installing a cable fitting assembly with a plurality of fiber optic cables into an opening of a fiber optic enclosure, comprising:
inserting a first cable fitting end of an elongated cable fitting body through an opening of a fiber optic enclosure and securing the first cable fitting end to the fiber optic enclosure with a locknut;
inserting an end of a plurality of fiber optic cables through an orifice of the elongated cable fitting body;

receiving a threaded bushing through a bushing opening and into a bushing bore disposed at a first end of an elongated member;

stripping the plurality of fiber optic cables from the end of the plurality of fiber optic cables to a transition point and separating strength members of the plurality of fiber optic cables from optical fibers of the plurality of fiber optic cables;

creating a strength member gap;

receiving the plurality of the fiber optic cables through a plurality of openings into a plurality of recesses in a strain relief portion disposed at the first end of the elongated member, each of the plurality of recesses separated by one of a plurality of external surfaces and disposed parallel to a longitudinal axis; and engaging a clamping assembly.

24. The method of claim 23, wherein the creating the strength member gap comprises passing a distal end of a fastener through a collar and at least partially engaging the distal end with an inner thread of the threaded bushing.

25. The method of claim 24, further comprising, before receiving the plurality of the fiber optic cables through the plurality of openings, sequentially receiving a portion of each of the strength members in the strength member gap and wrapping the portion of each of the strength members around a protrusion surface of the threaded bushing.

26. The method of claim 25, wherein the engaging the clamping assembly comprises applying a torque to the fastener to apply a clamping force to the portion of the strength members in the strength member gap.

* * * * *